US009930225B2

United States Patent
Villmer

(10) Patent No.: US 9,930,225 B2
(45) Date of Patent: Mar. 27, 2018

(54) OMNI-DIRECTIONAL CAMERA AND RELATED VIEWING SOFTWARE

(75) Inventor: Jason Villmer, Naples (IT)

(73) Assignee: VILLMER LLC, St. Louis, MO (US)

( * ) Notice: Subject to any disclaimer, the term of this patent is extended or adjusted under 35 U.S.C. 154(b) by 607 days.

(21) Appl. No.: 13/371,137

(22) Filed: Feb. 10, 2012

(65) Prior Publication Data

US 2012/0206565 A1 Aug. 16, 2012

Related U.S. Application Data

(60) Provisional application No. 61/441,591, filed on Feb. 10, 2011.

(51) Int. Cl.
| | |
|---|---|
| H04N 7/00 | (2011.01) |
| G06K 9/36 | (2006.01) |
| G06K 9/20 | (2006.01) |
| G06T 15/10 | (2011.01) |
| G06T 15/20 | (2011.01) |
| H04N 5/225 | (2006.01) |
| H04N 1/00 | (2006.01) |
| H04N 5/232 | (2006.01) |
| H04N 101/00 | (2006.01) |

(52) U.S. Cl.
CPC ............. *H04N 5/2252* (2013.01); *H04N 1/00* (2013.01); *H04N 5/232* (2013.01); *H04N 5/23238* (2013.01); *H04N 5/23258* (2013.01); *H04N 2101/00* (2013.01); *H04N 2201/3254* (2013.01); *H04N 2201/3264* (2013.01); *H04N 2201/3267* (2013.01)

(58) Field of Classification Search
CPC ...... H04N 1/00; H04N 1/2158; H04N 5/2252; H04N 5/232; H04N 5/23238; H04N 5/23258; H04N 5/2628; H04N 7/002; H04N 7/183; H04N 17/002; H04N 2201/3267; H04N 2101/00; H04N 2201/3254; H04N 2201/3264; G03B 37/04; G06T 7/0024; G06T 3/0062; G08B 13/19641
See application file for complete search history.

(56) References Cited

U.S. PATENT DOCUMENTS

| | | |
|---|---|---|
| 5,185,667 A | 2/1993 | Zimmermann |
| 5,313,306 A | 5/1994 | Kuban et al. |
| 5,359,363 A | 10/1994 | Kuban et al. |
| 5,703,604 A | 12/1997 | McCutchen |
| RE36,207 E | 5/1999 | Zimmermann et al. |

(Continued)

OTHER PUBLICATIONS

Dodeca 2360 Capture System by Immersive Media (2011), http://www.immersivemedia.com/products/capture.shtml.

(Continued)

*Primary Examiner* — Rebecca Volentine
(74) *Attorney, Agent, or Firm* — Bagwell IP; Adam L. Bagwell

(57) ABSTRACT

Creating spherical video and corresponding audio utilizing a plurality of cameras by acquiring images via the cameras, processing the images, and mathematically converting and/or transforming the images into a combined spherical image file. A camera device creates the spherical image file and transfers it to devices running a viewer application, whereby the transfer occurs by saving the file to a storage file, streaming it to the devices via wired/wireless communication, or both.

1 Claim, 65 Drawing Sheets

(56) References Cited

U.S. PATENT DOCUMENTS

| | | | |
|---|---|---|---|
| 6,002,430 A | 12/1999 | McCall et al. | |
| 6,141,034 A * | 10/2000 | McCutchen | G02B 27/22 348/36 |
| 6,795,113 B1 | 9/2004 | Jackson et al. | |
| 7,126,630 B1 * | 10/2006 | Lee et al. | 348/218.1 |
| 7,382,399 B1 | 6/2008 | McCall et al. | |
| 7,463,280 B2 | 12/2008 | Steuart et al. | |
| 7,583,288 B2 | 9/2009 | Uyttendaele et al. | |
| 7,714,936 B1 | 5/2010 | Martin et al. | |
| 2003/0071891 A1 * | 4/2003 | Geng | H04N 5/232 348/39 |
| 2003/0234866 A1 * | 12/2003 | Cutler | G06T 5/008 348/207.1 |
| 2004/0008423 A1 * | 1/2004 | Driscoll, Jr. | G02B 13/06 359/725 |
| 2004/0233274 A1 * | 11/2004 | Uyttendaele et al. | 348/36 |
| 2005/0041100 A1 * | 2/2005 | Maguire, Jr. | 348/121 |
| 2005/0062845 A1 * | 3/2005 | Mills | G06F 3/04815 348/36 |
| 2006/0023105 A1 * | 2/2006 | Kostrzewski | G06T 3/0018 348/335 |
| 2007/0182812 A1 * | 8/2007 | Ritchey | H04N 5/2254 348/36 |
| 2009/0034086 A1 * | 2/2009 | Montgomery | G03B 35/10 359/629 |
| 2009/0040291 A1 | 2/2009 | McCall et al. | |
| 2010/0045773 A1 * | 2/2010 | Ritchey | G02B 13/06 348/36 |
| 2010/0111489 A1 * | 5/2010 | Presler | 386/52 |
| 2011/0043606 A1 | 2/2011 | Yang | |
| 2011/0128349 A1 * | 6/2011 | Theobald | 348/36 |
| 2011/0141141 A1 * | 6/2011 | Kankainen | G01C 21/3647 345/632 |
| 2011/0214072 A1 * | 9/2011 | Lindemann | G01C 11/02 715/757 |
| 2011/0255000 A1 * | 10/2011 | Weber | G03B 17/02 348/374 |
| 2013/0063550 A1 * | 3/2013 | Ritchey | G03B 37/00 348/36 |

OTHER PUBLICATIONS

Ladybug 3 Camera by Point Grey Research (2011), http://www.ptgrey.com/products/ladybug3/Ladybug3_360_video_camera.asp.

RealityLens [Adaptor] (2008), http://www.realitylens.net/lensInfo.html.

* cited by examiner

FIG. 11

```
1.   // circular to rectilinear conversion
2.   // © Paul Bourke
3.
4.   function __image main(__image src) {
5.       return fish2sphere.apply(src.definition, null, src); }
6.
7.   kernel vec4 fish2sphere(sampler src) {
8.       vec2 pfish;
9.       float theta,phi,r;
10.      vec3 psph;
11.
12.      float FOV = 3.141592654;    // FOV of the lens
13.      float width = samplerSize(src).x;
14.      float height = samplerSize(src).y;
15.
16.      // Polar angles
17.      theta = 2.0 * 3.14159265 * (destCoord().x / width - 0.5);
18.      phi = 3.14159265 * (destCoord().y / height - 0.5);
19.
20.      // Vector in 3D space
21.      psph.x = cos(phi) * sin(theta);
22.      psph.y = cos(phi) * cos(theta);
23.      psph.z = sin(phi);
24.
25.      // Calculate circular angle and radius
26.      theta = atan(psph.z,psph.x);
27.      phi = atan(sqrt(psph.x*psph.x+psph.z*psph.z),psph.y);
28.      r = width * phi / FOV;
29.
30.      // Pixel in circular space
31.      pfish.x = 0.5 * width + r * cos(theta);
32.      pfish.y = 0.5 * width + r * sin(theta);
33.
34.      return sample(src, pfish);   }
```

FIG. 13C
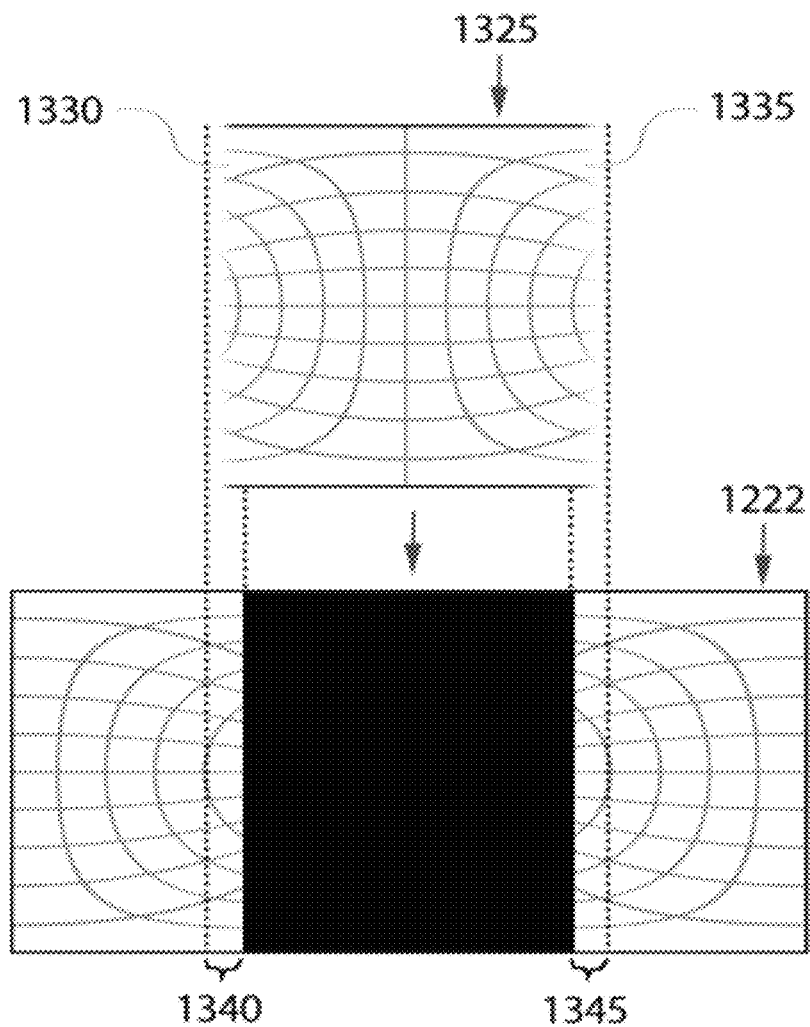
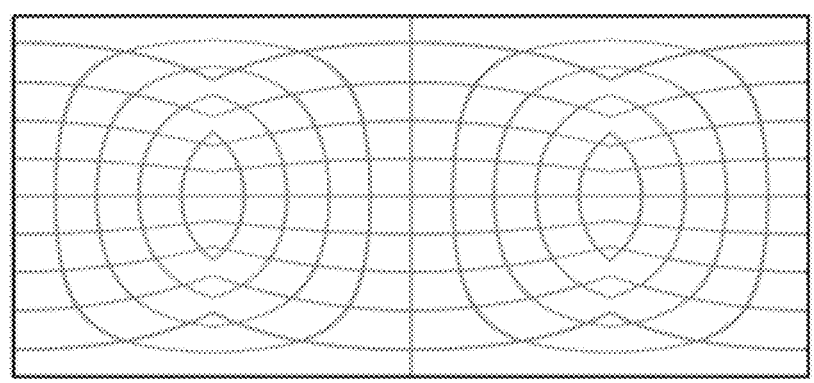

1.  <?xml version = '1.0'?>
2.  <!-- location metadata -->
3.  <location>
4.    <time='00104301' latitude='38.6304310438' longitude='-90.2967007288'/>
5.    <time='00104302' latitude='38.6304310438' longitude='-90.2967007288'/>
6.    <time='00104303' latitude='38.6310093476' longitude='-90.2966256269'/>
7.    <time='00104304' latitude='38.6310093476' longitude='-90.2966256269'/>
8.    <time='00104305' latitude='38.6317720311' longitude='-90.2965290674'/>
9.    <time='00104306' latitude='38.6317720311' longitude='-90.2965290674'/>
10. </location>

FIG. 18

1.  <?xml version = '1.0'?>
2.  <!-- orientation metadata -->
3.    <orientation>
4.      <time='00104301' accelerometer='0,0,0' gyroscope='0,0,0'/>
5.      <time='00104302' accelerometer='0.1,0,0" gyroscope='0.1,0,0'/>
6.      <time='00104303' accelerometer='0.2,0,0" gyroscope='0.3,0,0'/>
7.      <time='00104304' accelerometer='0.3,0,0" gyroscope='0.3,0,0'/>
8.      <time='00104305' accelerometer='0.4,0,0" gyroscope='0.3,0,0'/>
9.      <time='00104306' accelerometer='0.5,0,0" gyroscope='0.3,0,0'/>
10.   </orientation>

FIG. 29B

```
1.   // © Jason Villmer 2012
2.   internal function init3D(e:Event) : void {
3.      var window:SpriteVisualElement;
4.          window = new SpriteVisualElement();        // create 2D container
5.          window.width = stage.stageWidth;
6.          window.height = stage.stageHeight;
7.      stage.addChild(window);                        // add 2D container to application
8.
9.      var view:View3D;
10.         view = new View3D();                       // create 3D environment (using 3D API)
11.         view.camera = new Camera3D;                // create 3D Render Camera
12.         view.camera.position = new Vector3D(0, 0, 0);   // center camera
13.         view.camera.zoom = 3.5;                    // set render camera default zoom
14.         view.camera.rotationX = 0;                 // set render camera x-axis rotation
15.         view.camera.rotationY = 0;                 // set render camera y-axis rotation
16.         view.camera.rotationZ = 0;                 // set render camera z-axis rotation
17.     window.addChild(view);                         // add 3D environment to 2D container
18.
19.     var material:VideoMaterial;
20.         material = new VideoMaterial();            // create new video texture material
21.         material.loop = true;
22.         material.smooth = true;
23.         material.file = "equirectangular.mov";     // spherical video file
24.
25.     var sphere:Sphere = new Sphere();              // create new Render Sphere
26.         sphere.material = material;                // use spherical video file as material
27.         sphere.bothsides=true;
28.         sphere.radius = 2000;
29.         sphere.segmentsW = sphere.segmentsH = 43;  // set render quality
30.         sphere.rotationX = 0;                      // set render sphere x-axis rotation
31.         sphere.rotationY = 0;                      // set render sphere y-axis rotation
32.         sphere.rotationZ = 0;                      // set render sphere z-axis rotation
33.     view.scene.addChild(sphere) }                  // add render sphere to 3D environment
```

FIG. 31A
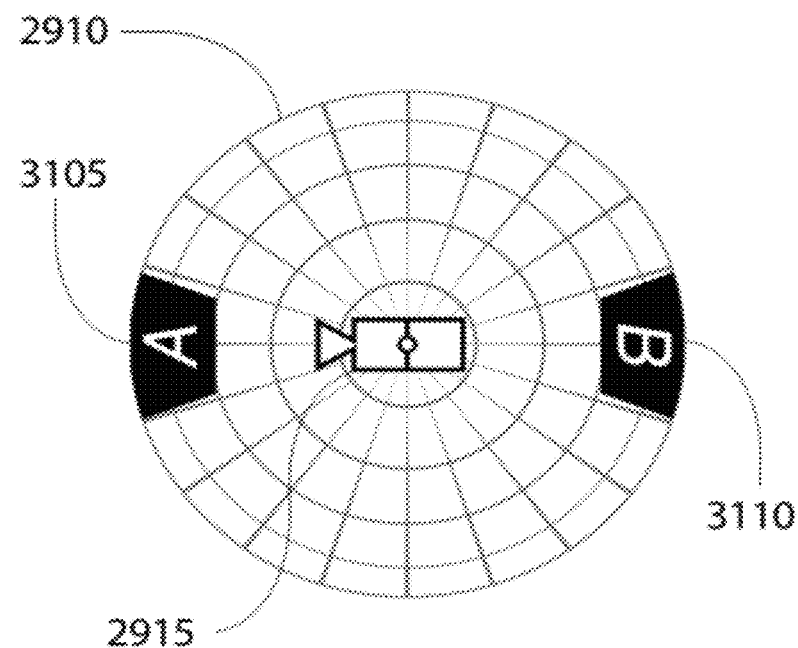
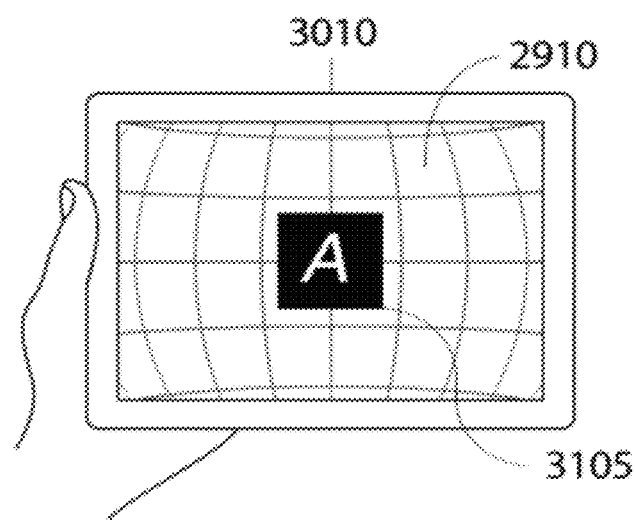

FIG. 31B
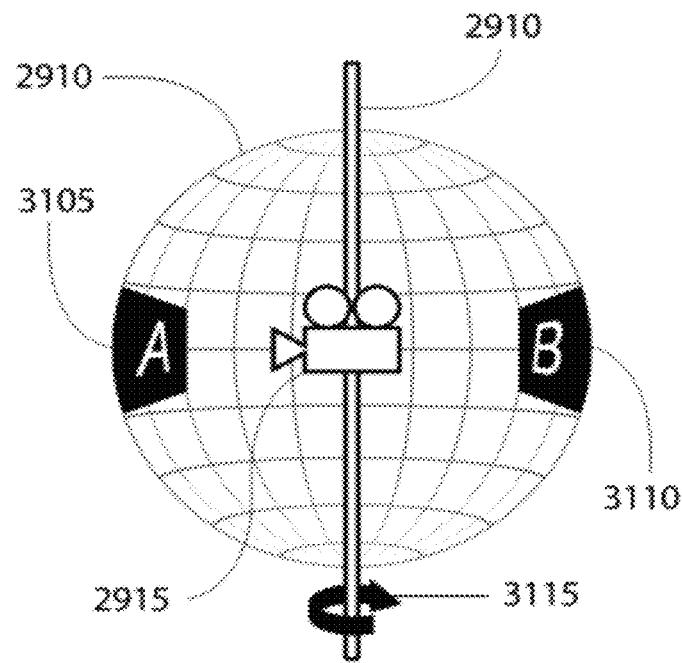
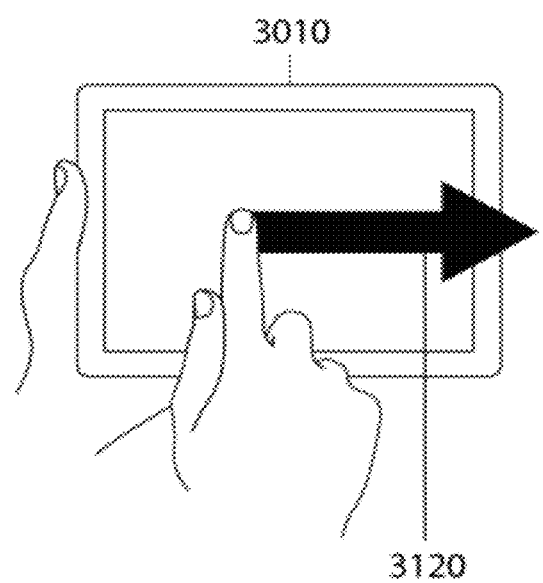

FIG. 31C
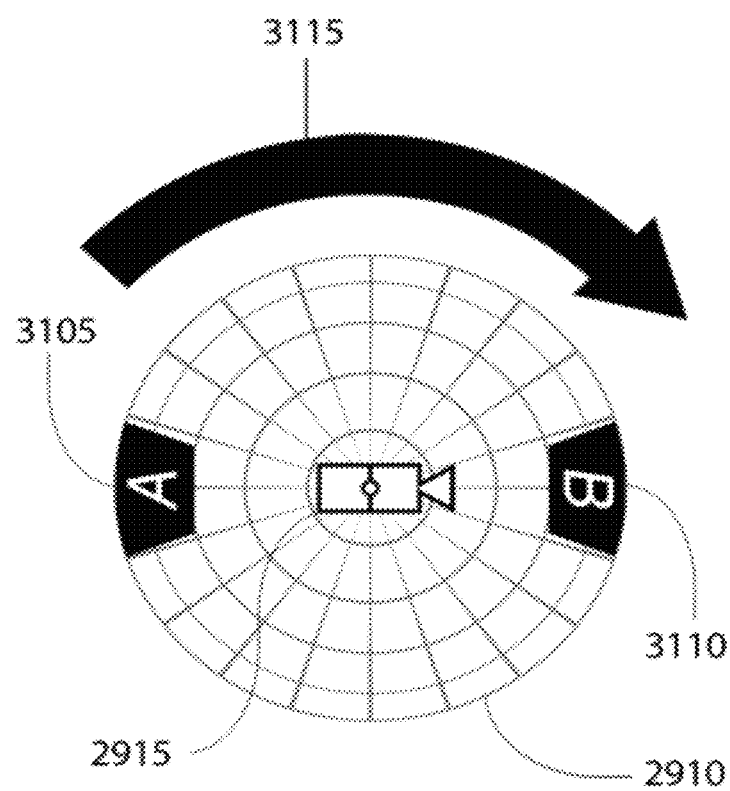
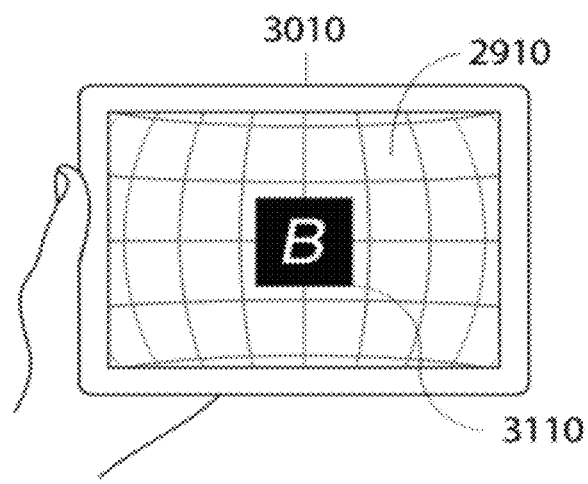

FIG. 32

```
1.  // © Jason Villmer 2012
2.  internal var point:Point;                        // defines location touched on the screen
3.  internal var down:Boolean;                       // whether screen is being touched
4.  internal var currPan:Number;                     // current y-axis rotation value of render camera
5.  internal var currTilt:Number;                    // current x-axis rotation value of render camera
6.
7.  protected function listen(e:Event) : void {
8.      // function to perform when finger touches screen
9.      window.addEventListener(MouseEvent.MOUSE_DOWN, touchBegin);
10.     // function to perform when finger is removed from screen
11.     window.addEventListener(MouseEvent.MOUSE_UP, touchEnd);
12.     // function to perform when a zoom gesture is performed on screen
13.     window.addEventListener(TransformGestureEvent.GESTURE_ZOOM,onZoom);}
14.
15. protected function touchBegin(e:MouseEvent) : void {
16.     // add function to evaluate finger position as it moves
17.     addEventListener(MouseEvent.MOUSE_MOVE,fingerMove);
18.     down = true;                                  // recognize that finger is touching screen
19.     point = new Point(mouseX,mouseY);             // determine where the screen is touched
20.     currPan = view.camera.rotationY;              // set currPan to current y-axis rotation
21.     currTilt = view.camera.rotationX;    }        // set currTilt to current y-axis rotation
22.
23. protected function fingerMove(e:MouseEvent) : void {
24.     if (down == true){                            // evaluate if finger is touching screen
25.         // adjusts render camera y-axis rotation value (pan)
26.         view.camera.rotationY = currPan+(point.x-mouseX)*-0.5;
27.         // adjusts render camera x-axis rotation value (tilt)
28.         view.camera.rotationX = currTilt+(point.y-mouseY)*0.5; };   }
29.
30. protected function onZoom(e:TransformGestureEvent) : void {
31.     view.camera.zoom *= e.scaleX; }               // adjust render camera zoom value
32.
33. protected function touchEnd(e:MouseEvent) : void {
34.     // remove function evaluating finger position
35.     removeEventListener(MouseEvent.MOUSE_MOVE,fingerMove)
36.     down = false; }                               // recognize finger is not touching screen
```

FIG. 34A
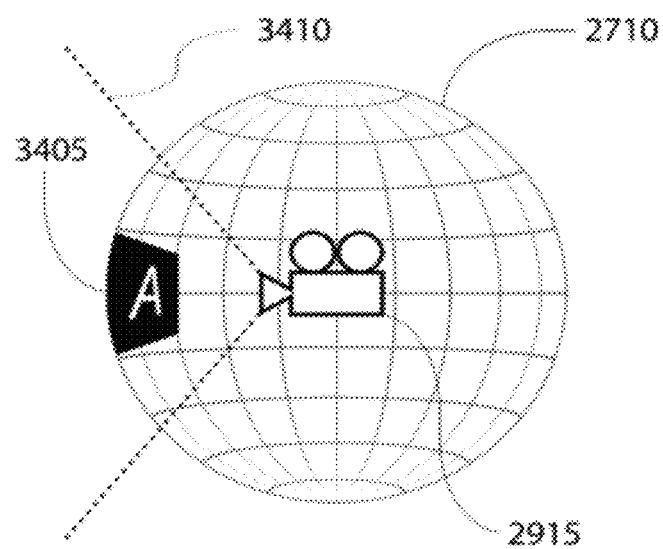
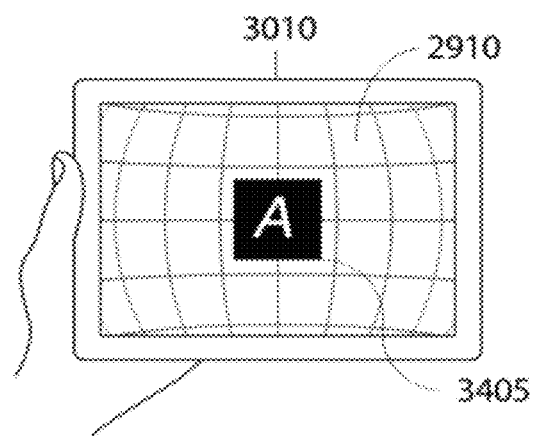

FIG. 34C
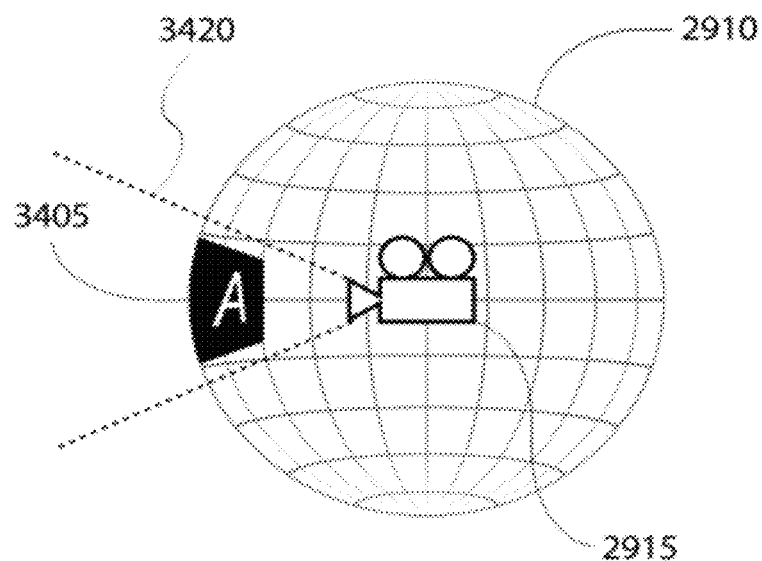
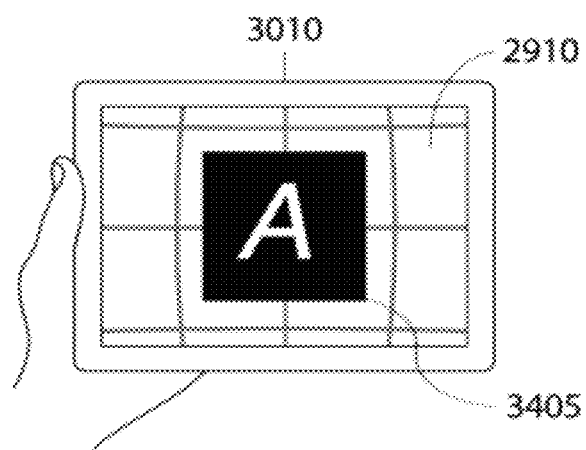

FIG. 37A
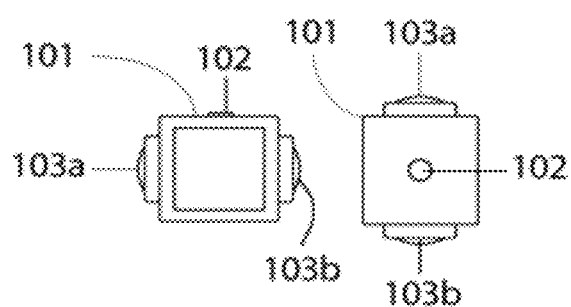
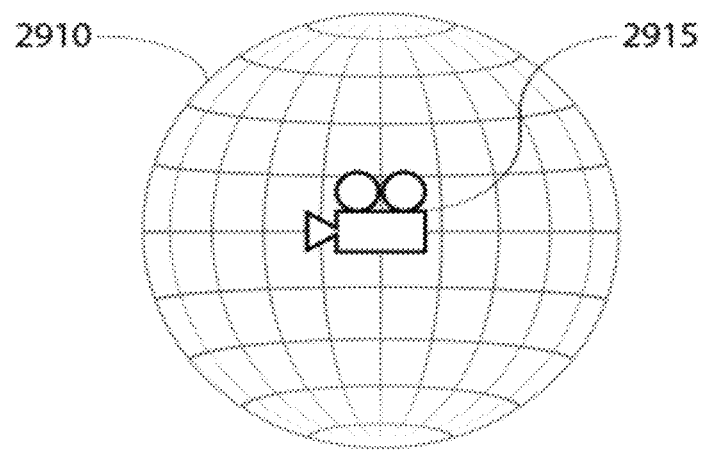

OMNI-DIRECTIONAL CAMERA AND RELATED VIEWING SOFTWARE

BACKGROUND

Creating high-resolution spherical video, i.e., video that captures a complete 360 degree by 360 degree field of view, is currently a complex and arduous process requiring specialized hardware and software systems that are often expensive, inadequate, unreliable, hard to learn, and difficult to use. Presently, creating this video requires an omni-directional, spherical camera that includes a customized hardware device and/or system utilizing multiple cameras to simultaneously capture video from multiple directions to create spherical video files. Spherical video files derived from such systems are used in conjunction with specialized software applications, called spherical viewers. Spherical viewers allow the user to interactively look around inside a spherical environment, giving them the impression that they are actually within the pre-recorded or live scene itself. Spherical viewers can be developed for the web, desktop, and mobile devices. How the spherical viewer is developed will depend entirely on the kind, and number, of video files the spherical camera system produces.

Currently, there are two primary types of omni-directional recording systems: adaptors, i.e., lens mounts; and spherical camera heads. The primary limitation of both systems is that they are incapable of functioning without the utilization of additional hardware components that must be purchased, configured, and used together to form a piecemeal operational solution. Because these existing systems require multiple components to function, the inherent risk for malfunction or recording problems increases. For example, if one component in either piecemeal system fails, the entire system fails to operate adequately or at all. In addition to the added risk of malfunction, there are also the added costs to purchasing these extra components and ensuring that each extra component is capable of appropriately interacting with all of the other components.

Furthermore, lens adaptors are not, by their very nature, designed to record content. These adaptors are instead designed to rely on separate recording devices, such as a camcorders to which the adaptors are attached, to acquire content and create a video file. In most cases, unless the adaptor was designed for a specific camera, results from these systems are often unpredictable, inadequate, and inconsistent. Because these adaptors are often not designed for specific cameras but are instead generic, both the adaptor and the camera system must be calibrated and adjusted once the adaptor has been attached. This most often requires that additional components be attached between the adaptor and the camera, such as mounting rings, with each additional component affecting the quality, consistency, and reliability of the resulting video file.

In the case of generic adaptors, it is left to the consumer to properly configure the camera to yield the best results, often with little or no documentation, suggestions, or support on how to properly configure the camera to operate with the generic lens adaptor. As a result, it usually takes a considerable amount of the consumer's time and patience to get the system working adequately. In some cases, despite one's best efforts, a particular camera is not able to yield good results from an adaptor regardless of what is done. In the end, the adaptor approach does not provide an adequate means for recording spherical video.

Spherical camera heads, like the lens adaptors described above, also require separate specialized hardware components to operate. The camera head unit typically requires a separate, independent computer attached to the camera head, such as a high-performance laptop computer. The Immersive Media Dodeca 2360 and the Ladybug 3 camera by Point Grey Research are two examples of such systems. The Ladybug 3 is a five pound spherical camera comprised of six lenses integrated into a single housing unit. The cost of the system is extremely high ($18,000) and requires the purchase of additional equipment to appropriately power and operate the camera. Generally, a portable configuration requires a specialized, custom configured laptop to operate the camera for capturing video. These custom laptops, however, often require both custom hardware and software to operate sufficiently. These include specific Operating Systems ("OS" or "OSes") that will work with the camera's specific Software Development Kit ("SDK"), large amounts of RAM, fast processors, specific hardware ports (e.g., FireWire 800) and high-speed hard drives capable of acquiring the data from the camera, such as the Intel X25-M Solid State Drive. Also, because the camera consumes a significant amount of power during operation, additional power sources are often required to provide enough power for all the various components, such as multiple laptop batteries and/or other external (portable) power sources. These camera heads provide no audio support, requiring the addition of even more components, i.e., audio acquisition components, to these piecemeal systems.

Moreover, these existing systems do not provide sufficient software for delivering this content to the public, either on the desktop, Internet, or a mobile device. The consumer must once again purchase additional, 3rd party software designed to handle the spherical media file formats. All of these combined components and elements make the resulting systems expensive to operate, with costs easily exceeding $25,000 or more, and needlessly complex with multiple points of potential failure. Worse still is that, due to the incredible number of elements involved, the stability and reliability of these systems is poor, often resulting in unacceptable video quality, such as dropped video frames, or complete system shutdowns during production. Creating spherical video with the present existing systems requires that the consumer be both financially and technically affluent, as well as requiring a tremendous amount of patience.

Another significant limitation of the existing systems is their inability to natively interface with mobile devices such as smart phones and tablets. As noted above, the video must be first captured by either a camcorder with an appropriate lens adaptor or a camera head and then processed by a highly customized computer capable of creating spherical video files. In other words, the inherent limitations of the existing systems prevent a consumer from using their existing mobile devices, such as iPhones, iPads, and Android devices, to work natively with these camera systems.

Furthermore, none of the existing systems permit a consumer to immediately create and share spherical video content with others online.

Overall, these complex and expensive systems are primarily suited for those with a background in computer hardware and software technology with a significant budget to spend, rather than the common consumer. However, even those consumers with a background considered suitable for these systems will still be confronted by a significant lack of clear operational guidelines and support due to the piecemeal nature of these systems. Due to these significant limiting factors, omni-directional video is not currently being recognized, understood, or embraced by consumers and the general public. Instead, it been has restricted to only those with both the financial means to afford the technology and the technical background to understand and use it fully.

SUMMARY

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

A camera device embodying aspects of the invention comprises a camera device housing and a computer processor for operating the camera device, with the computer processor being located inside the housing. The camera device further includes a plurality of cameras, each of the cameras having a lens attached thereto located outside the housing and oriented in different directions for acquiring image data, and at least one microphone for acquiring audio data corresponding to the acquired image data. The camera device further includes a system memory having stored thereon computer-processor executable instructions for operating the camera device. The computer-processor executable instructions include instructions for initiating an acquisition sequence to synchronously acquire image data from the plurality of cameras and audio data from the at least one microphone synchronously with the image data acquisition. The instructions further include instructions for processing the image data and encoding the image data and the acquired audio data into a media file. The instructions further include instructions for saving the media file to a system memory.

According to another aspect, a method for viewing a spherical video including directional sound created by a camera in a spherical video viewer includes receiving, at the computing device, the spherical video and then generating, at the computing device, a three-dimensional virtual environment. The method further includes creating, at the computing device, a render sphere within the virtual environment, applying, at the computing device, the spherical video as a texture to the interior of the render sphere, and positioning, at the computing device, a virtual render camera at the center of the render sphere. The render camera defines a user view of the spherical video playing on the interior of the render sphere, with the view being determined by one or more properties of the render camera including rotational position of the camera about the camera's x-axis, y-axis, and z-axis, and a field-of-view value defining a camera zoom. The method also includes displaying, on a display device of the computing device, the user view to the user, with the user view including directional audio that varies with the position of rotational position of the camera, and receiving, at the computing device, user input to change the view. Additionally, the method includes changing, at the computing device, one or more properties of the virtual render camera about one or more of the camera axes in response to the received user input to change the view, where changing the properties includes at least one of changing one or more of the rotational properties of the camera and changing a field-of-view value and then updating, at the computing device, the user view including the directional audio based in response to changing the one or more camera properties.

Yet another aspect provides a system for creating omnidirectional video with directional audio for viewing by a video viewer. The system includes a video capture device comprising at least a first camera with a first lens attached thereto for acquiring a first video image and a second camera with a second lens attached thereto for acquiring a second video image, with the cameras being oriented on or about the video capture device such that the first video image and the second video image include video images of substantially 360 degrees about a central point. The system also includes at least a first microphone oriented for acquiring audio corresponding to the first video image and at least a second microphone oriented for acquiring audio corresponding to the second video image, a positional information acquisition device for acquiring position information for the video capture device, and a orientation information acquisition device for acquiring orientation information for the video capture device indicating rotation of the video capture device about one or more axis. The system additionally include a computer for operating the camera device and one or more computer-readable storage media having stored thereon computer-processor executable instructions for operating the camera device. The computer-processor executable instructions include instructions for acquiring first image data and second image data synchronously from the first camera and the second camera respectively, acquiring audio data from the first microphone and second microphone synchronously with the image data acquisition, adjusting one or more visual properties of the acquired first image data and the second image data, and converting the adjusted first image data and the adjusted second image data by applying one or more mathematical transformations to the corrected first image data and the corrected second image data. The instructions further include instructions for creating a spherical image from the converted first image data and the converted second image data, encoding the spherical image and the acquired audio data, and transferring the encoded image and audio data, the acquired positional information, and the acquired orientation information to at least one of a user computing device, a web server, and a storage device of the camera device.

These and other aspects are described in more detail below.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIG. 11 illustrates an example set of computer program instructions for performing a circular-to-rectilinear image conversion.

FIGS. 13A-13C further illustrate a conversion of two images into a spherical, equirectangular image through masking, blending, and merging.

FIG. 18 shows an exemplary XML data structure storing rotational information.

FIGS. 29A-29C illustrates a spherical equirectangular image file being applied to the interior surface of a render sphere in a three-dimensional computer-generated environment with a render camera at its center, sample computer program code for performing these actions, and the axis about which the render camera can rotate within the render sphere.

FIGS. 31A-31C illustrate an example of a user directing a viewer application to pan the render camera to the right.

FIG. 32 shows an example computer program listing for rotating the render camera about one or more of its axis within the render sphere.

FIGS. 34A-34C illustrate an example of a user directing a viewer application to zoom in on a particular point within the render sphere.

FIG. 37A-37B illustrate two rotational examples of an embodiment of a camera device.

$$V = 360°/T$$

Figure 48:
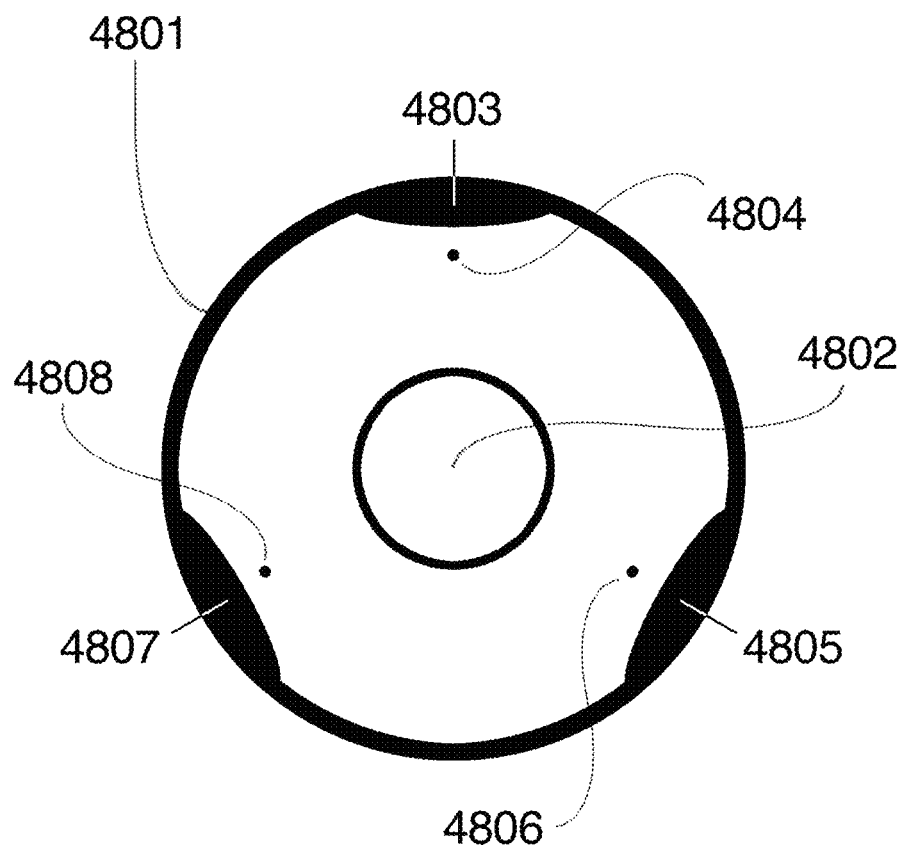

FIG. 48 illustrates a top view of an embodiment of the invention showing a device housing 4801, an interface control 4802, a first lens 4803 with it's corresponding microphone 4804, a second lens 4805 with it's corresponding microphone 4806 and a third lens 4807 with it's corresponding microphone 4808.

Figure 49:
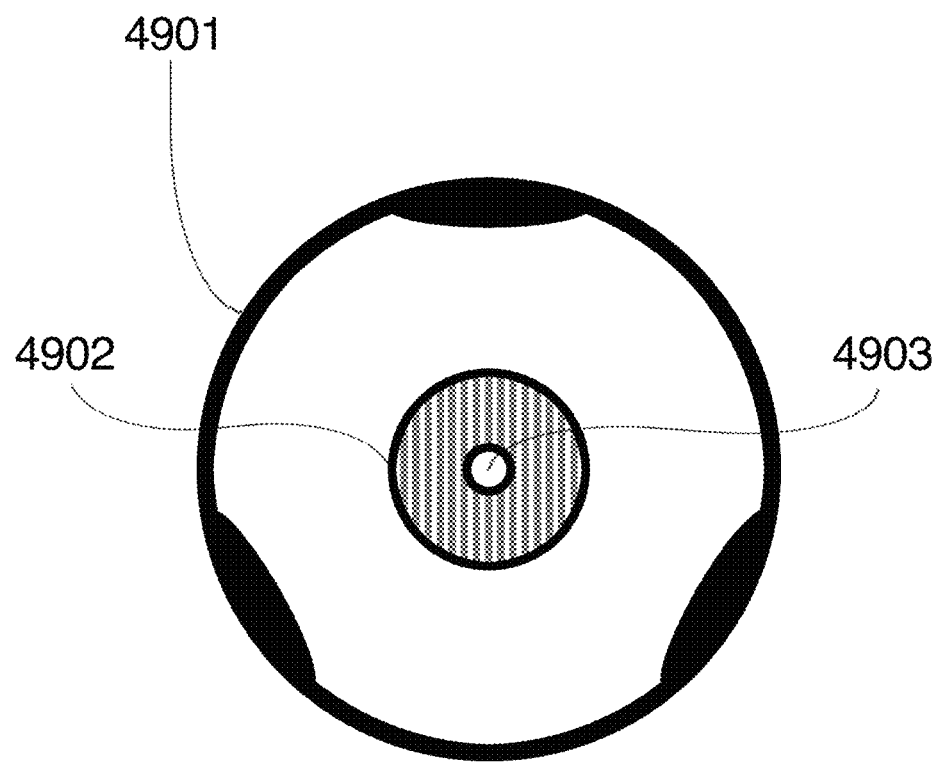

FIG. 49 illustrates a bottom view of an embodiment of the invention showing a device housing 4901, a flat base 4902 and a threaded hole 4903 for a tripod.

Figure 50:
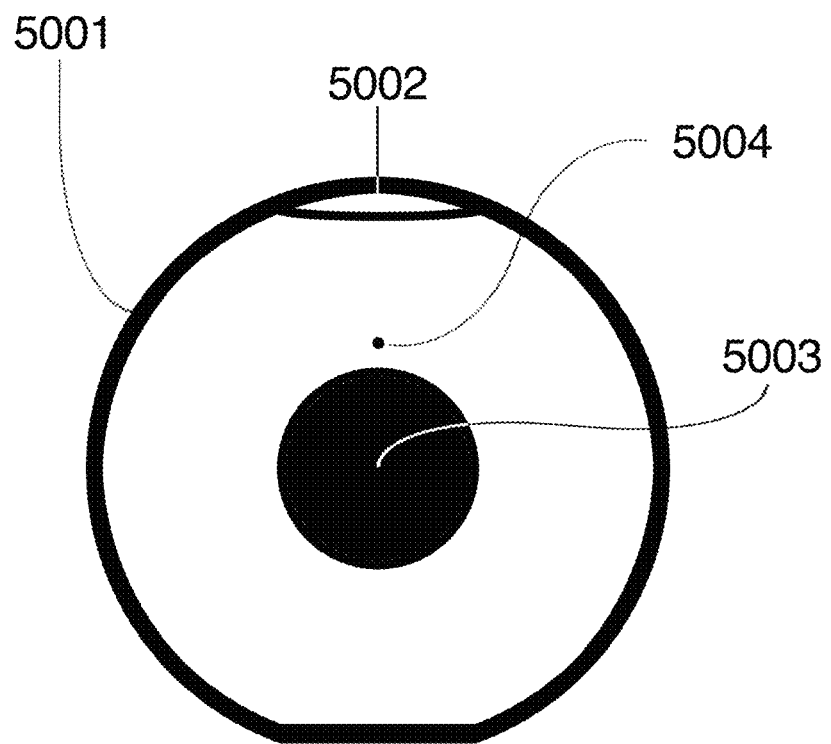

FIG. 50 illustrates a front view of an embodiment of the invention showing a device housing 5001, an interface control 5002 and a lens 5003 with it's corresponding microphone 5004.

Figure 51:
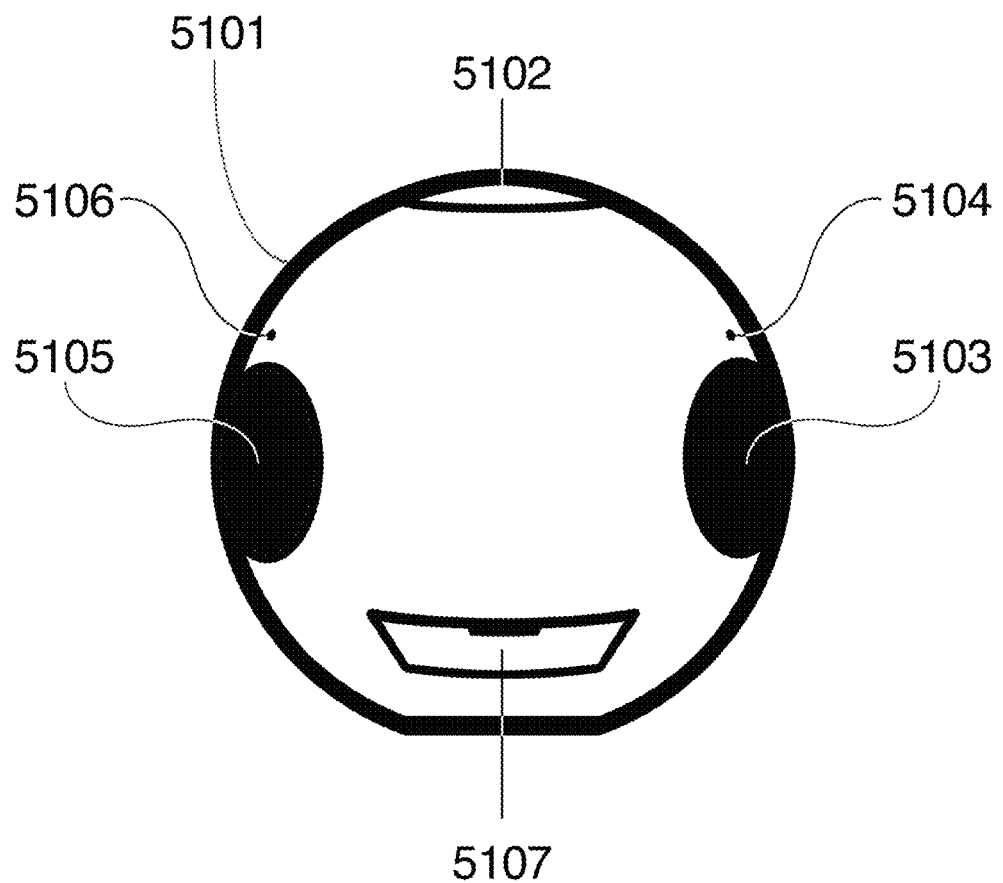

FIG. 51 illustrates a back view of an embodiment of the invention showing a device housing 5101, an interface control 5102, a lens 5103 with it's corresponding microphone 5104, a second lens 5105 with it's corresponding microphone 5106 and a compartment 5107 containing a removable battery (not shown), an input/output port (not shown) and slot for accepting a card based memory device (not shown).

Figure 52:
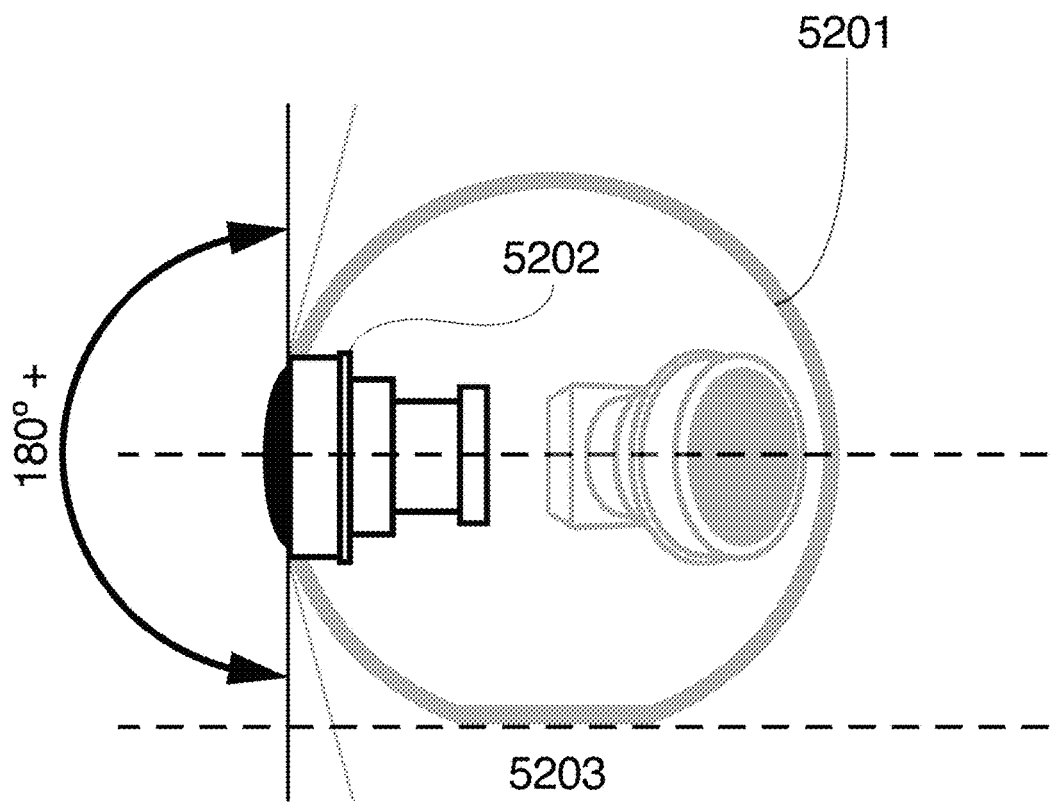

FIG. 52 illustrates a side view of an embodiment of the invention showing a device housing 5201 with a lens 5202 that is parallel to the base of the housing 5203. Said lens 5202 having a vertical field of view of at least 180°.

Figure 53:
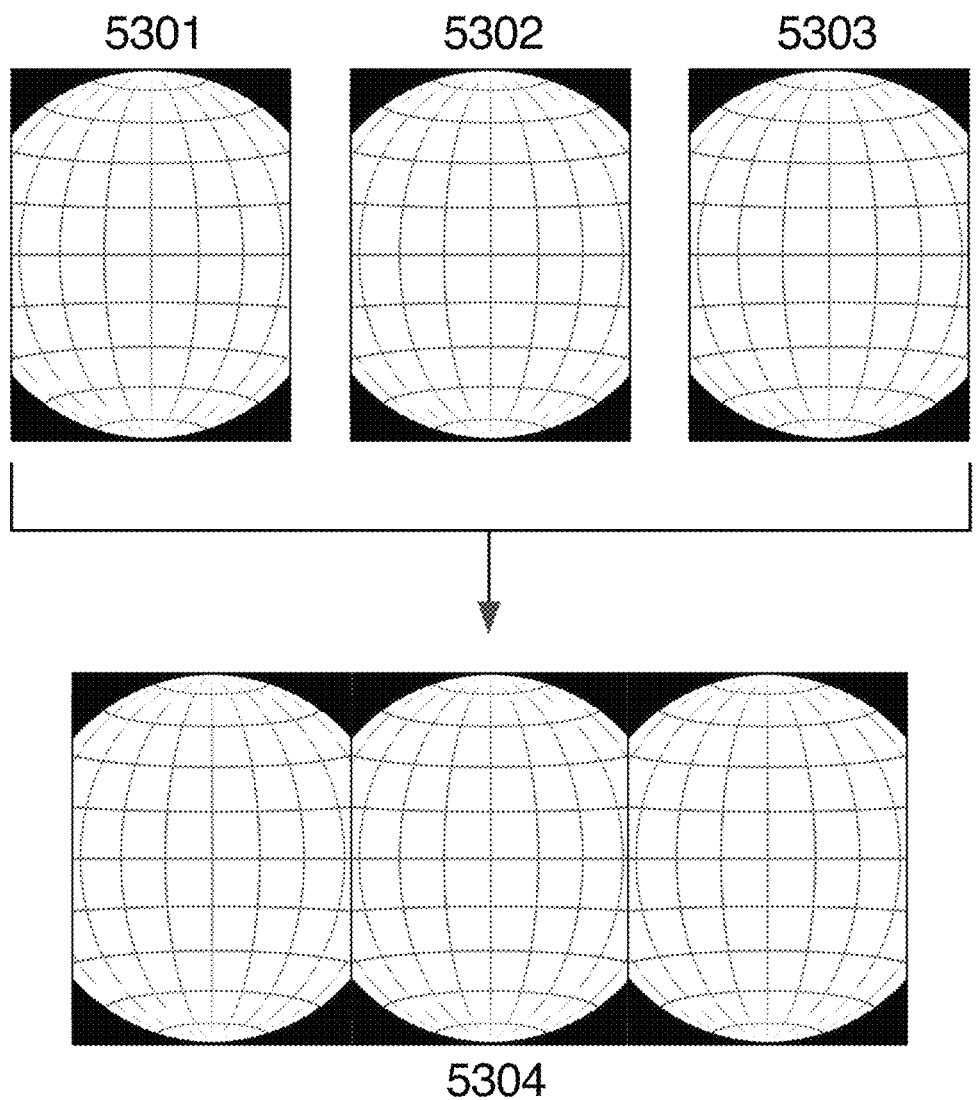

FIG. 53 illustrates an example of the computer-processor executable instructions placing the image data acquired from a first sensor 5301, a second sensor 5302 and a third sensor 5303 in an edge-to-edge arrangement to form a single image 5404.

Figure 54:
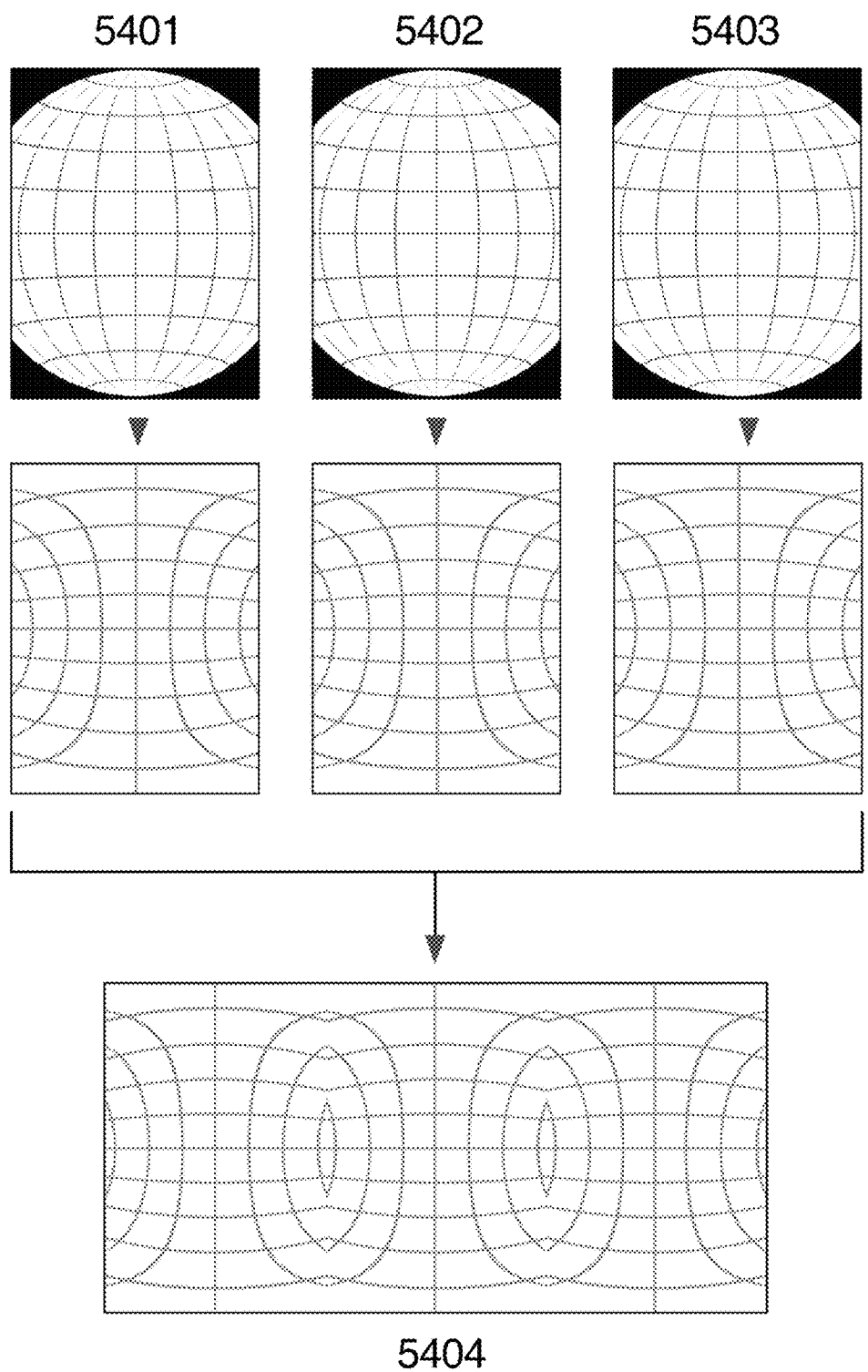

FIG. 54 illustrates an example of the computer-processor executable instructions seamlessly combining the image data acquired from a first sensor 5401, a second sensor 5402 and a third sensor 5403 to form a single spherical image 4404.

Figure 55:
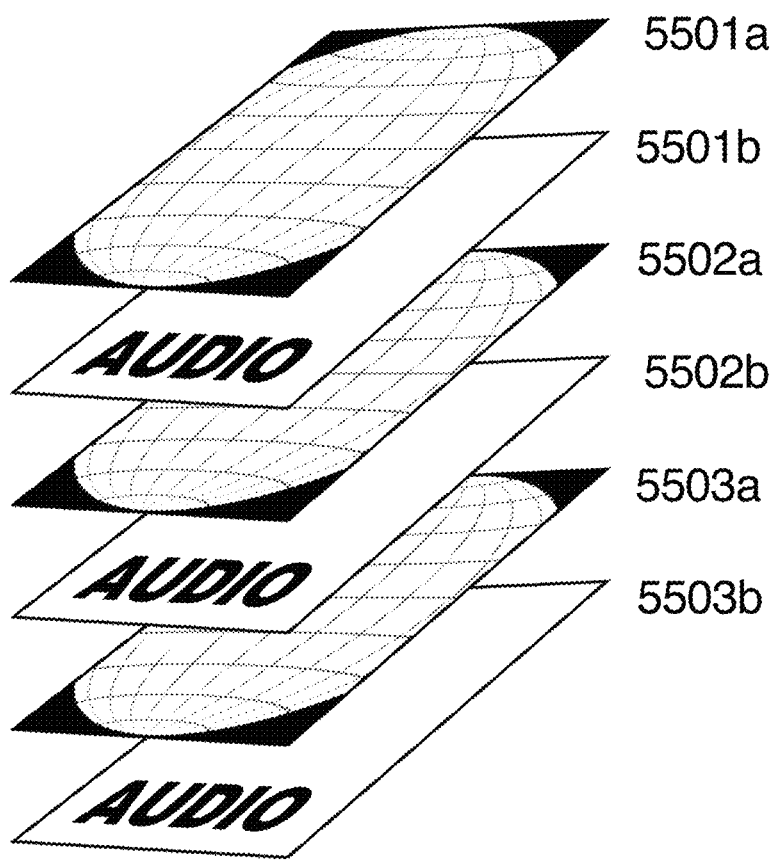

FIG. 55 illustrates an example of the computer-processor executable instructions adding the image data acquired from a first sensor 5501a and the audio data from its corresponding microphone 5501b to individual media tracks, adding the image data acquired from a second sensor 5502a and the audio data from its corresponding microphone 5502b to individual media tracks and adding the image data acquired from a third sensor 5503a and the audio data from its corresponding microphone 5503b to individual media tracks in the media container.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
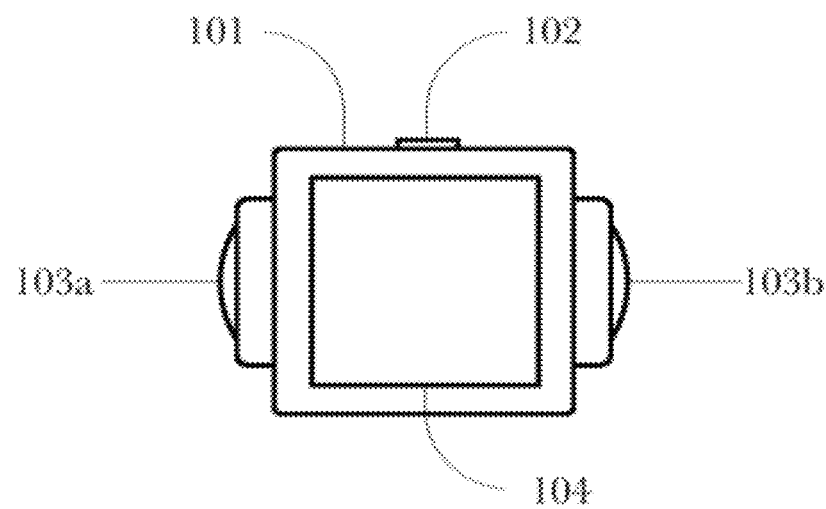
FIG. 1 illustrates a left view of an embodiment of the camera device according to various aspects described herein.

Embodiments of the invention include an omni-directional recording and broadcasting device, herein also referred to as a "spherical camera," as an integrated, self-contained, self-powered electronic device utilizing a plurality of cameras to capture a complete 360 degree by 360 degree field of view, as illustrated in FIG. 1 showing a left view of an exemplary device. It should be noted that the term "spherical" does not refer to the shape of the device itself, but instead the camera device's ability to record and/or broadcast a substantially 360 degree by 360 degree "spherical" video environment. However, in some embodiments, the housing of device 101 is a spherical housing. In the illustrated embodiment, the device 101 has a cube-shaped housing that includes a single, multi-purpose power button 102, two cameras 103A and 103B, to capture a spherical environment, and a touch screen 104.

In other embodiments, at least one of the cameras utilizes a hyper-hemispherical lens capable of capturing a field of view greater than 180 degrees, with the remaining camera(s) using either hemispherical (180 degree) or sub-hemispherical (<180 degree) lenses. The number of cameras needed to capture a spherical field of view depends on the field of view of each lens used. For example, acquiring a spherical field of view can be accomplished using two cameras coupled with hemispherical or hyper-hemispherical lenses, while three or more cameras each coupled with a sub-hemispherical lens could be used to acquire a spherical field of view. In other words, any combination of sub-hemispherical, hemispherical, and hyper-hemispherical lens may be used so long as the image data acquired from the plurality of cameras collectively represents a substantially spherical field of view.

Embodiments of device 101 may include a special purpose or general purpose computer and/or computer processor including a variety of computer hardware, as described in greater detail below. Embodiments of device 101 may further include one or more computer-readable storage media having stored thereon firmware instructions that the computer executes to operate the device as described below. In one or more embodiments, the computer and/or computer processor are located inside the device 101, while in other embodiments, the computer and/or computer processor are located outside or external to device 101.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIGS. 1-46 and the following discussion are intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Touch screen 104 comprises a liquid crystal display ("LCD") or any other suitable device or element that senses or otherwise registers a user selection by way of touching the device or element. It is to be understood that the device 101 may use other types of user input devices known in the art.

Figure 2:
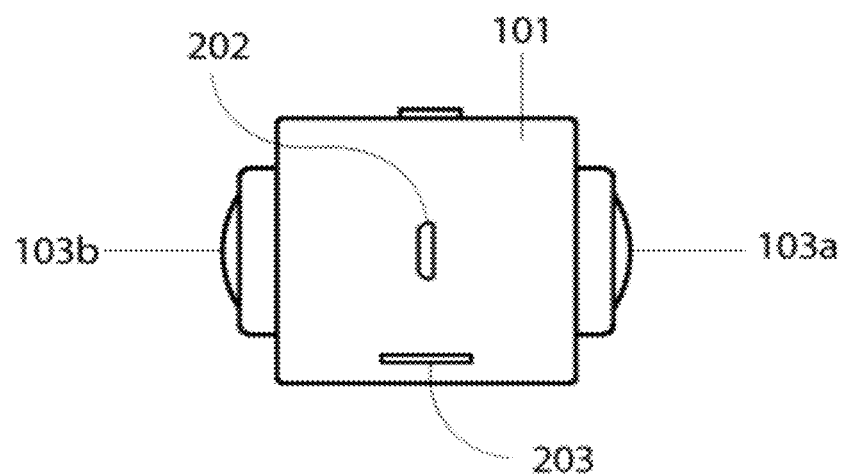
FIG. 2 illustrates a right view of an embodiment of the camera device according to various aspects described herein.

FIG. 2 illustrates a right view of the exemplary device 101. In the illustrated embodiment, the device 101 includes an input/output ("I/O") port 202 for powering the device and/or transferring data to and from the device. In some embodiments, port 202 comprises a Universal Serial Bus ("USB") port or a FireWire port. The embodiment shown in FIG. 2 further includes a memory card slot 203 for accepting card-based storage, for example, standard Secure Digital High Capacity ("SDHC") cards and SDHC cards with a built-in wireless communication module. While the device 101 shown in FIG. 2 includes both a port 202 and a card slot 203, other embodiments may include only a port 202 or a card slot 203. In other embodiments, port 202 and/or card slot 203 are included in different locations on device 101, such as the top or the bottom of the device 101.

Additional embodiments may not include port 202 or card slot 203, instead relying on other storage devices and/or built-in wired/wireless hardware and/or software components for communicating the spherical video data, for example, Wi-Fi Direct technology. In these embodiments, the device 101 is capable of creating an ad-hoc wireless network, by which other computing devices may establish secure, wireless communication with the device 101. By creating a Software Enabled Access Point ("SoftAP"), the device 101 permits other wi-fi enabled computing devices, e.g., smart phones, desktop/laptop computers, tablets, etc., to automatically detect and securely connect to the device 101. In some embodiments, the user configures and initiates the ad-hoc wireless network via the touch screen 104 by entering a Personal Identification Number ("PIN"). Once the user enters the PIN, the device 101 creates the SoftAP.

Figure 3:
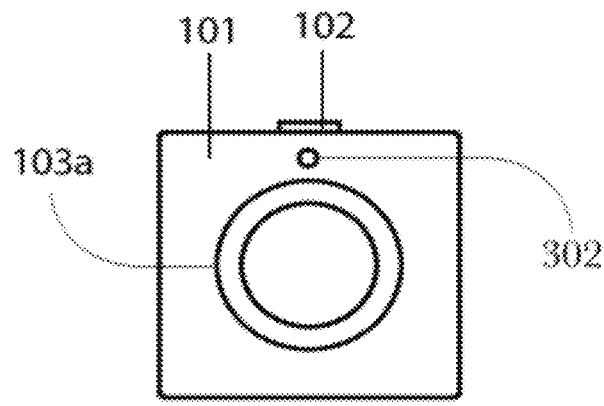
FIG. 3 illustrates a front view of an embodiment of the camera device according to various aspects described herein.
Figure 4:
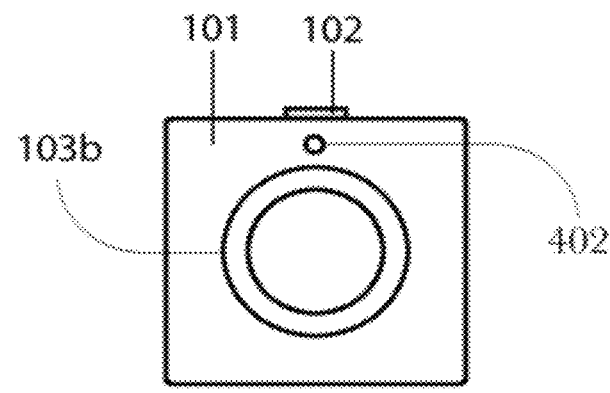
FIG. 4 illustrates a back view of an embodiment of the camera device according to various aspects described herein.
Figure 5:
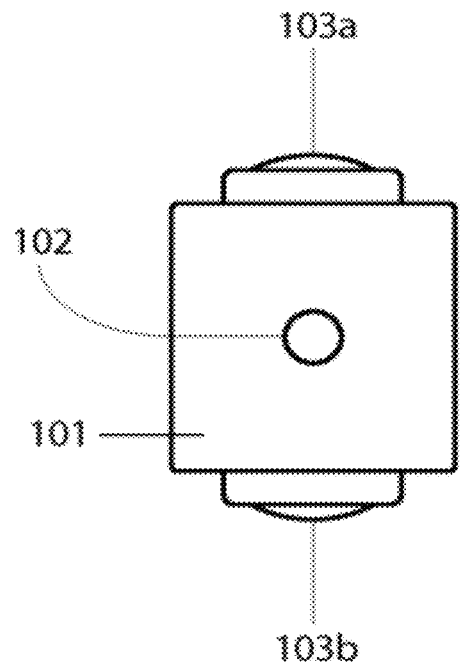
FIG. 5 illustrates a top view of an embodiment of the camera device according to various aspects described herein.
Figure 6:
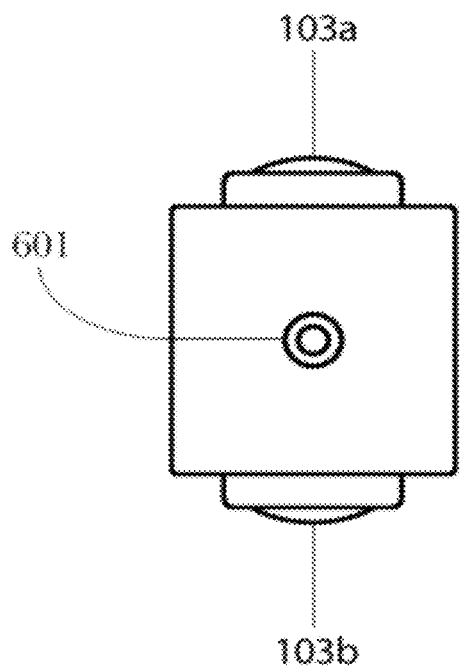
FIG. 6 illustrates a bottom view of an embodiment of the camera device according to various aspects described herein
Figure 7:
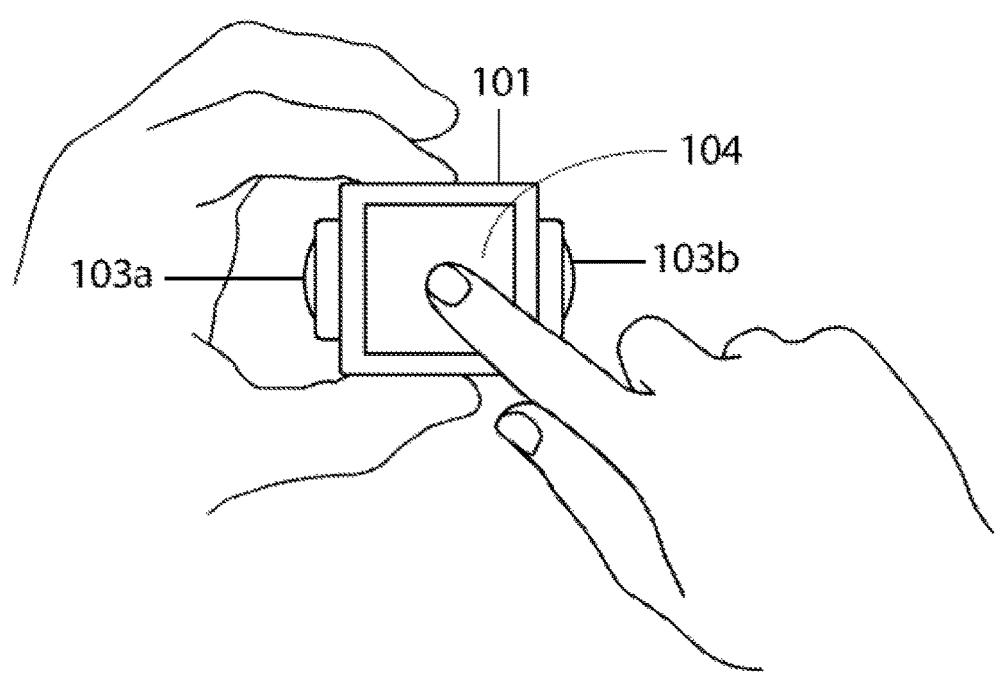
FIG. 7 illustrates an embodiment of the camera device including a touch screen, as being held by a person.

FIGS. 3 and 4 illustrate a front view and a back view of the device 101, respectively. In the illustrated embodiment, the device 101 includes a microphone 302 to capture audio in relation to the video being captured by camera 103*a*, and a microphone 402 to capture audio in relation to the video being captured by camera 103*b*. In one or more embodiments, the device 101 includes single microphone externally oriented on the device 101. FIG. 5 illustrates a top view of the device 101, while FIG. 6 demonstrates a bottom view of the device 101 including a screw mount 601 for mounting the device 101.

Referring further to FIGS. 1-6, the power button 102 provides multiple functions to the user during operation of the device 101. To power on the device 101, for example, the user holds down power button 102 for several seconds.

For power, the device 101 preferably uses one of several options: standard batteries, a single internal battery, or a replaceable, rechargeable battery system. There are benefits and drawbacks to each option. Standard batteries, such as AA and AAA batteries, are easily accessible and can be purchased in many locations. This makes the replacement of old batteries with new ones quick and easy, thus preventing significant interruptions while recording. The obvious problem to using standard batteries is sheer waste, as standard batteries are non-recyclable. If the standard batteries are used, rechargeable batteries could also be used, thus solving the issue of waste. The decision to use rechargeable batteries or not, though, would be left to the individual.

A second option incorporates an internal (non-replaceable), rechargeable battery into the device itself. This battery is easily recharged by attaching the device to a standard power outlet or through a wired connection to a PC (via USB). The drawback to this is that once the battery has been drained, the device cannot function again until the battery has been recharged. While this does offer an efficient, non-wasteful solution, it does introduce significant interruptions (wait time) in recording.

A third option is to provide a detachable, rechargeable battery system. This allows multiple batteries to be carried at once so batteries could be changed quickly. The batteries themselves can be recharged by plugging in the device to a standard power outlet socket, through a wired connection to a PC (via USB), or by using a separate recharger rack to recharge one or more batteries at once. This option allows multiple batteries to be charged and carried during production where they can be swapped easily. In one or more embodiments, the device 101 uses this rechargeable, replaceable battery system. In some embodiments, after the device 101 is turned on, the power button 102 illuminates in a first color, such as white, to indicate the device is on and ready to begin recording spherical video. In the powered-on, non-recording state, the display 104 provides a user interface to the user, allowing the user to view and change system settings, as demonstrated in FIG. 7. Once a recording sequence is initiated, the device 101 begins recording spherical video (as described below) and the button 102 (not shown in FIG. 7) illuminates in a second color, such as green.

Figure 8:
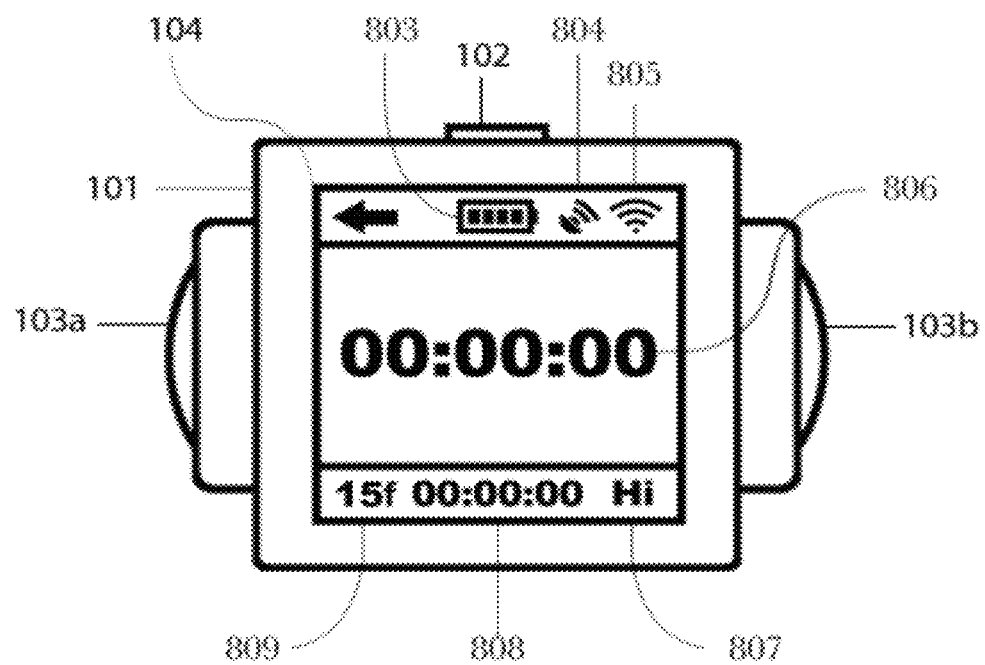
FIG. 8 illustrates an embodiment of the camera device with the display device displaying information corresponding to the operation of the camera device.

While recording, the display device 104 displays parameters, metrics, and other meaningful information regarding the video being recorded via the user interface, as illustrated in the embodiment shown in FIG. 8. In this user interface example, icons representing battery level 803, a Global Positioning System ("GPS") signal status 804, wireless communication connection status 805, current recording time 806, image quality 807, remaining recording time 808 (based on remaining SDHC card or connected device memory) and the current recording frame rate 809 are displayed to the user. These icons, however, are merely illustrative and are not inclusive of all icons and information that can be displayed to the user.

Figure 46:
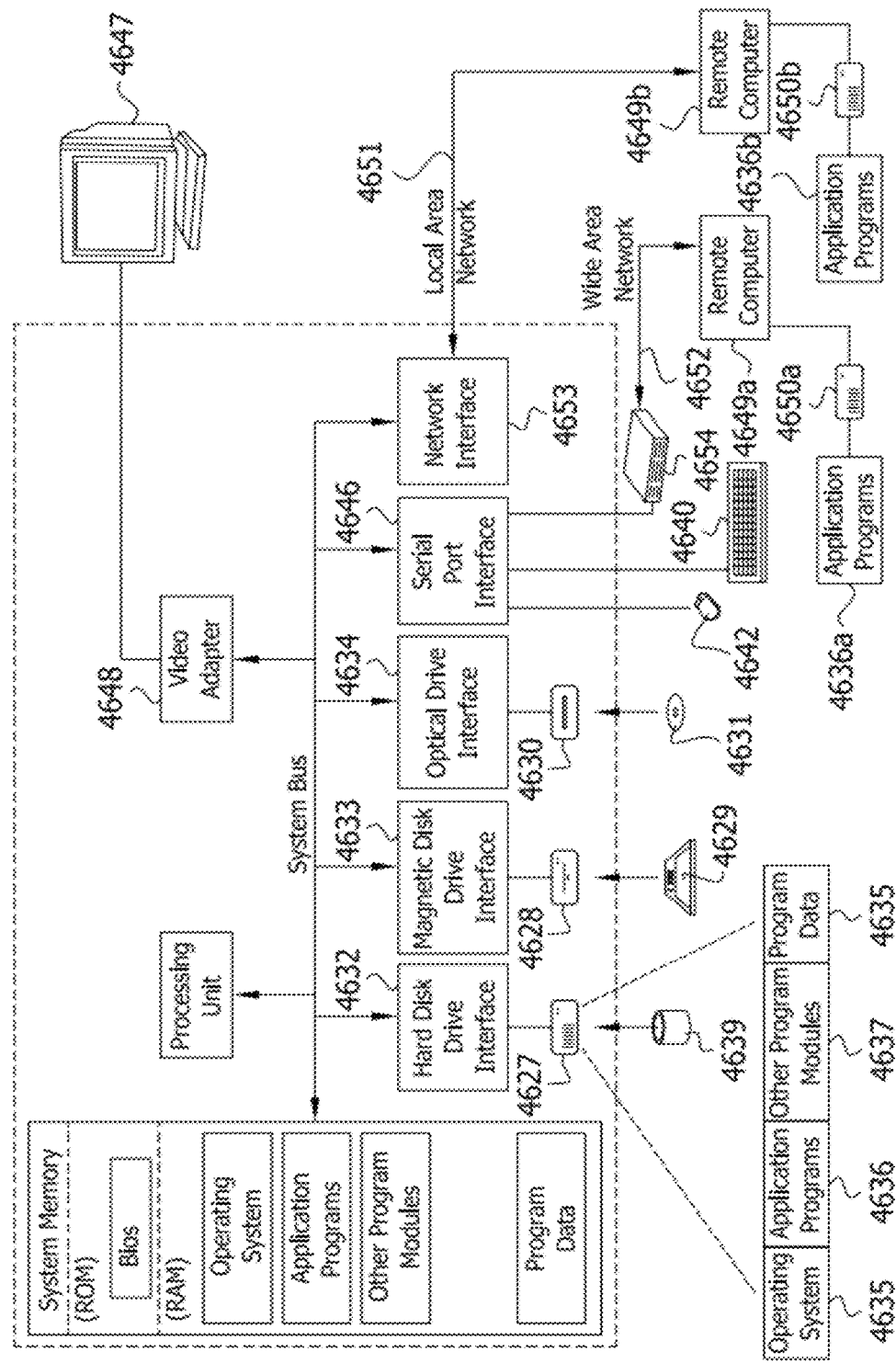
FIG. 46 is a block diagram illustrating an example of a suitable computing system environment in which aspects of the invention may be implemented.
Figure 47:
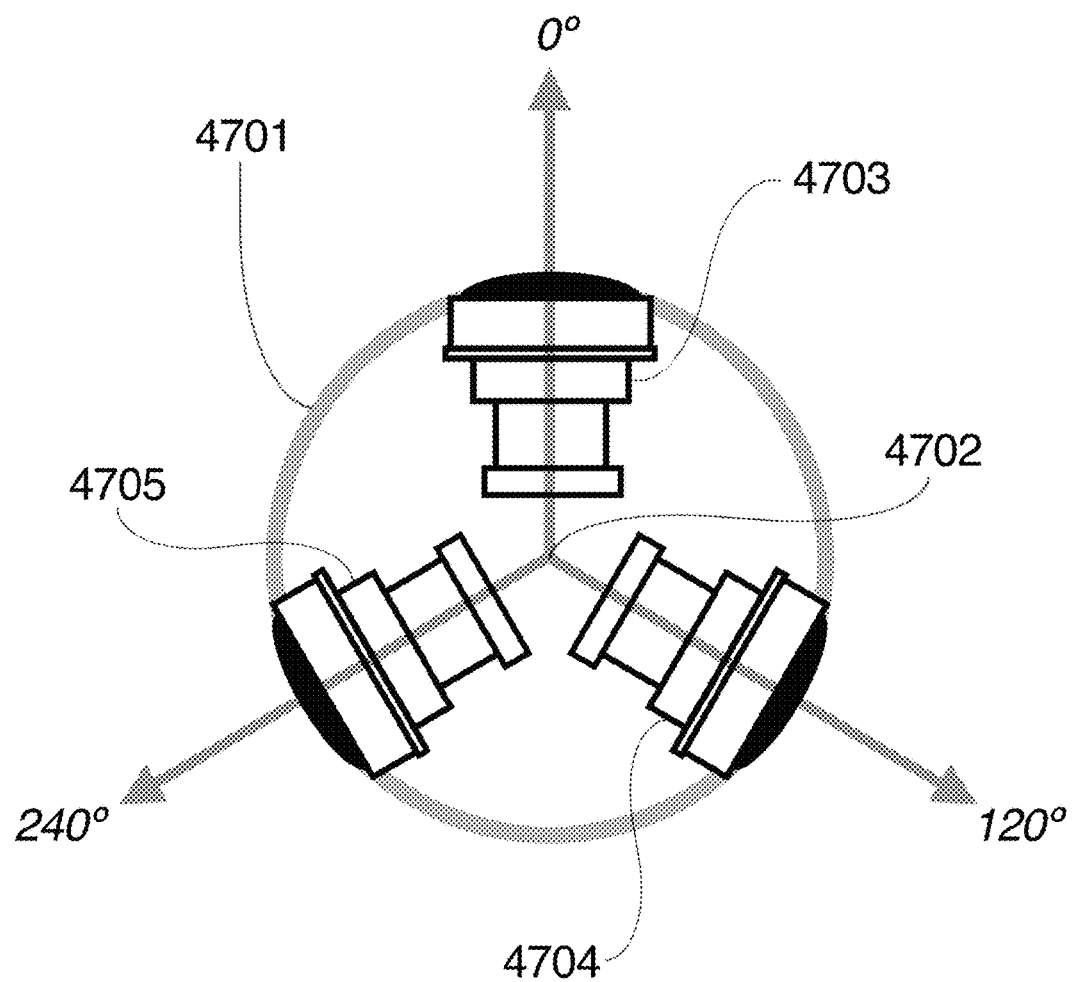
FIG. 47 illustrates an embodiment of the invention showing a device housing 4701, a first lens 4703, a second lens 4704 and a third lens 4705 each pointing radially outward from the center of said housing 4702 at equal angular intervals of 120°. The interval value V being equal to 360° divided by the total number of lenses T (3).

Once the user initiates a spherical recording, the processor in device 101, for example, a processor such as processor 4621 in FIG. 46, begins the processes of acquiring, preparing and transferring all video, audio and metadata associated with the recording. This process begins with the simultaneous acquisition of image data from each camera 103*a* and 103*b* on the device 101 by synchronously acquiring image data from the 'front' camera 103*a* and 'back' camera 103*b*, as well as concurrently acquiring audio data from microphones 302 and 402.

Figure 9:
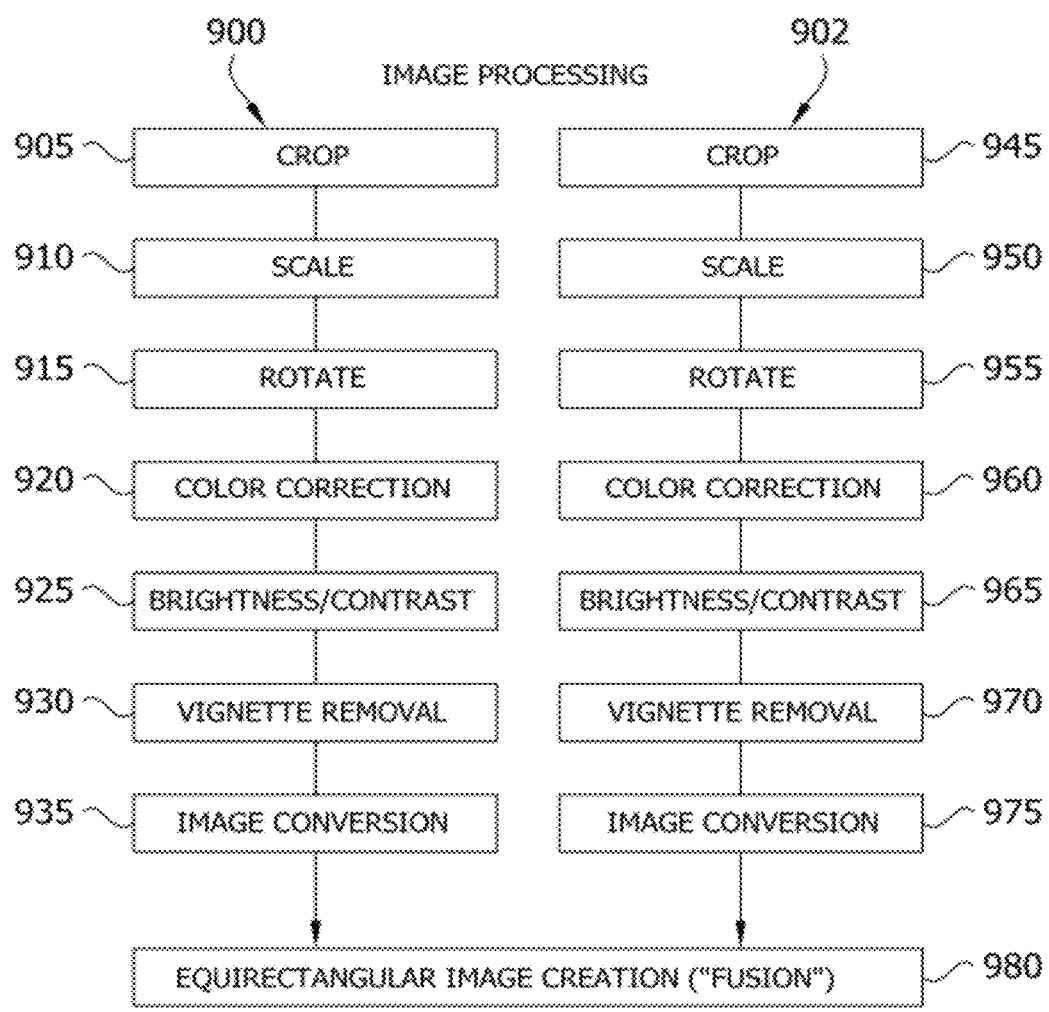
FIG. 9 illustrates a process for processing images created by embodiments of the invention.
Figure 10:
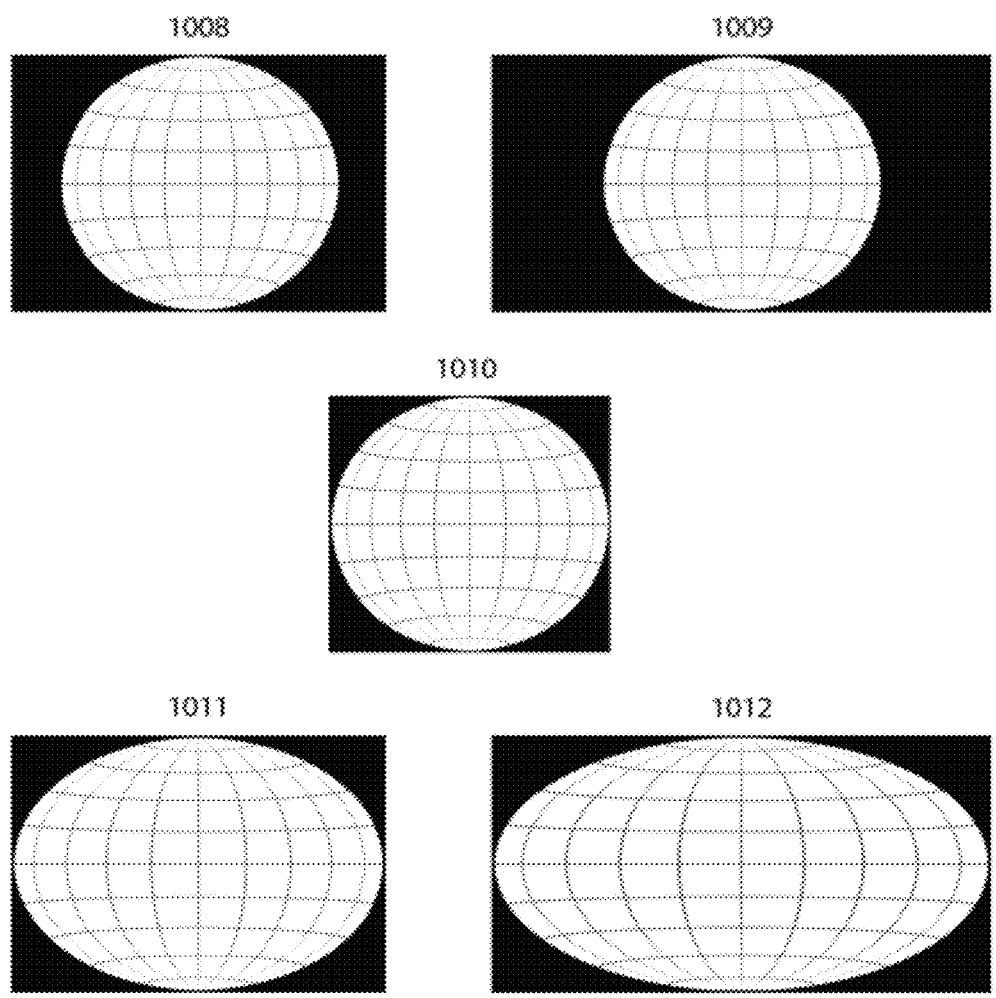
FIG. 10 illustrates an example of the cropping step in the image processing shown in FIG. 9.

Once an individual camera image has been captured, a sequence of image processes occurs on the captured image, as illustrated in FIG. 9. In FIG. 9, captured image 900 from camera 103*a* and a captured image 902 from camera 103*b* enter into the image processing process. The image processing includes, but is not limited to, cropping the images 900 and 902 at steps 905 and 945, respectively. Cropping is the removal of unused pixels and is done primarily in cases where the recorded camera images 900 and 902 do not fully utilize the entire resolution of the image sensors in cameras 103a and 103b. For example, in FIG. 10, cropping is done for circular images recorded on a rectangular 4:3 sensor 1008 or 16:9 image sensor 1009 primarily to remove unused horizontal pixel data, as illustrated by element 1010. While 1008 and 1009 demonstrate an embodiment utilizing standard circular hemispherical lenses on the cameras, other embodiments may utilize elliptical panoramic lenses. A lens producing an elliptical image upon both an HD 4:3 sensor is demonstrated at 1011 and a 16:9 sensor is demonstrated at 1012. In these embodiments, the created elliptical images may not require the cropping process.

Referring again to FIG. 9, the image process next scales the cropped images at steps 910 and 950 to meet a specific recording solution, then rotates the images in either a clockwise or counterclockwise direction around a defined center point at steps 915 and 955. Rotating the images in this manner prevents unintended offsets in lens or camera rotation that would negatively impact the device 101 firmware's ability to properly create a unified spherical image. The image process then color corrects the images at steps 920 and 960, and adjusts brightness and contrast at steps 925 and 965. At steps 930 and 970, the image processing performs vignette removal 930 and 970, where the periphery of the image is substantially darker than the center of the image (an issue typically associated with images taken by wide angle lenses).

Next, the device 101 performs image conversion at steps 935 and 975. As described herein, the image conversion process performs one or more mathematical transformations on each image in order to create a unified, "spherical" image from the transformed images. In the embodiment illustrated in FIGS. 1-8, the images from steps 930 and 970 undergo a "circular to rectilinear" mathematical conversion at steps 935 and 975, respectively. While FIGS. 1-8 illustrate a "circular to rectilinear" mathematical conversion, any suitable mathematical conversion may be used to convert the images. FIG. 11 provides an example set of computer program instructions for performing the circular to rectilinear image conversion. In some embodiments, the image conversion is performed by a combination of one or more hardware components, e.g., programmable microcontrollers, and/or one or more software components. In other embodiments described below, the device 101 includes more than two cameras, requiring one or more appropriate mathematical transformations to prepare each image for spherical image creation.

This order of image processing operations is merely illustrative and may proceed in any appropriate order prior to spherical, equirectangular image creation 980.

Once an image has completed the image conversion 935 or 975 process, the image is temporarily stored in a device 101 memory, such as a system buffer, until the other image conversion process completes. Once the image conversion processes 935 and 975 complete, the device 101 initiates the spherical, equirectangular image creation process at step 980. Step 980 is also referred to as the "fusion" process. The fusion process 980 combines each of the converted images from steps 935 and 975 into a single, spherical image file, by applying one or more masking, blending, and merging techniques to each converted image. In an alternative embodiment, the "fusion" process combines each of the converted images from steps 935 and 975 into a single image file by placing the images "edge-to-edge" or "end-to-end".

Figure 12:
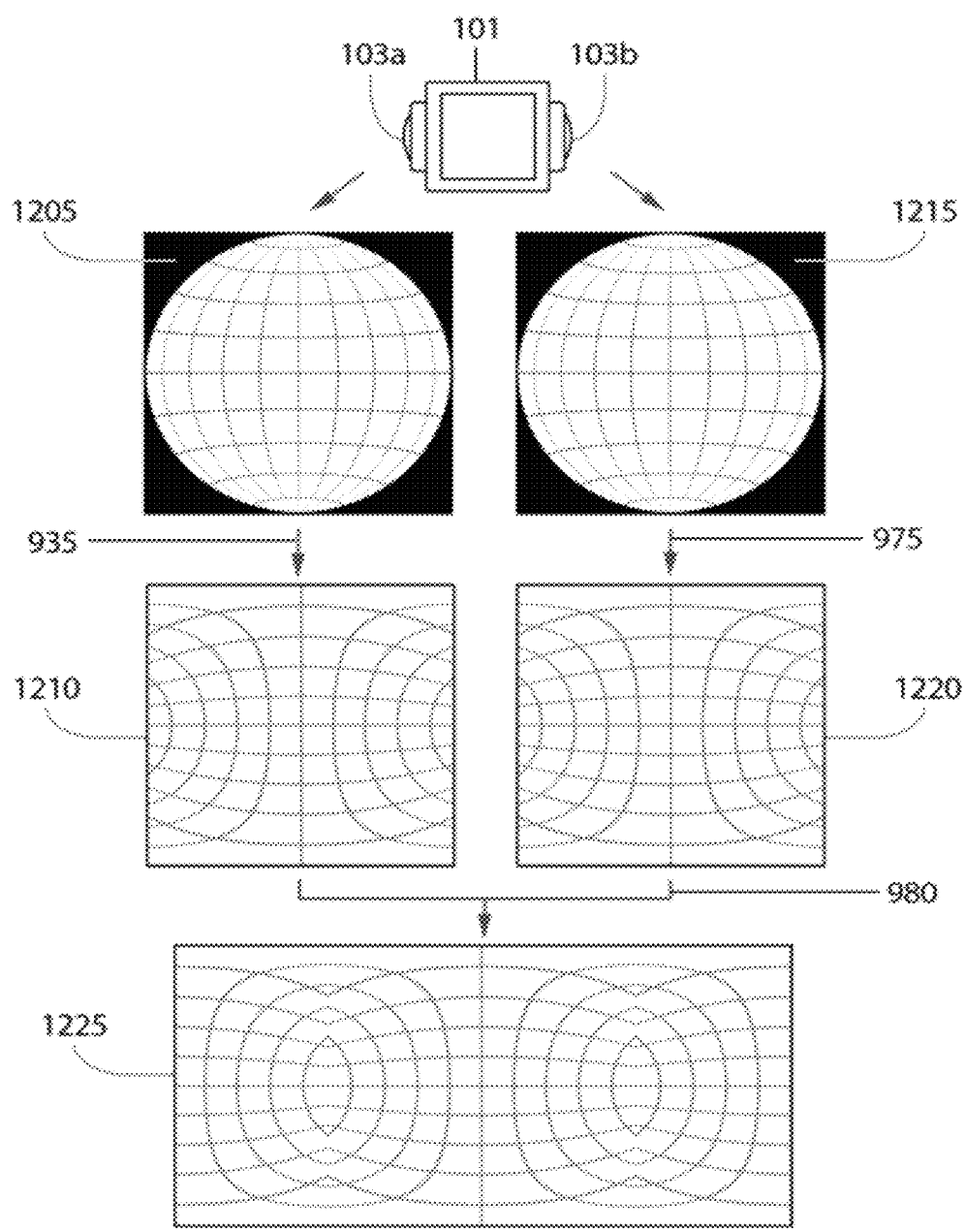
FIG. 12 illustrates an example of a mathematical conversion of two images created by an embodiment of the invention and the fusion of the two images into a spherical, equirectangular file.
Figure 13A:
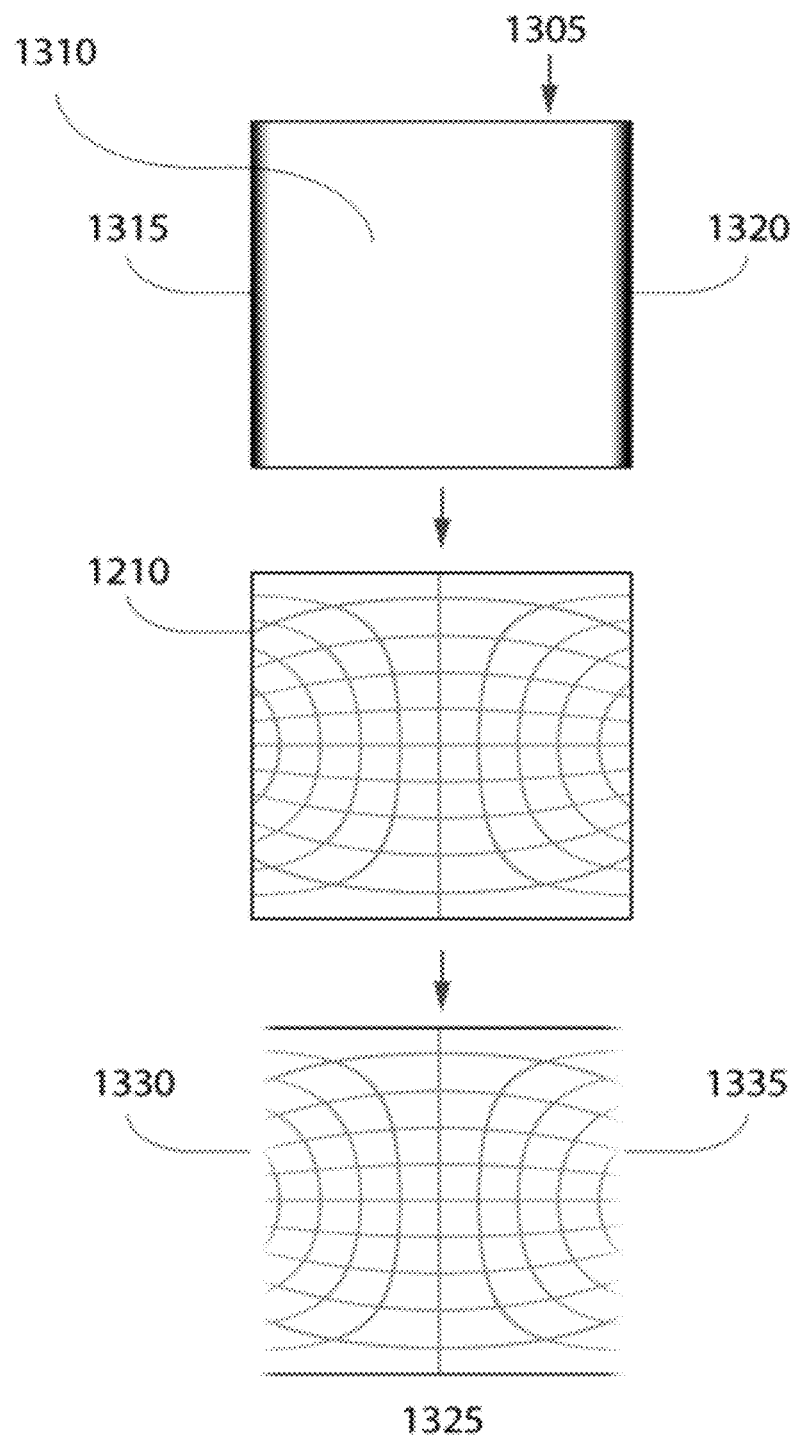
Figure 13B:
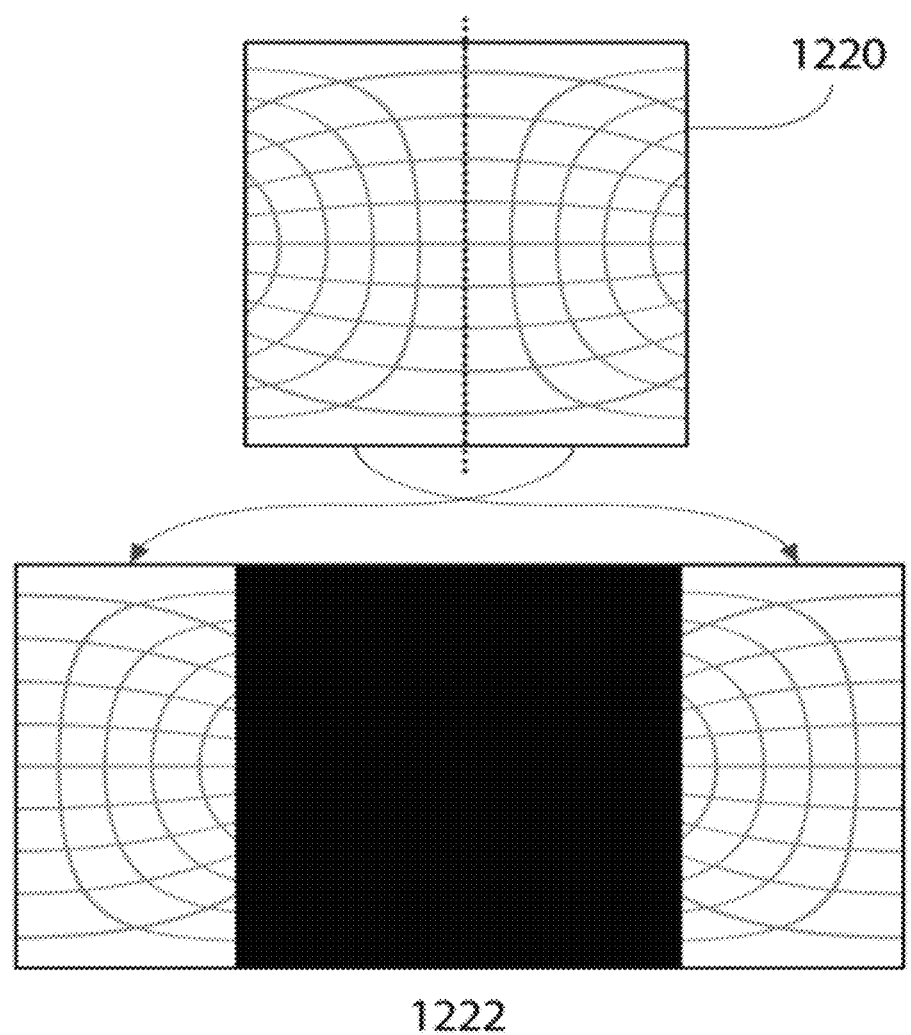

An example of the "circular to rectilinear" mathematical conversion of steps 935 and 975 and the fusion process 980 is shown in FIG. 12. In this example, image 1205 results from step 930 and image 1215 results from step 970. Image 1210 and 1220 result from the image conversion steps 935 and 975, respectively. Images 1210 and 1220 are then "fused" together at step 980 to create a single, spherical image 1225. In this example, the spherical image may also be referred to as an "equirectangular" image, due to its structure. The fusion step 980 is further demonstrated in FIG. 13A and 13B In the example shown in FIG. 13A, the conversion step 980 uses a black and white alpha mask 1305, where the alpha mask contains a white portion 1310, while the edges of the alpha mask 1315 and 1320 fade from white to black at the edges, indicating transparency. When this alpha mask 1305 is applied to a image 1210, the portion of the image corresponding to area 1310 remains visible, while the portions of the image corresponding to edges 1315 and 1320 fade from visible to transparent. For example, when alpha mask 1305 is applied to image 1210, the resulting image 1325 is produced, with a faded left edge 1330 and a faded right edge 1335. In FIG. 13B, the conversion step 980 incorporates portions of image 1220 into a image container 1222 as illustrated, e.g., a 2:1 rectangular image container. In FIG. 13C, the alpha blended image 1325 is incorporated into the image container 1222. Due to the alpha blending properties of the edges 1330 and 1335 of image 1325, image 1325 "blend" with the images in the image container 1222, demonstrated at 1340 and 1345, resulting in the equirectangular image 1225. In other embodiments, other methods and means are utilized and/or applied to the images 1210 and 1220 to generate the equirectangular image 1225.

Figure 14:
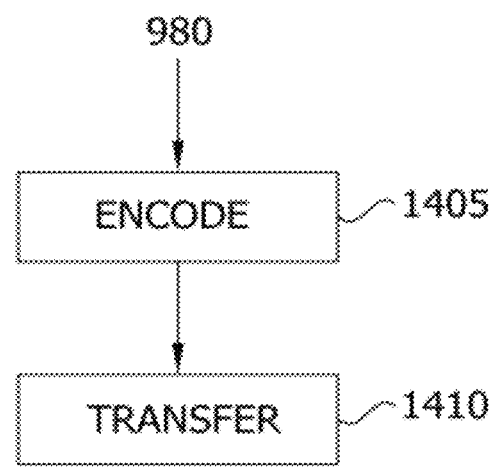
FIG. 14 illustrates a process of encoding the equirectangular file and accompanying audio, and transferring the encoded file(s).

After step 980, processing continues as illustrated in FIG. 14. At step 1405, the spherical, equirectangular file 1225 and the audio data acquired from microphones 302 and 402 are encoded into one or more files. At step 1410, the encoded files are compressed into a single file to optimize the size of the encoded file. The level of audio and video compression would be determined by the user, based on the quality they prefer. The choice of compression amount is generally a question of quality vs. size, where higher quality files with less compression would be larger than lower quality files with more compression. In one embodiment, the device 101 includes an encoding processor to encode the spherical file 1225 and audio data using standard video and audio encoding techniques. For example, H.264 video encoding and AAC audio encoding can be utilized to deliver high quality files with relatively low file sizes.

At step 1410, the encoded file from step 1405 is transferred to internal storage, card-based storage in slot 203, remote storage via port 202, or wirelessly transmitted to a remote computing device or web server via an integrated Wi-Fi communication module or through an inserted memory card with integrated Wi-Fi module. In one or more embodiments, the device 101 includes one or more hardware and/or software modules for utilizing cellular phone technology. In these embodiments, the hardware and/or software components for cellular communication are built into the device 101, accessible via card slot 203, accessible via port 202, and/or provided external to the device 101 in a manner accessible to the device 101 for transferring the encoded file from step 1405. For example, a user may use a tablet device to establish a wireless connection to the device 101 and initiate both a recording and broadcasting sequence at the same time. The data is simultaneously recorded to the memory card via card slot 203 and broadcast to the remote tablet via wireless communication in this embodiment, where it can also be saved to the tablet's internal memory if desired. The stored and/or transmitted encoded file can then be viewed using an appropriate viewer as described below.

Figure 15:
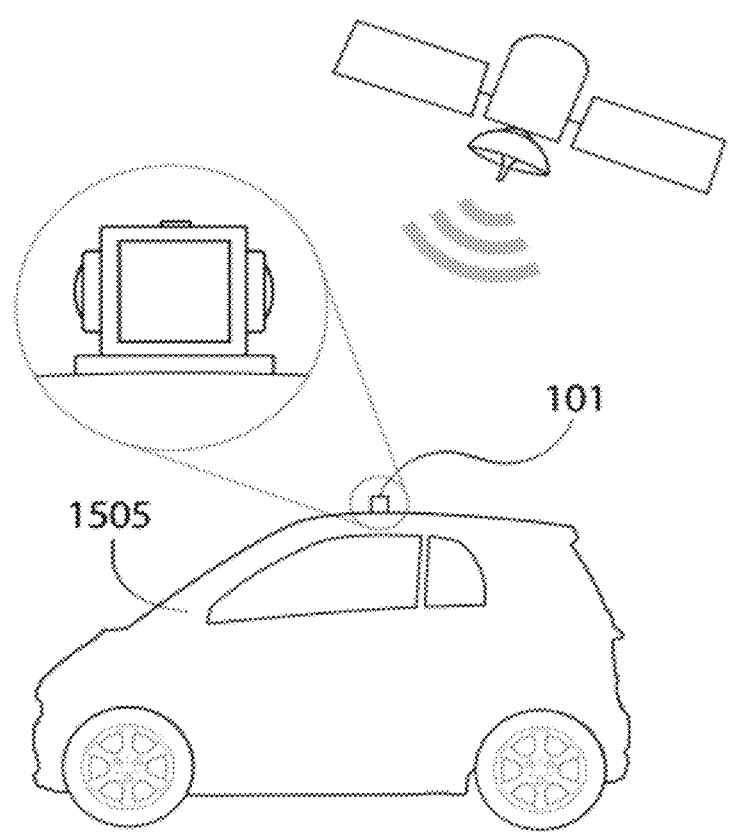
FIG. 15 illustrates an embodiment of the invention acquiring positional information utilizing a Global Position System ("GPS").
Figures 16, 17:
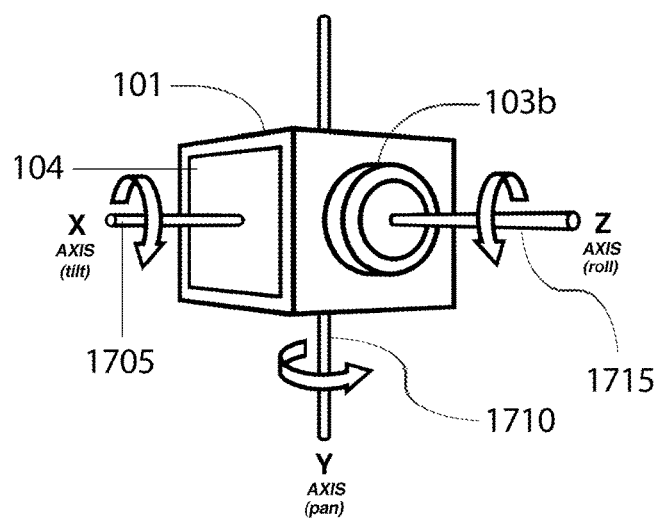
FIG. 16 shows an exemplary XML data structure storing acquired GPS information.
FIG. 17 illustrates an X-axis, a Y-axis, and a Z-axis of an embodiment of the camera device about which device can rotate.

In at least one embodiment, the encoding process 1405 incorporates positional metadata acquired by the device 101 during the recording. The acquired metadata includes, but is not limited to, location metadata acquired by a Global Position System ("GPS") of the device 101 or otherwise provided to the device 101, as illustrated in FIG. 15. FIG. 16 shows an exemplary XML structure storing GPS metadata, such "latitude" and "longitude" coordinates at a given "time."

The encoding process 1405 additionally incorporates orientation metadata acquired by the device 101 during the recording in one or more embodiments. In these embodiments and as demonstrated in FIG. 17, the device 101 includes a built-in accelerometer and gyroscope to determine rotation changes about the X-axis 1705 ("tilt"), about the Y-axis 1710 ("pan"), and about the Z-axis 1715 ("roll"). Using a built-in accelerometer and gyroscope, the device can continuously determine rotational changes made to the device 101 and additionally save or broadcast the information as text-based metadata documents, such as XML files. FIG. 18 shows an exemplary XML structure storing orientation metadata related to accelerometer and gyroscope data at a given time.

During operation of device 101, the built-in accelerometer and gyroscope automatically generate metadata based on the physical orientation of the device. Metadata can be used to visually compensate for unstable, uneven environments (such as a boat) or when the device is intentionally rotated for a particular mounting purpose (such as upside down), eliminating the need to buy or construct a device designed to keep the device 101 stable or in a particular position. The numerical metadata is continuously updated with values based on the rotation of the device 101 along its X-axis 1705, Y-axis 1710, and Z-axis 1715. Orientation metadata is comprised of six numerical values which include the accelerometer's x, y and z rotational values and the gyroscope's x, y and z velocity-change values. A metadata value of "0, 0, 0, 0, 0, 0" indicates, for example, that the device 101 is completely level with the ground and in a fixed, stable position. Each time the device is rotated about one or more of its axis, one or more of the metadata values is generated to reflect these changes and the time at which the rotation occurred. Accelerometer values reflect the rotation of the device along the X-axis 1705, Y-axis 1710, and the Z-axis 1715 and generally have values between −1.0 and 1.0. Each individual value indicates both the direction and rotation amount on a particular axis. An accelerometer x-axis value of 0.0, for example, indicates that the device 101 is completely level and facing forward. An x-axis value of 1.0, however, indicates that the device 101 has been vertically rotated upwards 90 degrees, while a value of −0.5 indicates the device 101 has been rotated 45 degrees downward.

Gyroscope data values, on the other hand, reflect the speed and direction in which the device 101 is being rotated. A gyroscope y-axis value of 0.0 indicates that the device 101 is currently not being horizontally rotated along that axis. If, however, the device 101 was slowly rotated from right to left, the accelerometer y-axis value would have a constant value, such as −0.5, until movement is stopped, which would put the value back to 0.0 indicating no movement. If the device 101 was quickly rotated upwards 90 degrees and then back to 0 degrees, the gyroscope x-axis rotation value would incrementally move from 0.0 to, for example, 5.0, and then back down to 0.0 once the device 101 is level again.

Figure 19:
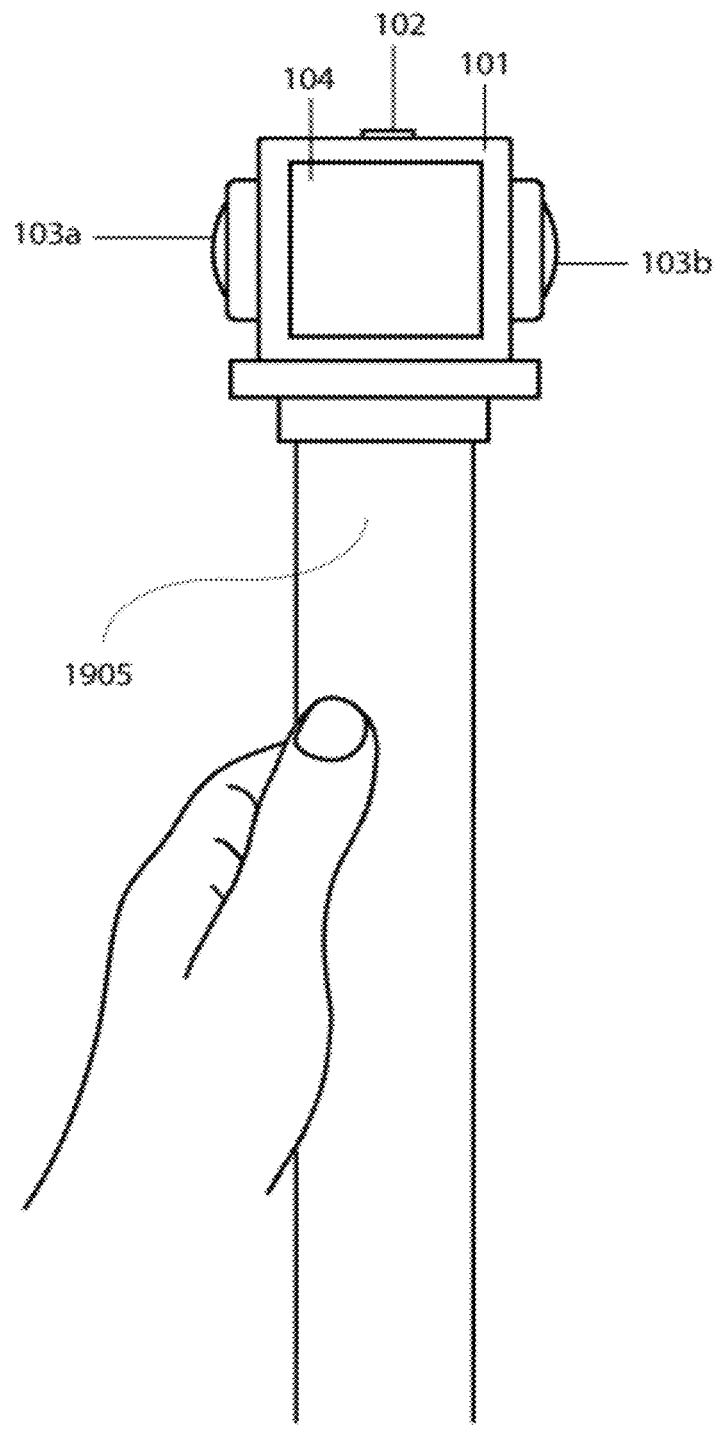
FIG. 19 illustrates an embodiment of the camera device mounted to a hand-held monopod.
Figure 20:
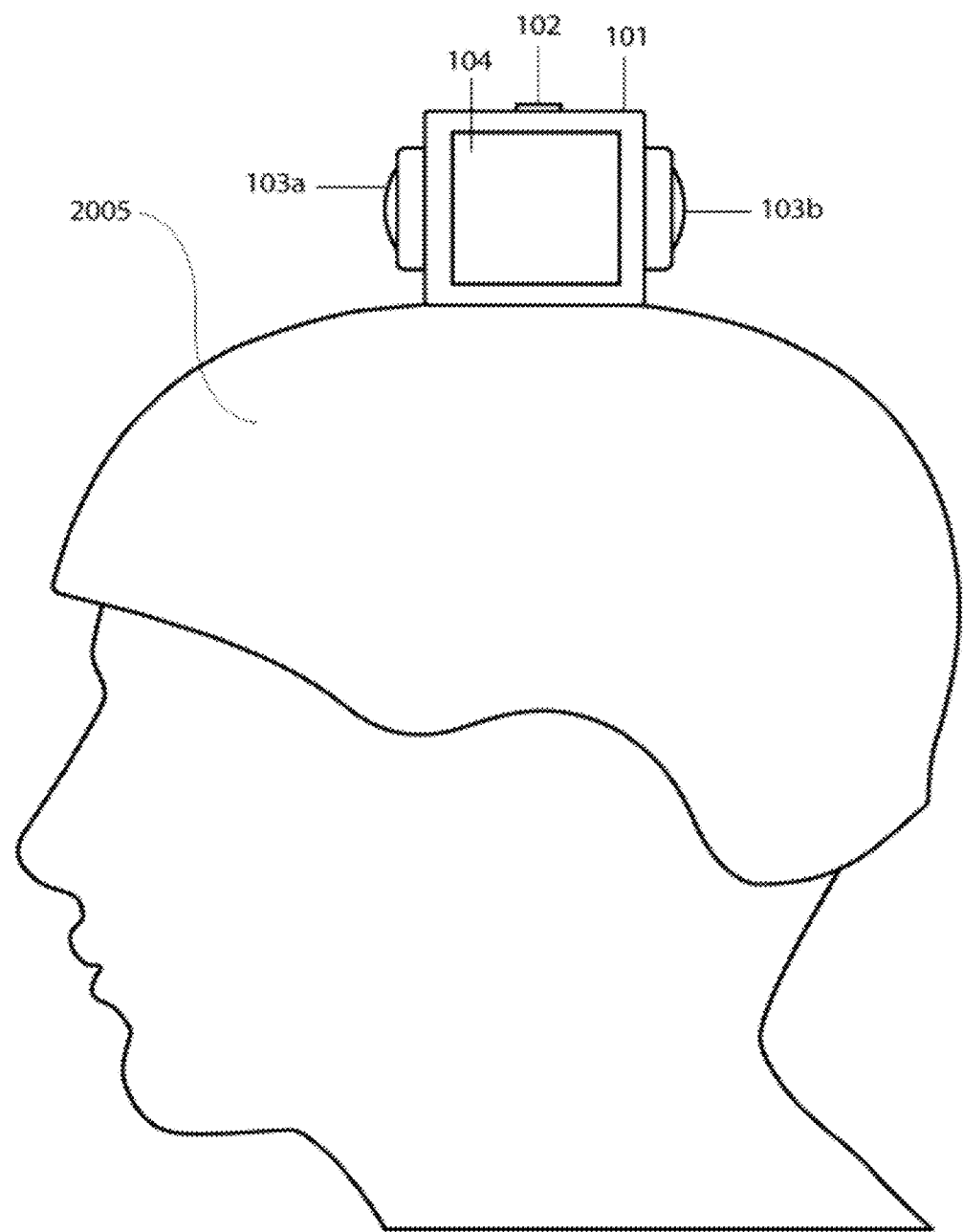
FIG. 20 illustrates an embodiment of the camera device mounted on a user-worn helmet.

It is to be understood that aspects of the invention can be implemented in a variety of environments and incorporated into various devices without deviating from the scope of the invention. FIGS. 15 and 19-22 show various aspects of uses of the present invention. These uses are provided by way of example, and not limitation. FIG. 15 shows the device 101 mounted on a vehicle 1505. In FIG. 19, the device 101 is mounted to a hand-held monopod 1905 using the built-in screw mount 601 (not shown). FIG. 20 shows the device 101 mounted on a user-worn helmet 2005 using the built-in screw mount 601 (not shown). The device 101 may be mounted on other objects are well, such as a remote controlled car, helicopter, or other vehicles (not illustrated).

Figure 21:
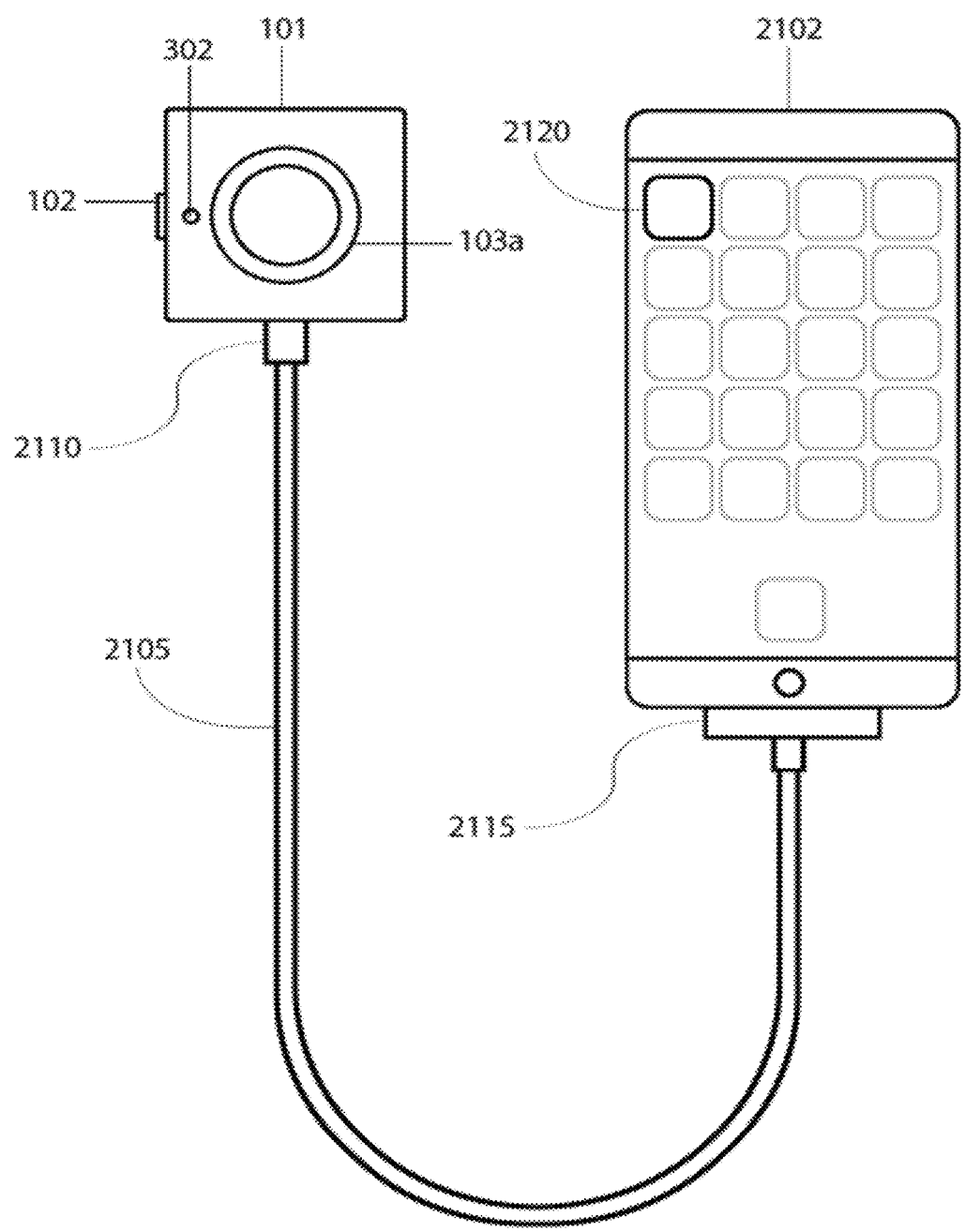
FIG. 21 illustrates an embodiment of the camera device connected to a smart phone via an attached cable.
Figure 22:
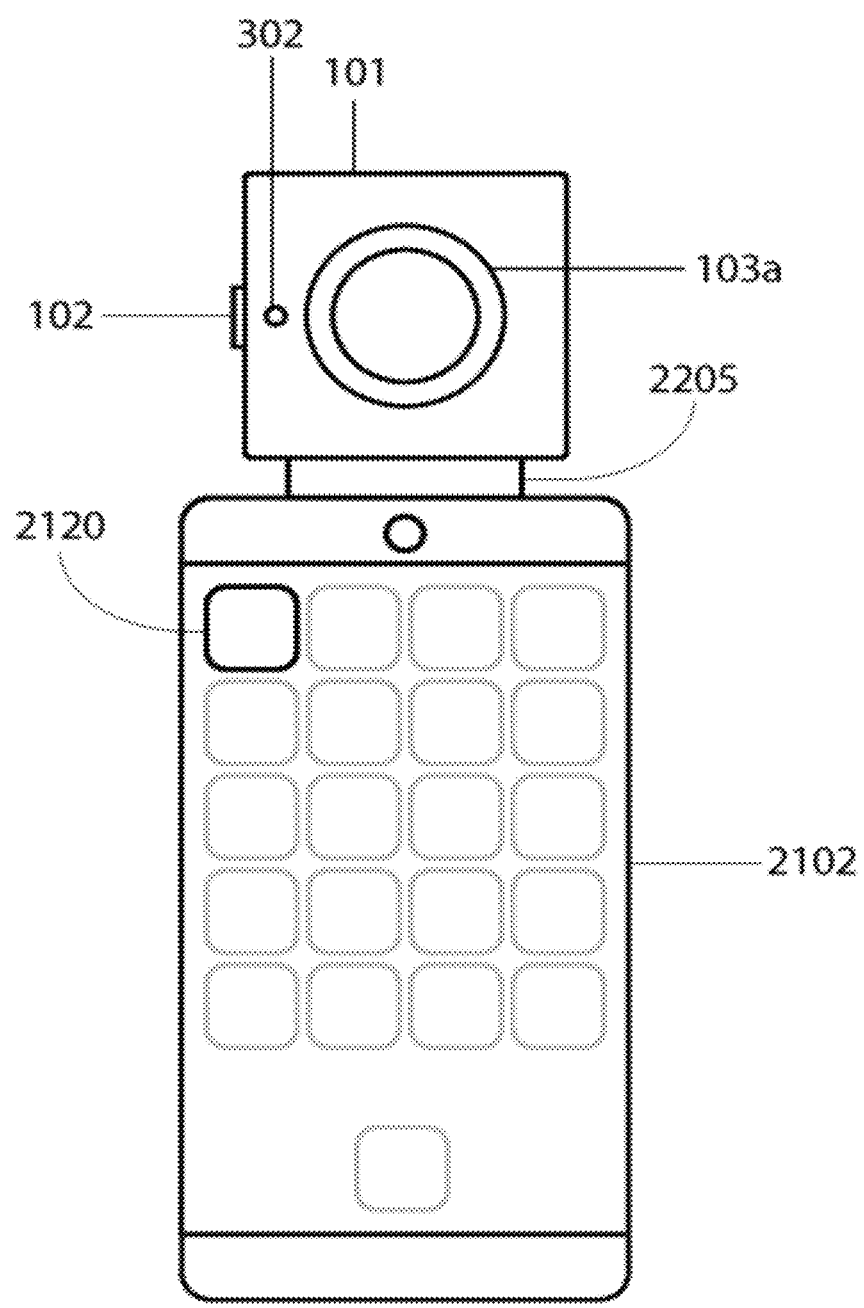
FIG. 22 illustrates an embodiment of the camera device connected to a smart phone via a proprietary adaptor.

FIG. 21 shows the device 101 connected to a smart phone 2102 via the port 202 (not shown) using a USB cable 2105. One end of the cable 2110 is attached to the port 202 (not shown) and the other end of the cable of attached to the smart phone 2102. A software application 2120 running on the smart phone 2102 allows communication between the smart phone 2120 and the device 101, enabling the user to control operation of the device 101 via the application 2120. FIG. 22 shows the device 101 connected to the smart phone 2102 via the port 202 (not shown) using a proprietary adaptor 2205.

Figure 23:
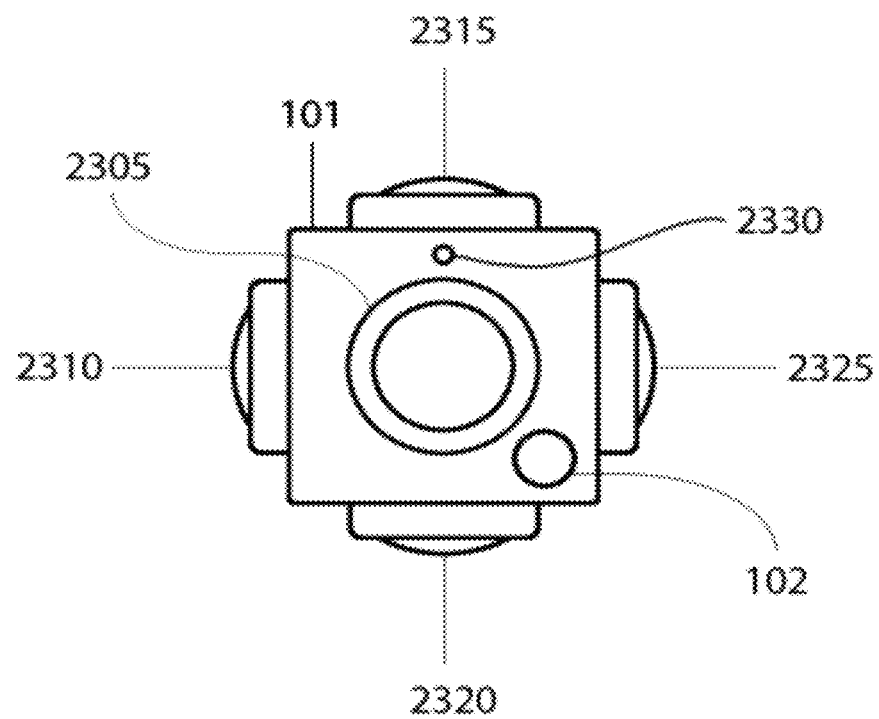
FIG. 23 illustrates a top view of another embodiment of the camera device with multiple cameras externally oriented on the camera device according to various aspects described herein.
Figure 24:
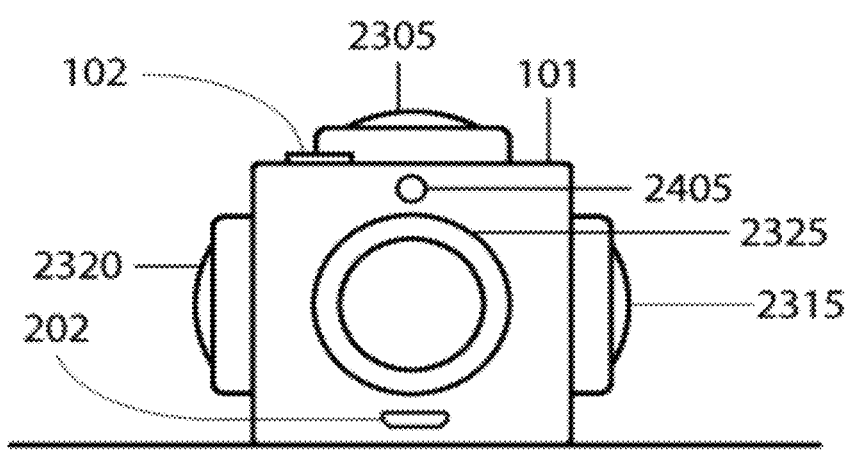
FIG. 24 illustrates a side view of the camera device shown in FIG. 23 according to various aspects described herein.
Figure 25:
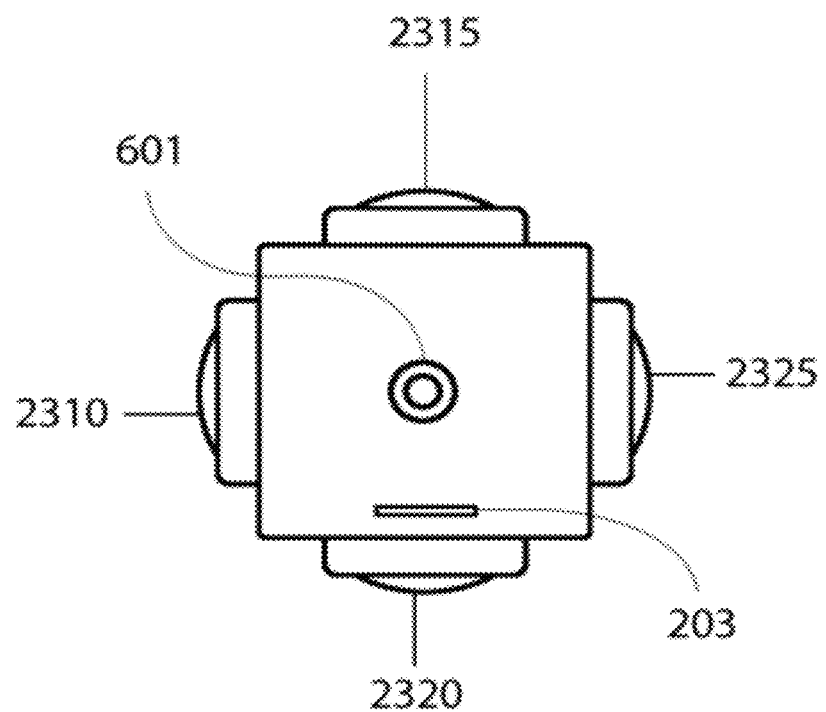
FIG. 25 illustrates a bottom view of the camera device showing in FIG. 23 according to various aspects described herein.
Figure 26:
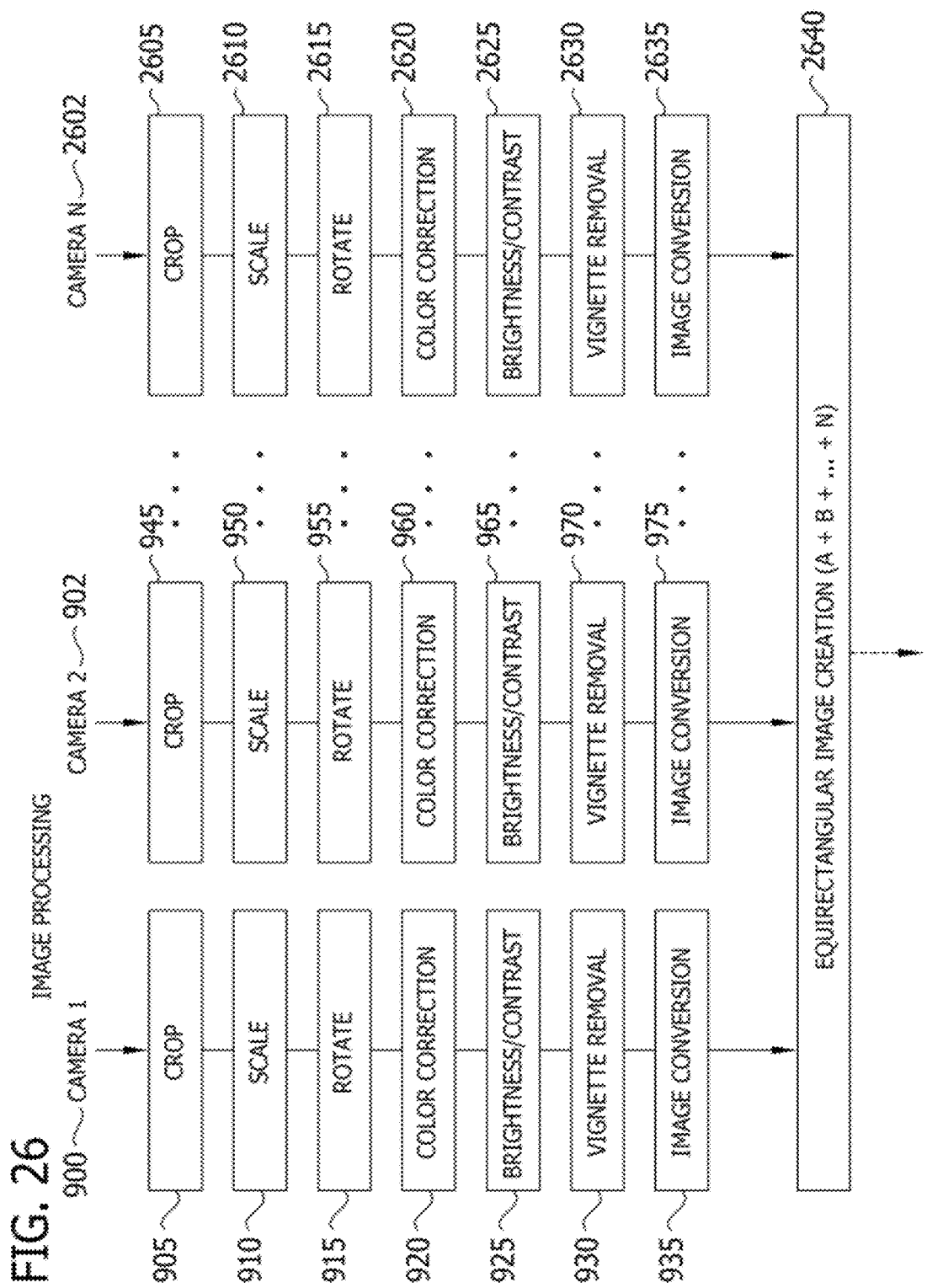
FIG. 26 illustrates a process for processing images created by embodiments of the invention with N number of cameras.

In other embodiments, the device 101 includes three or more cameras. Although the cameras illustrated are for convenience oriented at right angles to each other, it is to be understood that the cameras may be arranged in a number of configurations, e.g., pyramidal, without deviating from the scope of the present invention. For example, FIG. 23 shows a top view of the device 101 with five cameras 2305, 2310, 2315, 2320, and 2325, and microphone 2330. FIG. 24 shows a side view of the device 101 with the five cameras, and microphone 2405. In some embodiments, each camera has an associated microphone, while in other embodiments, pairs of oppositely placed microphones are externally oriented on the device 101. For example, a microphone (not shown) would be externally oriented on the device 101 on the side opposite of the camera 2325. In this embodiment, the port 202 is located on a side of the device 101, as shown in FIG. 24, and the screw mount 601 and the card slot 203 are located on the bottom of the device, as shown in FIG. 25. In these embodiments, image and audio acquisition proceeds in essentially the same manner illustrated in FIG. 9, as shown in FIG. 26. As shown in FIG. 26, an image acquired from each camera proceeds through the same steps. For example, the image 2602 from Camera N proceeds through steps 2605, 2610, 2615, 2620, 2625, 2630, and 2635, where the converted images from each camera are combined to form a spherical, equirectangular image at step 2640.

Figure 27:
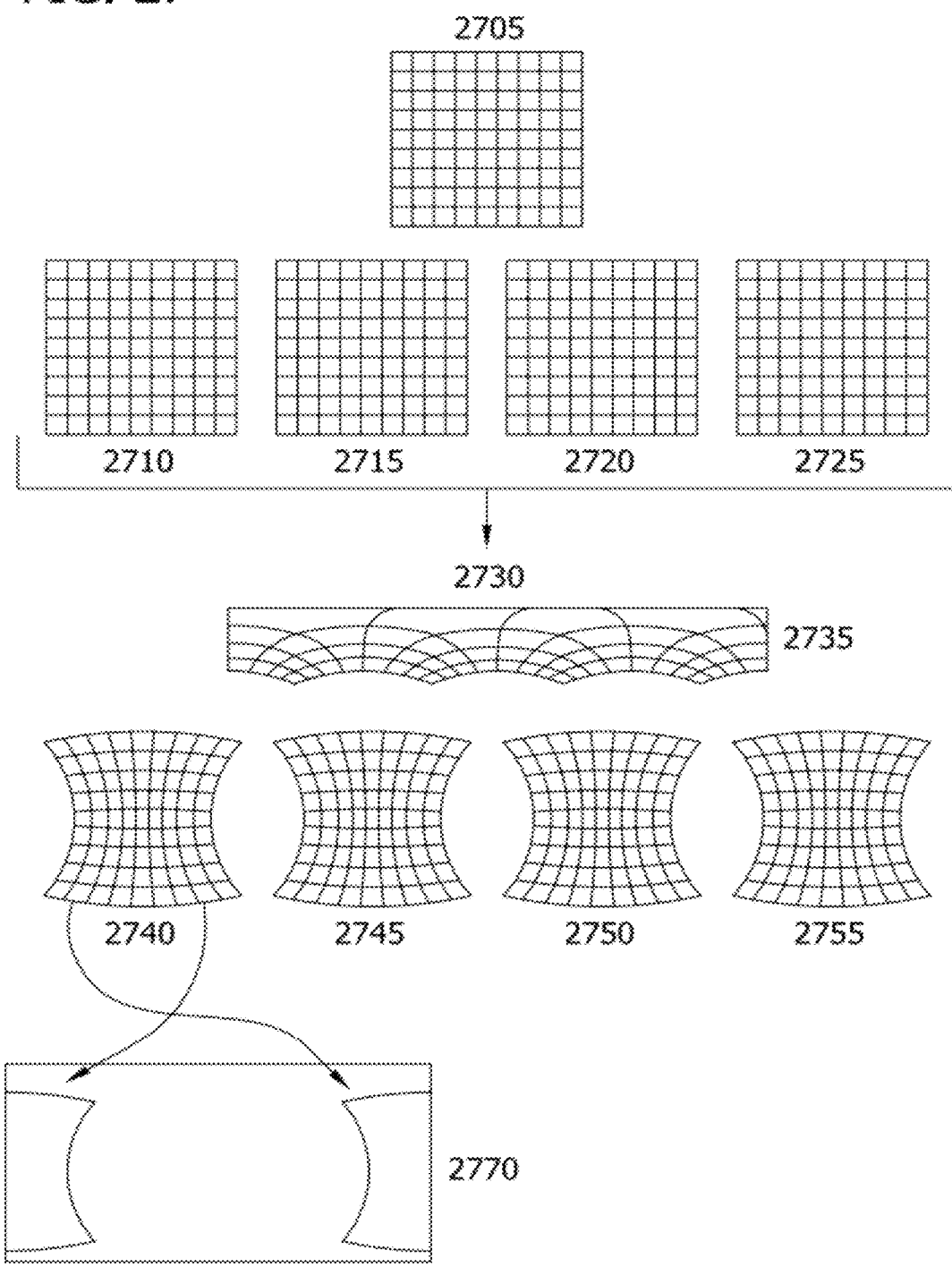
FIG. 27 illustrates an example of the conversion of five images into a spherical equirectangular file.
Figure 28:
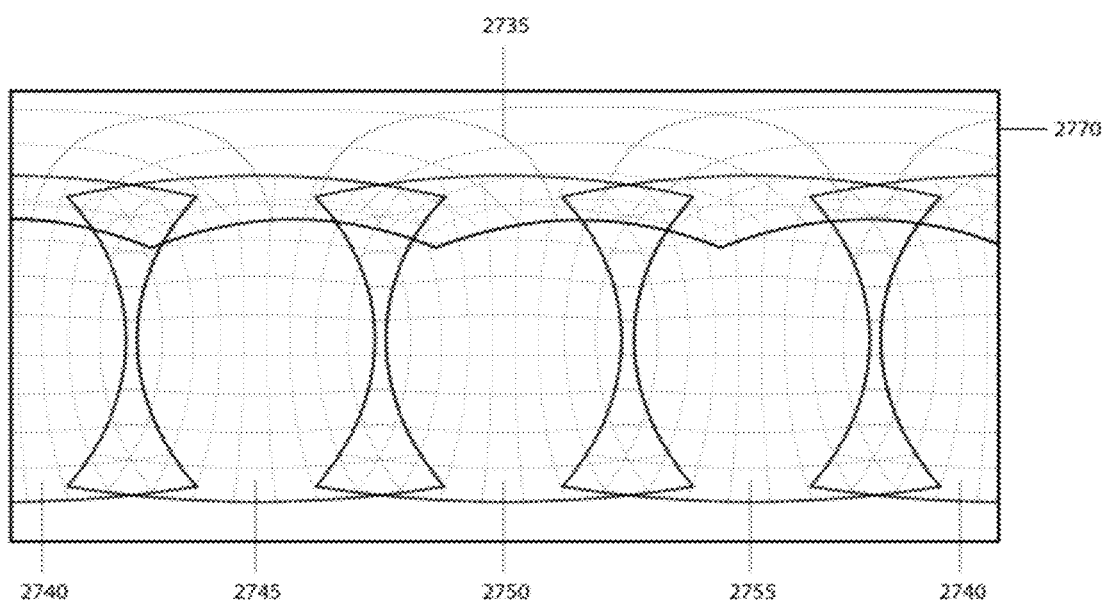
FIG. 28 illustrates an example of a spherical equirectangular file created by the process illustrated in FIG. 27.

FIG. 27 illustrates one example of the mathematical image conversion steps 935, 975, . . . 2635 being applied to the images 2705, 2710, 2715, 2720, and 2725 acquired from cameras 2305, 2310, 2315, 2320, and 2325 respectively. The device 101 converts image 2705 to image 2735, image 2710 to image 2740, image 2715 to 2745, image 2720 to image 2750, and image 2725 to image 2755. As part of the conversion step, portions of image 2740 are incorporated (shown at 2760 and 2765) into a rectangular image container 2770. The device 101 then fuses images 2735, 2740, 2745, 2750, and 2755 at step 2640 to create the equirectangular image shown in FIG. 28.

Spherical Image Viewers

In order to view the spherical video content created by device 101, a user must use specialized software applications capable of rendering the video content. These applications, called spherical viewers, are specifically designed to render 2-dimensional spherical video files as interactive, 3-dimensional environments. The applications essentially provide a first person perspective within a spherical, virtual environment, letting the user look in any direction without restriction. How the user interacts with the spherical viewer depends on the type of device executing the viewer application. A desktop or web-based application, for example, utilizes a standard mouse or trackpad for user interaction, while an application executing on a mobile device, instead, utilizes touch-based hand gestures. As demonstrated in FIG. 29A, spherical viewers use spherical video files 2905 as texture materials applied to the inside surface of a 3D sphere, 2910, called a "render sphere." A 3D-render camera 2915 is positioned at the center of the render sphere, and serves as the user's "window" into the virtual environment. The user controls the render camera 2910, using a mouse or, in the case of a mobile device, using touch gestures.

In one embodiment, the application utilizes a 3D Application Programming Interface ("API") to generate a 3D virtual environment and, within this generated environment, the application creates a 3D render sphere 2910, an example of which is shown in FIG. 29B. The application then creates a custom video-texture material 2905 using a spherical, equirectangular video file as its source. The application next applies the video-texture 2905 directly to the inside of the sphere 2910 and then performs any necessary visual adjustments to properly render the 2-dimensional file as a 3-dimensional, 360 degree video environment. The application further ensures that the render sphere 2910 and applied texture 2905 are "self-illuminated" to remove any shading that may be applied on the render sphere by default.

Figure 29A:
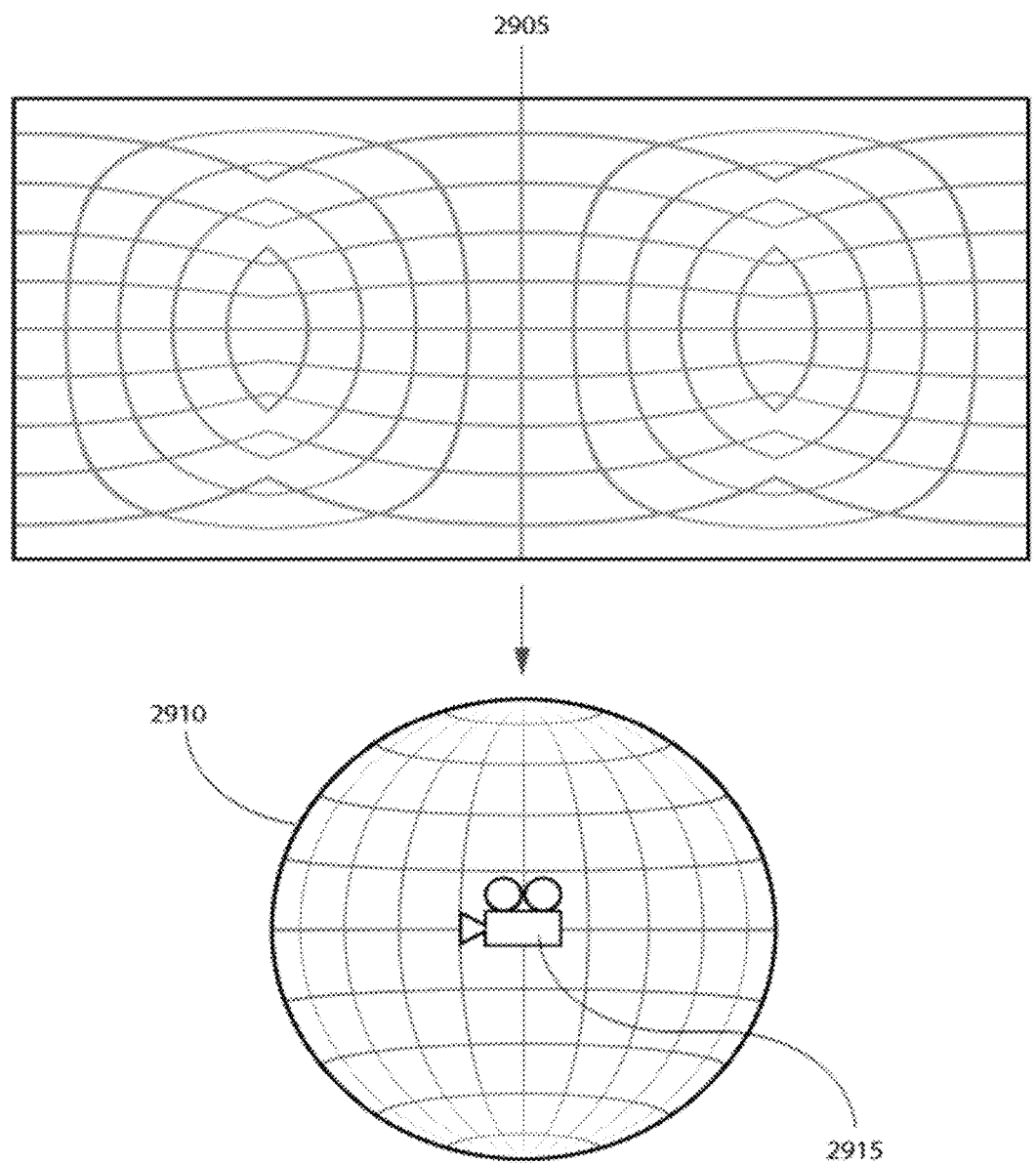
Figure 29C:
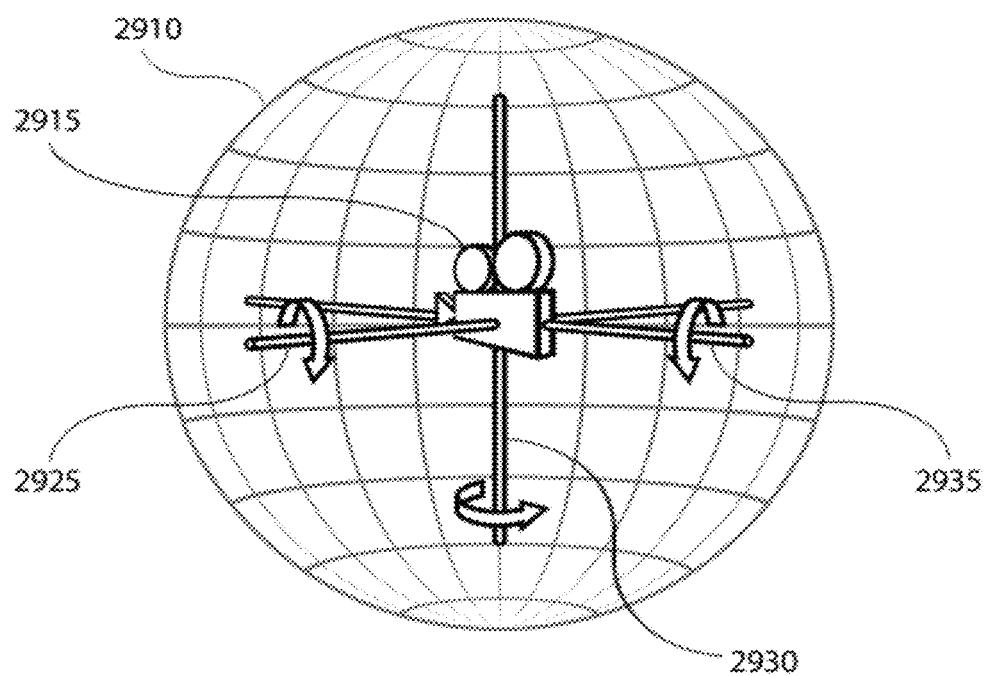
Figure 30A:
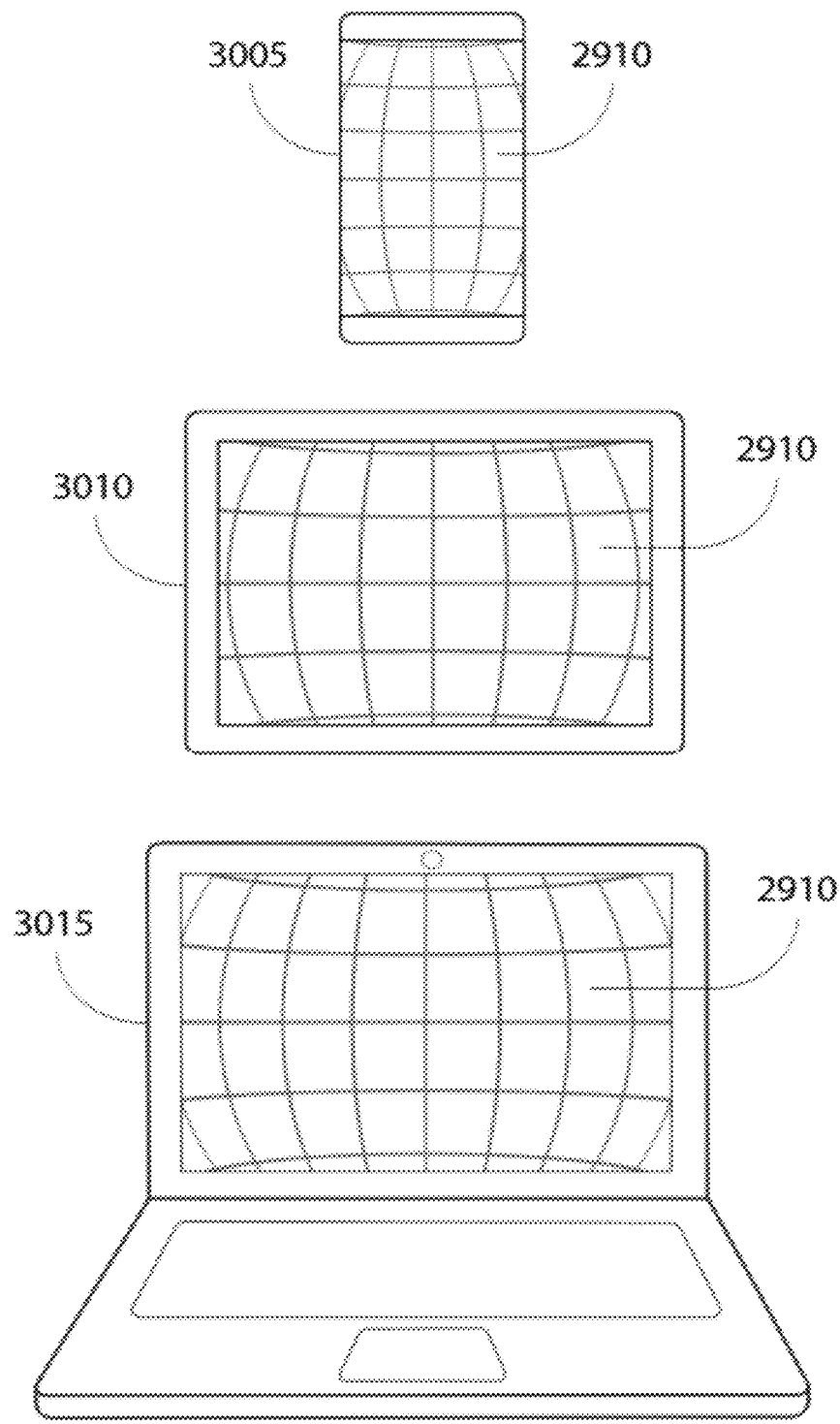
FIGS. 30A-30C illustrate examples of viewer applications executing on different user devices, with the render camera providing the view within the render sphere, and the user interacting with the viewer to change the view.
Figure 30B:
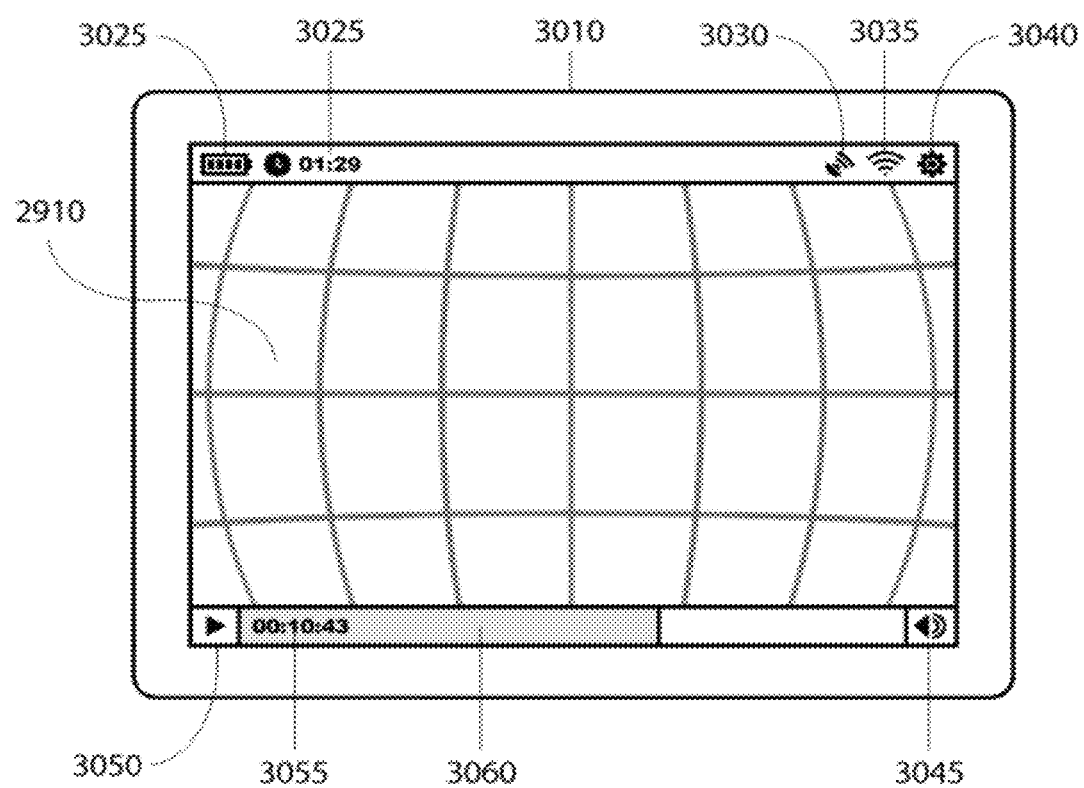

The application places the render camera 2915 at the center of the render sphere 2910, as further illustrated in FIG. 29C, with the x-axis 2925, y-axis 2930, and z-axis 2935 values of the render camera 2915 set to zero. As noted above, the render camera 2915 essentially becomes the window into the spherical environment. What is displayed on the PC, smart phone or tablet is determined by what the render camera 2915 is "looking at" inside the render sphere. As demonstrated in FIG. 30A, the render sphere 2910 is viewable on a smart phone 3005, a tablet device 3010, and a desktop/laptop computer 3015. FIG. 30B demonstrates one embodiment of the viewer application 3020 executing on a tablet device 3010. In order to change the viewing perspective based on user input, the application rotates the render camera 2915 along one or more of its axis 2925, 2910, and 2915. The application pans the render camera 2915 to the left or right by rotating the camera about its y-axis 2930. In order to tilt the render 2915 camera up or down, the application rotates the render camera 2915 about its x-axis 2925.

FIGS. 31A-31C illustrate a user directing the application to pan the render camera 2915 to the right. In FIG. 31A, the render camera 2915 is oriented within the render sphere 2910 to display point "A" 3105 on the user's tablet device 3010, with the user intending to rotate the view to display point "B" 3110. In FIG. 31B, the user "swipes" his finger across the tablet device at 3120, indicating that the user wants to look to the right within the virtual environment of the render sphere 2910. In response to the user's gesture 3120, the application rotates the render camera 2915 to the right about its y-axis 2930, as indicated by 3115. In FIG. 31C, the application completes the rotation 3115 and displays point "B" 3110 on the user's tablet device 3010. FIG. 32 shows one example of application source code for rotating the camera as described in order to update the user view.

Figure 33A:
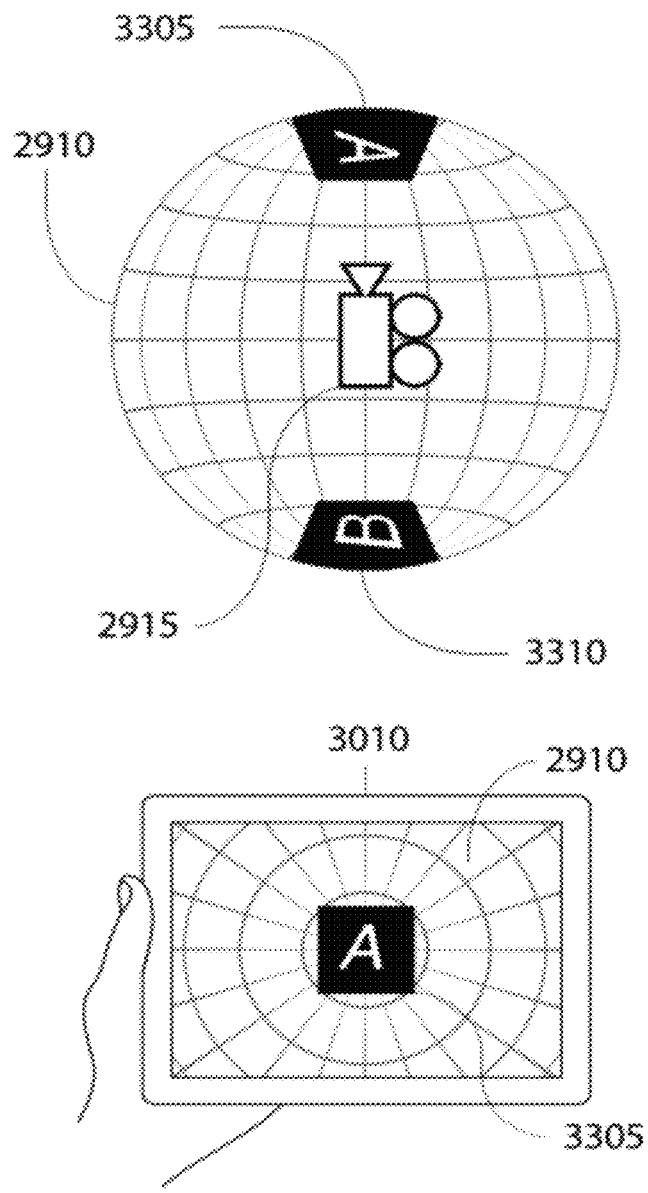
FIGS. 33A-33C illustrate an example of a user directing a viewer application to tilt the render camera downwards.
Figure 33B:
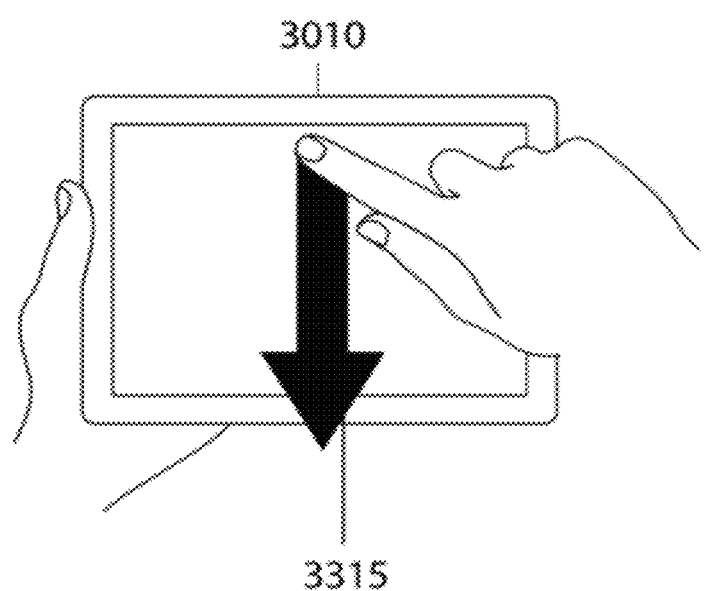
Figure 33C:
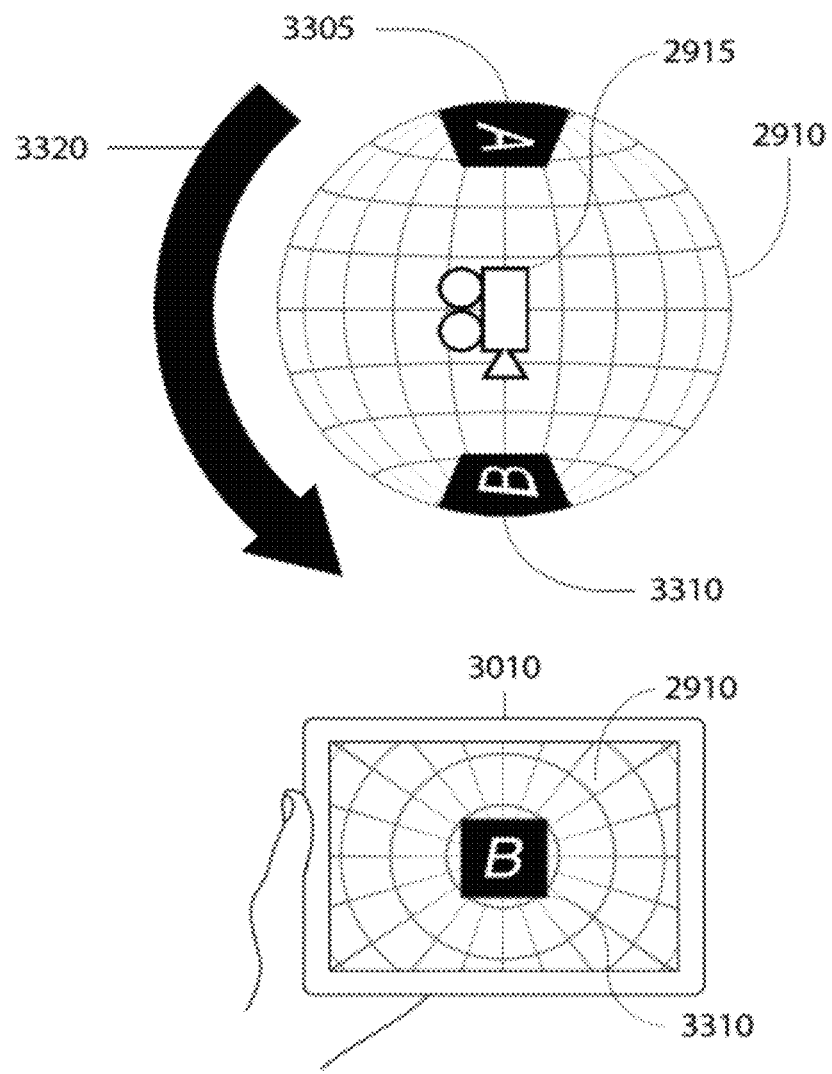

FIGS. 33A-33C illustrate a user directing the application to tilt the render camera 2915 from top to bottom. In FIG. 33A, the render camera 2915 is oriented within the render sphere 2910 to display "A" 3305 on the user's tablet device 3010, with the user intending to rotate the view to display "B" 3310. In FIG. 33B, the user "swipes" his finger from the top of the tablet device to the bottom at 3315, indicating that the user wants to look down within the virtual environment of the render sphere 2910. In response to the user's gesture 3315, the application rotates the render camera 2915 down about its x-axis 2925, as indicated by 3320. In FIG. 33C, the application completes the rotation 3320 and displays point "B" 3310 on the user's tablet device 3010. FIG. 32 shows one example of application source code for rotating the camera as described.

Figure 34B:
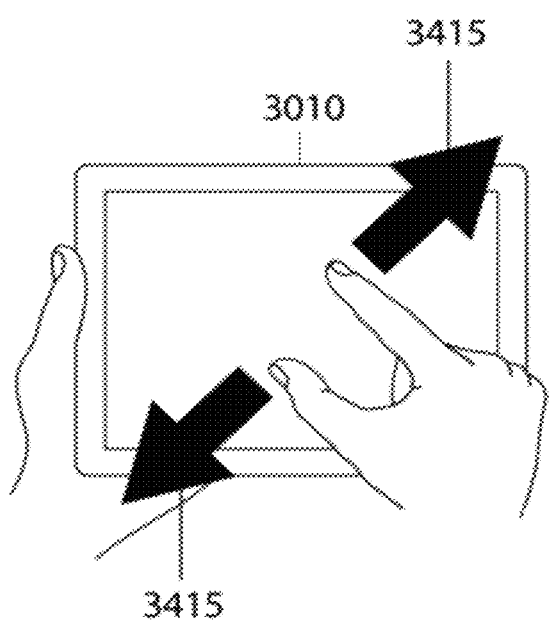

FIGS. 34A-34C illustrate a user directing the application to zoom the render camera 2915 in on point "A" 3405. In FIG. 34A, the render camera 2915 is oriented within the render sphere 2910 to display "A" 3405 on the user's tablet device 3010 with a particular field-of-view value 3410. In FIG. 33B, the user performs a two-finger outward-pinch gesture at 3415, indicating that the user wants to zoom in within the virtual environment of the render sphere 2910. In response to the user's gesture, the application changes the render camera 2915 to have a smaller field-of-view value 3420. In FIG. 34C, the application completes the zoom, with point "A" 3405 displayed larger on the user's tablet device 3010. As noted above, FIG. 32 shows one example of application source code for rotating the camera 2915 to change the render camera's 2915 position. FIG. 32 shows one example of application source code for zooming the camera in and out as described.

Figure 30C:
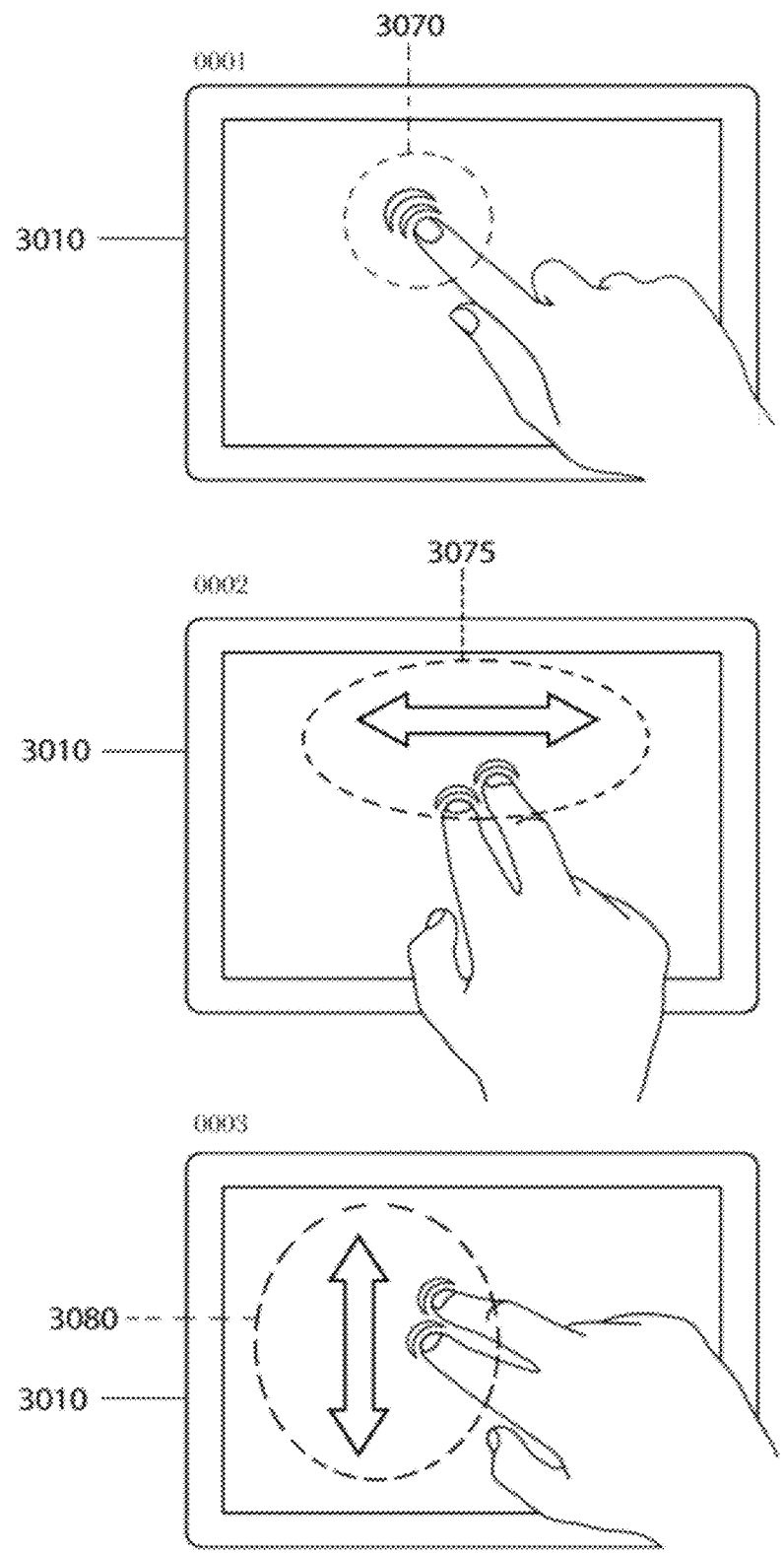

Because the viewer application deals with image, auditory, and video content, the viewer may additionally provide standard video control elements such as play and pause buttons, volume controls, timecode and an interactive timeline showing playback progress. For example, the viewer application user interface 3020 in FIG. 30B includes a view of the render sphere 2710, a battery level indicator 3025, a memory level indicator 3025, a GPS signal level 3030, a Wi-fi indicator 3035, a Preferences icon 3040, and a Volume indicator 3045. This example further includes a Play/Pause icon 3050, a timecode indicator 3055, and a Playback Bar 3060 indicating a playback progress, where these elements 3050-3060 are available during playback of a recorded file and not during a live broadcast. These icons and indicators, however, are merely illustrative and not inclusive of all icons, indicators, and information that can be displayed. When viewing the spherical video file on a touch-based device, such as a tablet, other gestures would be available. An illustration of three example gestures are illustrated in FIG. 30C. This includes double-tapping the screen 3070 to toggle playback, two-finger-horizontal dragging 3075 to scrub through frames and two-finger vertical-dragging 3080 to perform velocity playback. The spherical viewer additionally utilizes any metadata associated with the video during playback. This includes positional data, such as latitude and longitude coordinates, and orientation data, such as accelerometer and gyroscope data, as described above.

Figure 35A:
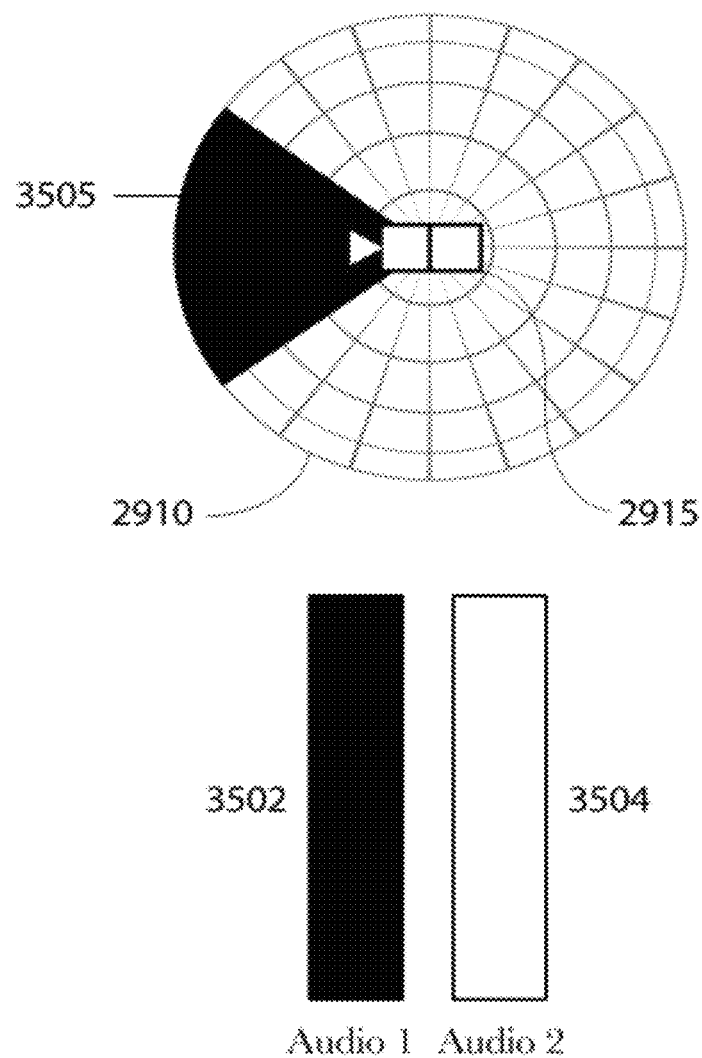
FIGS. 35A-35C illustrate an example of how a viewer application may provide directional audio to the user based on the rotation of a render camera about one or more of its axis.
Figure 35B:
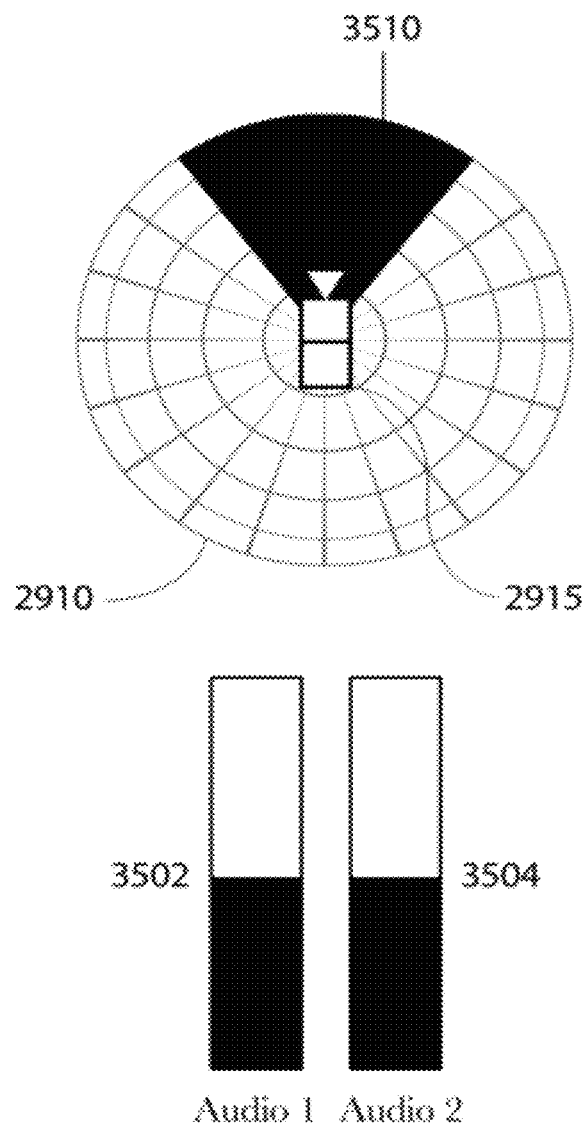
Figure 35C:
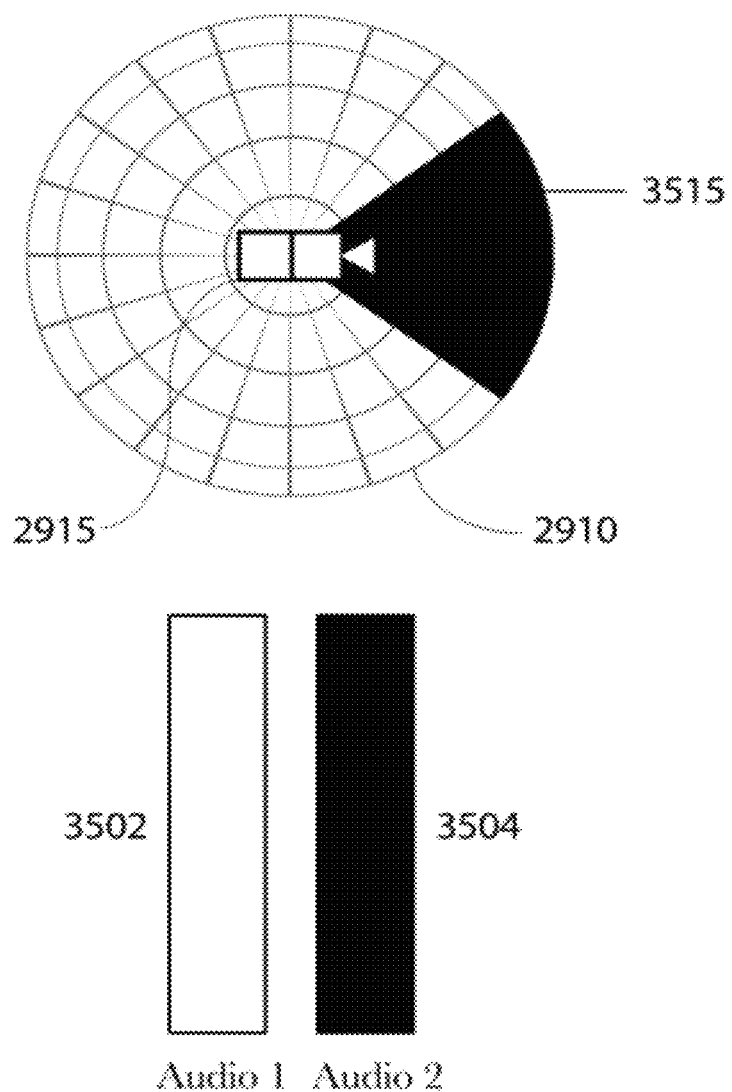

The spherical viewer application also utilizes the multiple audio tracks recorded by the device 101 using microphones 302 and 402 to create "directional sound." As illustrated in FIGS. 1-4, the device 101 has two separate microphones 302 and 304, each facing outwards from the device 101 in the same direction as each camera lens 103a and 103b. In this configuration, the microphone 302 records (and reflects) what the camera 103a sees, while the microphone 304 records what the camera 103*b* sees. The spherical viewing application creates "directional audio" experience by raising and lowering the volume of each track as the user changes their pan direction, as described above. FIGS. 35A-35C show an embodiment of the invention providing this experience. In FIG. 35A, the render camera 2915 faces direction 3505. In this direction, the volume of audio track 3502 acquired from microphone 302 is set to 100% to reflect what is visually seen by the render camera 2915, and the volume of audio track 3504 acquired from microphone 402 is set to 0% indicating that no sounds associated with this track are seen by the render camera 2915 in this direction.

In FIG. 35B, the render camera 2915 faces direction 3510 within the render sphere 2910. In this direction, the volume of audio track 3502 and audio track 3504 are both set to 50%, meaning both audio tracks contain sounds that reflect what is seen at this angle. In FIG. 35C, the render camera 2915 faces direction 3515. In this direction, the volume of audio track 3504 is set to 100% to reflect what is visually seen by the render camera 2915, and the volume of audio track 3502 is set to 0% indicating that no sounds associated with this track are seen by the render camera 2915 in this direction.

Figure 36:
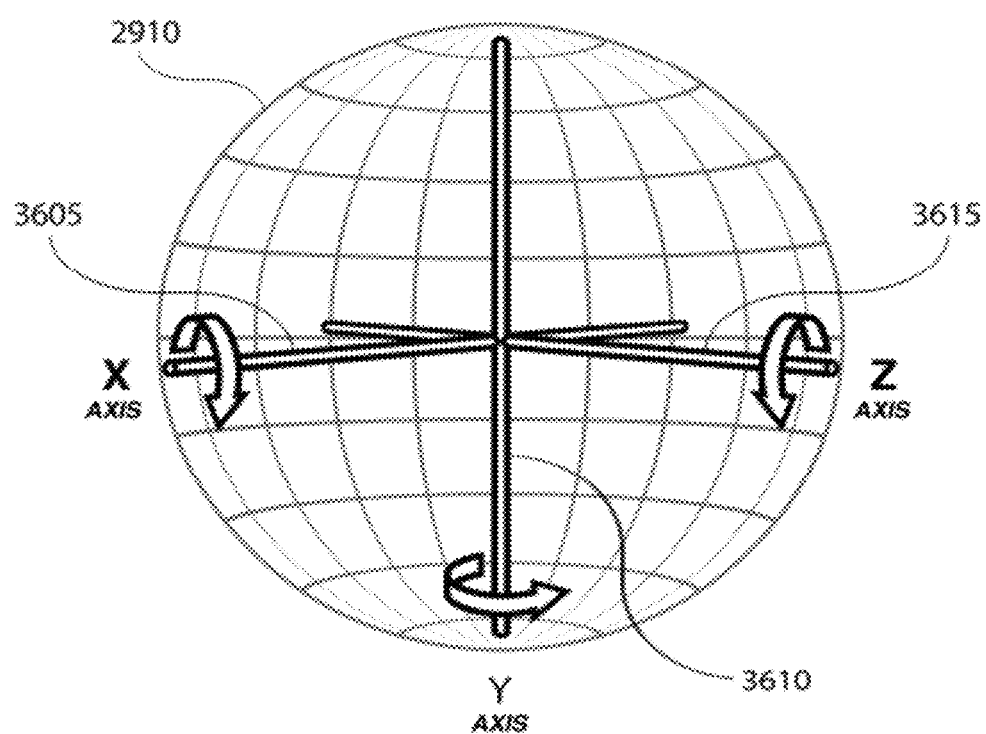
FIG. 36 illustrates an X-axis, a Y-axis, and a Z-axis of a render sphere about which the render sphere can rotate.
Figure 37B:
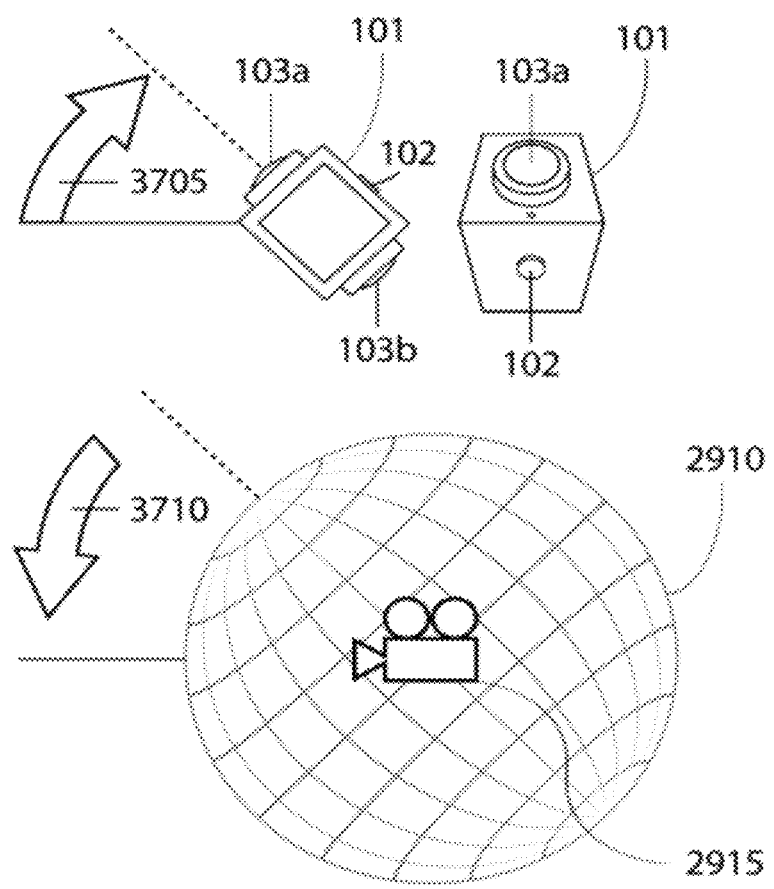

Another feature of the spherical viewer application is the application's ability to rotate the render sphere itself about one or more axes based on the acquired accelerometer and gyroscope data. As shown in FIG. 36, the render sphere 2910 is rotatable about its x-axis 3605, y-axis 3610, and z-axis 3615. Such rotational capabilities allow the viewer application to compensate for unwanted camera rotation during recording. For example, FIG. 37A shows the device 101 level with the ground, meaning that the accelerometer data would show zero rotation about the device's 101 x-axis. Therefore, when the resulting equirectangular file is created and applied to the interior of the render sphere 2910, the view within the virtual environment appears normal to the user. In FIG. 37B, however, the device 101 has been rotated about its x-axis by the angle 3705. Such a rotation could be caused by, for example, a user holding the camera and walking while recording or recording while on a boat. In order to compensate for this device 101 rotation, the application rotates the render sphere downward about its x-axis by the appropriate angle 3710 to "correct" the view for the user. Although the render sphere 2910 is rotated along its x-axis, the render camera's 2915 rotational position does not change. As accelerometer and gyroscope metadata is evaluated for each frame image, the render sphere 2910 rotates along each of its axis to compensate for the camera's 2915 unwanted rotation along the same axis. The result of this feature is to provide spherical video that appears completely stable to the user, despite the fact that the device 101 was rotated during its operation. The utilization of orientation metadata by the spherical viewer application can be performed for both pre-recorded content and during a live broadcast.

In addition to being able to view both live and pre-recorded spherical video content, the spherical viewer application is also able to configure various attributes and preferences of the device 101. For example, the application may display the remaining battery level of the device 3025 and the remaining memory (recording time) 3025 left on the device's 101 internal storage or card-based storage, as illustrated above. The application may also allow the user to set various preferences, e.g., video resolution, and calibrate the alignment of each of the device 101 cameras via the Preferences icon 4030. There may be situations when the device 101 cameras are not in alignment. This could be due to a manufacturing error or be the result of general usage. As the device 101 is used, the camera, lens and sensor may become slightly out of alignment resulting in unwanted visual anomalies when creating the spherical image files. To correct the alignment, the application allows the user to manually correct the alignment of each camera. This could be done, for example, by using a tablet connected to the invention to visually see and make alignment adjustments to each of the cameras.

Figure 38:
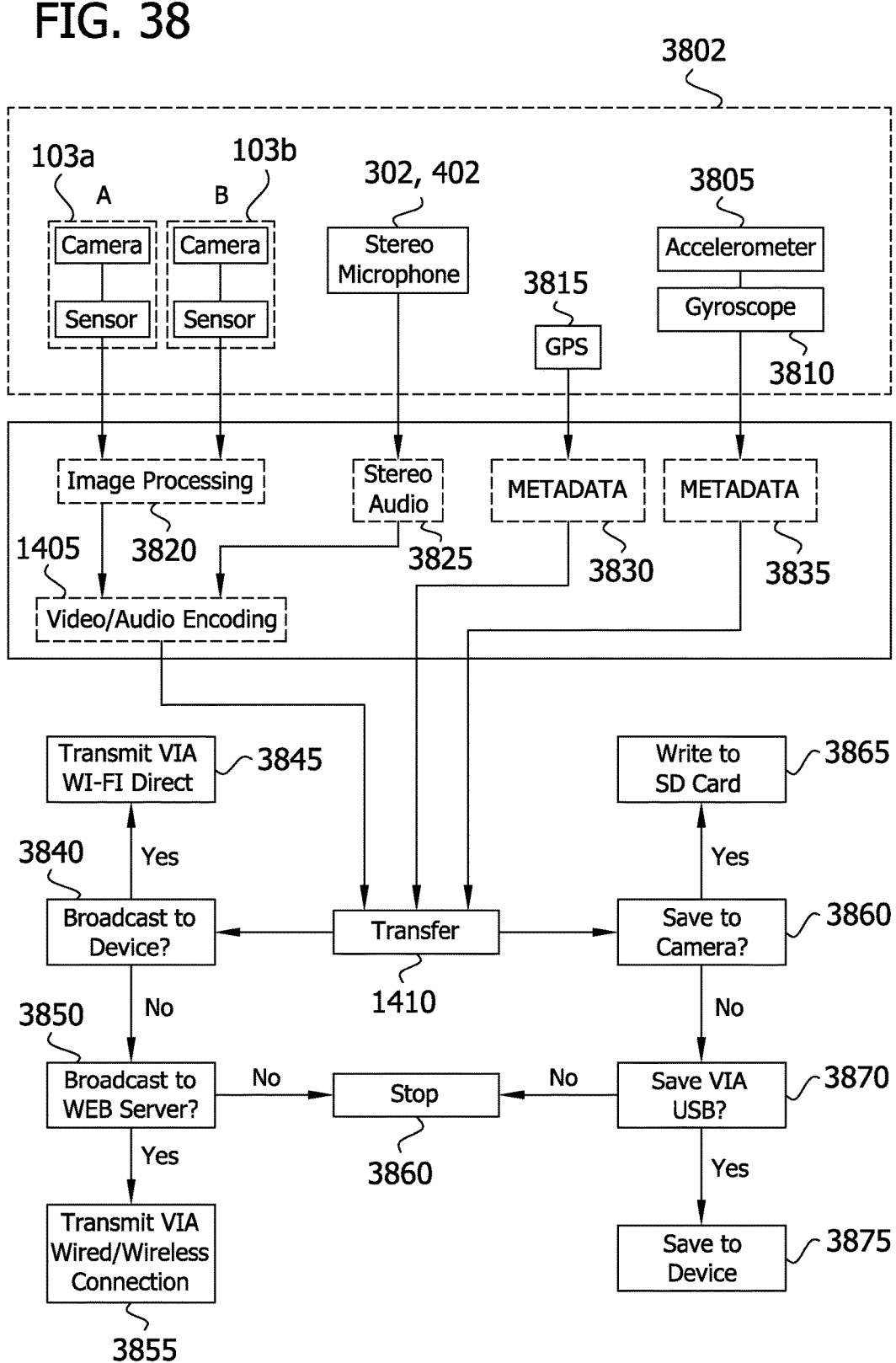
FIG. 38 illustrates an embodiment of the invention acquiring images from two cameras, audio from two microphones, and information positional and rotational information, processing and/or encoding the acquired data, and transferring the data as appropriate.

By utilizing a plurality of cameras as described above, embodiments of the present invention are able to simultaneously record multiple video streams for capturing a substantially complete 360 degree×360 degree spherical environment. Furthermore, the embodiments of the invention have the ability to simultaneously merge each video stream into a single, spherical file in real time for broadcast to a web server and/or a user's computing device, as well as saving to internal storage, card-based storage and/or a user's computing device. For example, FIG. 38 illustrates one embodiment of the present invention. In FIG. 38, the elements of an exemplary device 101 are shown at 3802. During operation of the device 101, cameras 103*a* and 103*b* acquire video images and microphones 302 and 304 acquire audio that corresponds to the acquired video images, while one or more positional information acquisition devices, such as the GPS 3815, acquires positional information corresponding to the acquired video images, and one or more rotational information devices, such as the accelerometer 3805 and gyroscope 3810, acquire device orientation information corresponding to the acquired video images. At 3820, the acquired video images are processed (as illustrated in FIG. 9), where the processed images and acquired audio 3825 are then encoded at 1405. Then at 1410, the encoded video and audio from 1405, the GPS metadata 3830 (illustrated in FIG. 16), and the positional metadata 3835 (illustrated in FIG. 18) are transferred via broadcast, saved to storage or user device, or some combination thereof. In one example, the transferred information at 1410 is broadcast to a particular user computing device at 3840 and 3845. In another example, the information at 1410 is broadcast to a web server via a wireless and/or cellular connection at 3850 and 3855. In another example, the information at 1410 is saved to storage at the device 101 at 3860 and 3865. The information may also be saved to the user computing device via USB at 3870 and 3875.

Figure 39:
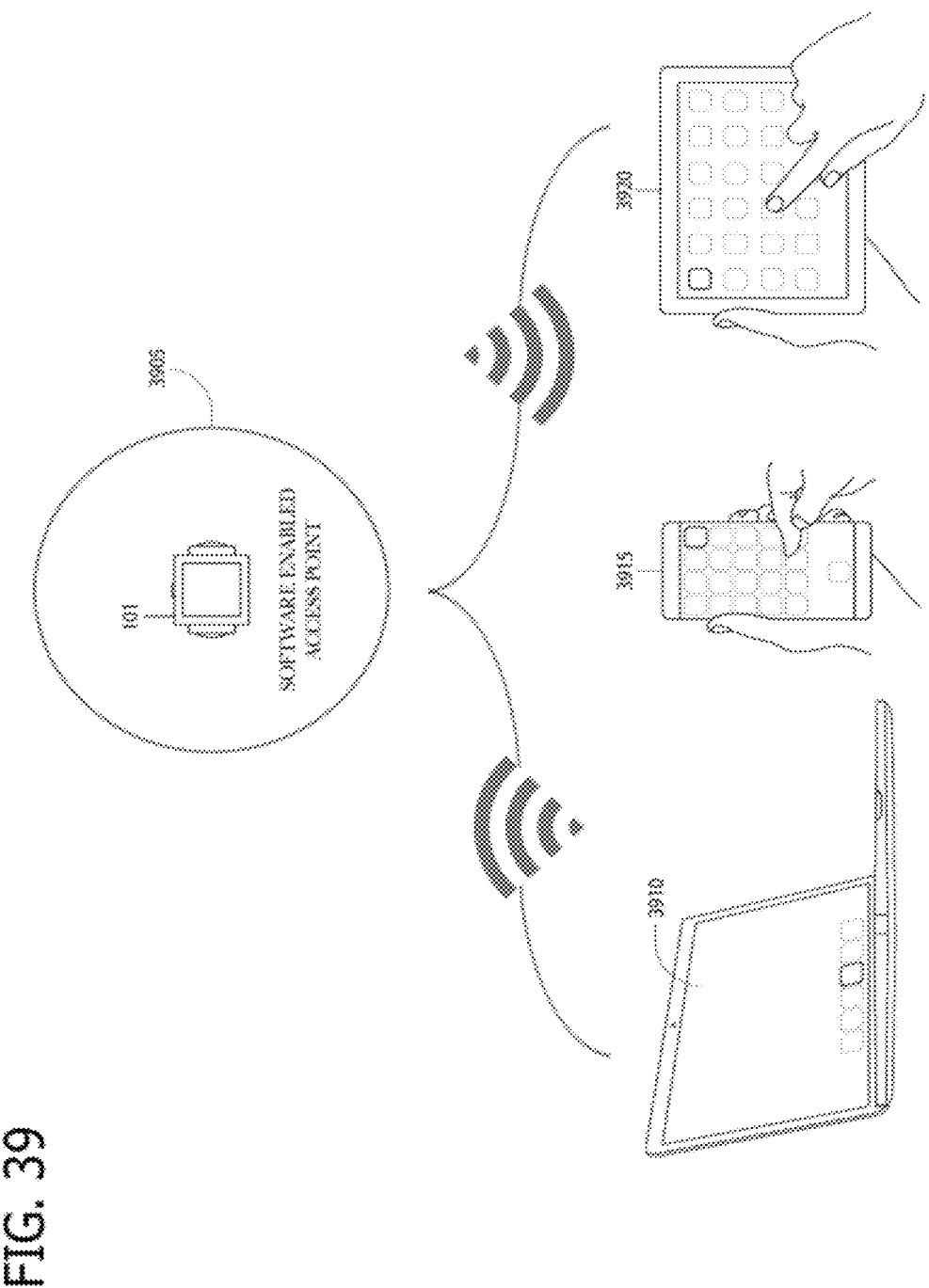
FIG. 39 illustrates an example embodiment of the invention in communication with multiple devices via wireless and/or cellular communication.
Figure 40:
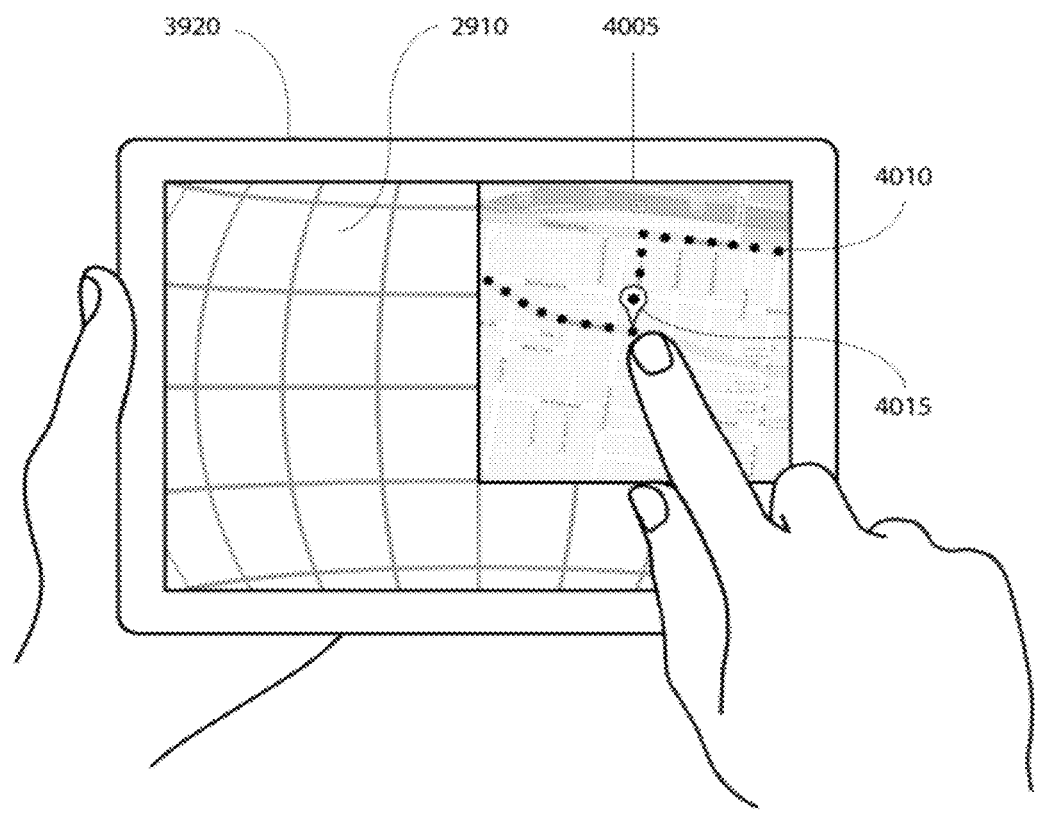
FIG. 40 illustrates an example viewer application with a map overlay for displaying positional GPS data.

FIG. 39 illustrates one exemplary embodiment of the present invention. In the illustrated embodiment, the device 101 utilizes its own build-in wireless communication hardware and software components to create a SoftAP 3905 for wireless communication. In other embodiments, a card-based storage device such as a SDHC card provides the hardware and/or software components for creating a wireless access point 3905 for wireless communication. By way of example and not limitation, FIG. 39 shows a computer 3910, a smart phone 3915, and a tablet 3920 in wireless communication with the device 101 via the created access point 3905. The wireless communication permits each connected device to receive a real-time broadcast of a spherical video file from the device 101. Each device in this embodiment, however, has the appropriate spherical viewer application installed on the device.

Providing the software required for interfacing with the device 101 and viewing the spherical video file can be done in a number of ways. One way is to include all the necessary desktop software on a USB drive or DVD/CD disc provided with the device 101 at the time of purchase, from which the user installs the appropriate application software. Software for mobile devices can be downloaded to the device from the online application store related to that specific mobile operating system. For example, a user of an Apple iOS device downloads the application from the online App Store to the device. An Android device, running the Android mobile Operating System, can download the application using the Android Market application, which is natively provided on Android devices. Another option is that the device 101 automatically checks if the necessary software is installed when it is attached to the computer or mobile device. If not, the device 101 prompts the user to automatically download the appropriate application software from the Internet. This automatic detection (and installation) of software by the device 101 provides a hassle-free method of providing the user the software they need to begin using the device 101 immediately, regardless of what type of device the user is utilizing to interface with the device 101.

The installed spherical viewer application may additionally include a 2-dimensional map overlay 4005 above it. Within the map overlay 4005, numerous map points have been added, such as point 4010. These points represent the path travel taken by the device 101 where each point corresponds to a latitude/longitude pair recorded by the device's 101 GPS. As noted above, GPS data is saved as metadata files (see FIG. 16) during a video recording or broadcasting sequence. In the case of pre-recorded video with location metadata, the map 4005 also indicates the current position 4015 as it relates to the video file's current time. The user may click on any point on the map 4005 to automatically move the video to the time that corresponds to that point. The user may additionally click or press on the interactive timeline 3060 to jump to a new time in the video, with the current position on the map as it relates to that point in time being displayed on the map 4005. For live broadcasts, the map 4010 indicates the current global position as indicated by 4015, in addition to the path traveled up until that point.

Figure 41:
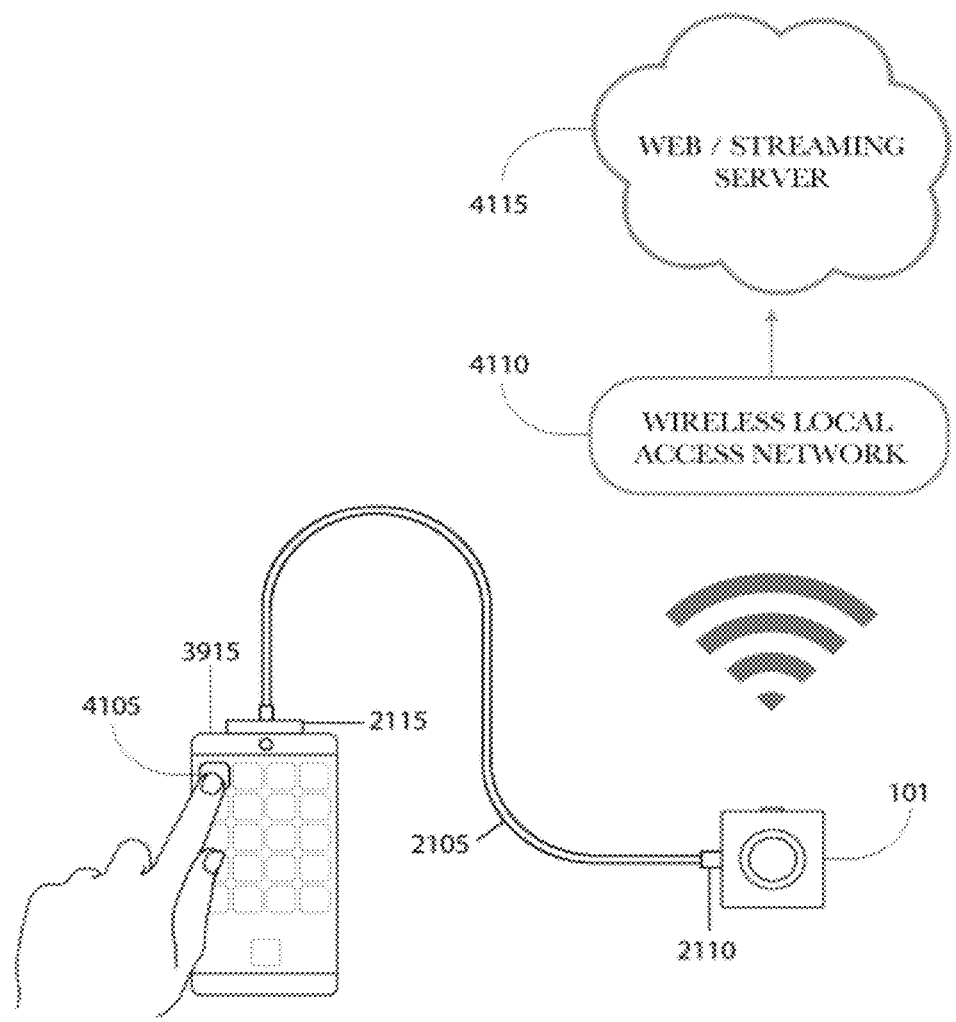
FIG. 41 illustrates another embodiment of the invention with a camera device connected to a smart phone via an attached cable, with the camera device transmitting data via wireless and/or cellular communication, according to various aspects described herein.

FIG. 41 illustrates other embodiments of the present invention. In FIG. 41, the smart phone 3915 is connected to the device 101 via cable 2105, where the installed viewer application 4105 allows the user to view pre-recorded and/or live spherical video from the device 101. Device 101 may also be in wireless communication with the wireless local access network 4110, and transmitting spherical video to a web/streaming server 4115 for view by any computing device capable of connecting to and receiving data from the server 4115.

Figure 42:
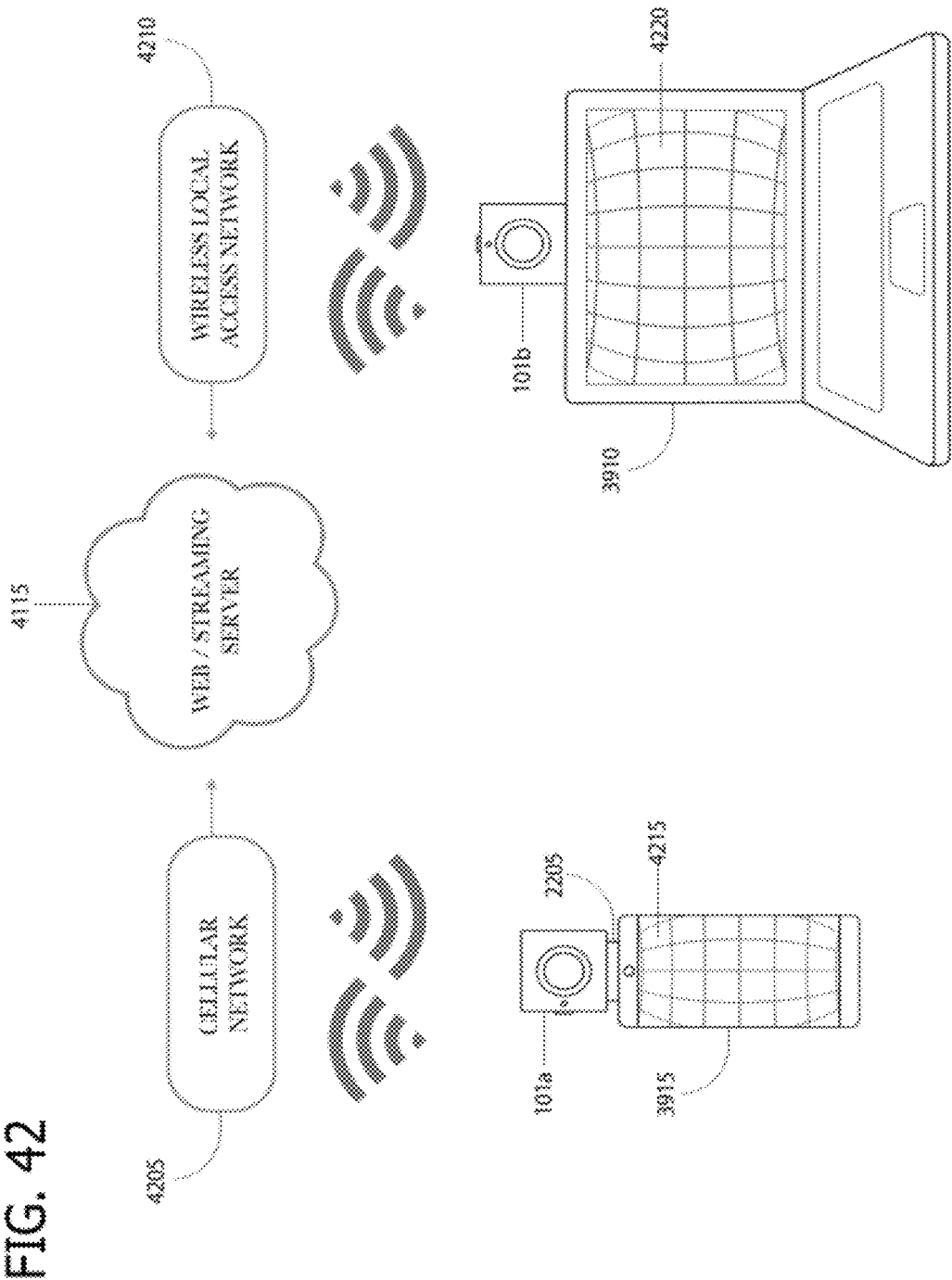
FIG. 42 illustrates another embodiment of the invention with two camera devices connected to a respective user computing device while simultaneously transmitting data via wireless and/or cellular communication, according to various aspects described herein.

FIG. 42 illustrates yet another example of the present invention. In FIG. 42, a first device 101A is attached to a smart phone 3915 using a connector 2205. The device 101 uses the appropriate hardware and/or software components to establish a cellular connection 4205 to broadcast a live 360 degree video stream to an internet web/streaming server 4115. A second device 101B is connected to a laptop computer 3910 via USB, and uses the appropriate hardware and/or software components to connect to a local wireless network 4210 and broadcasts another 360 degree video stream to the web/streaming server 4115. In this example, the smart phone 3915 viewer views the live 360 degree video stream 4215 broadcast from second device 101B, while the laptop 3910 viewer views the live 360 degree video 4220 broadcast from first device 101A.

Figure 43:
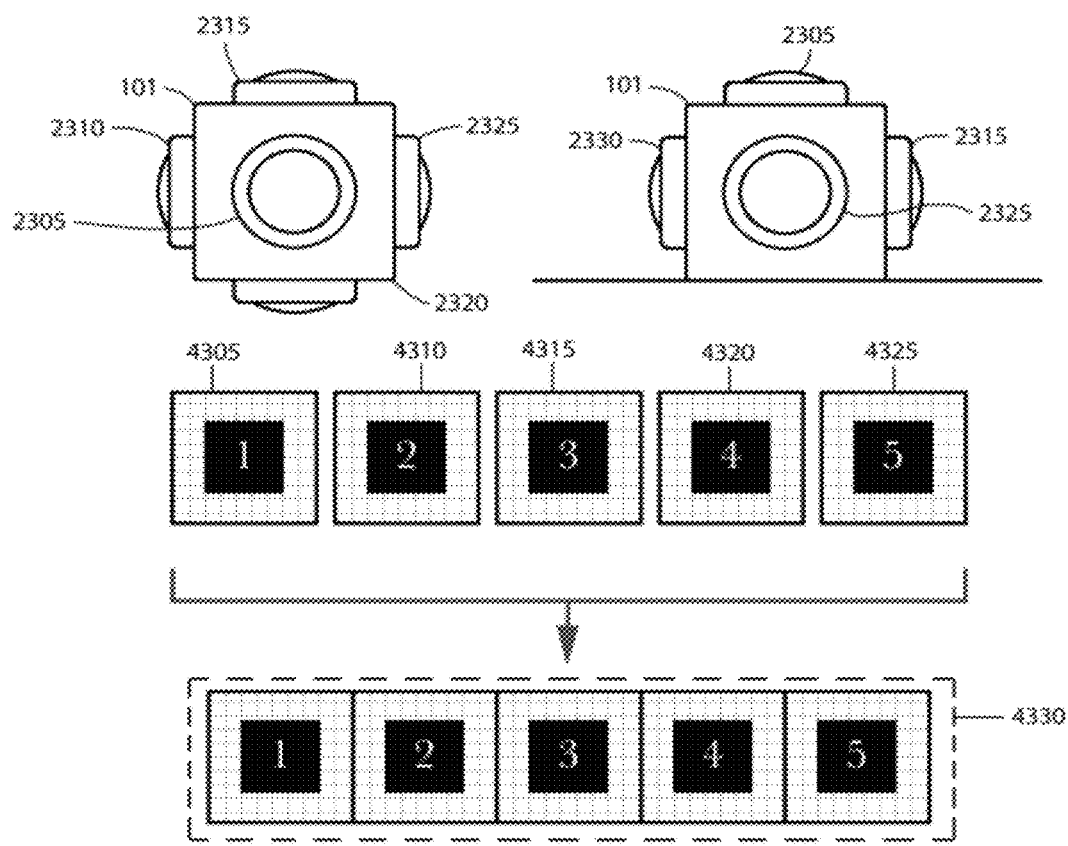
FIG. 43 illustrates an embodiment of the camera device with five cameras each producing video images.
Figure 44:
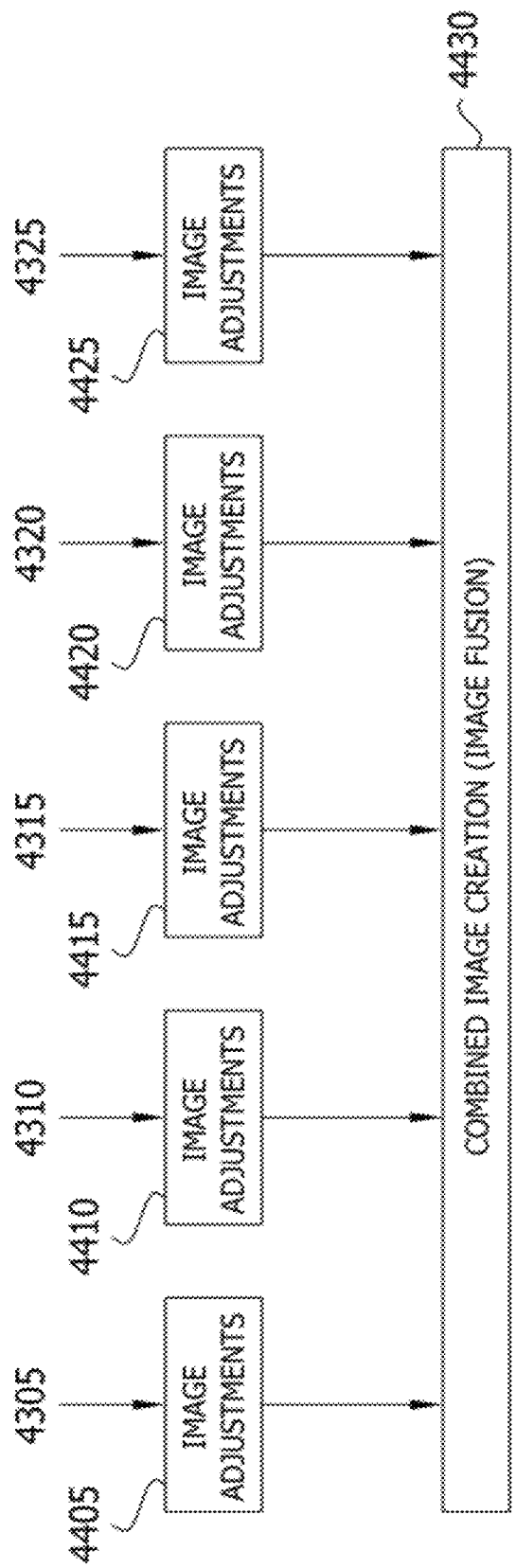
FIG. 44 illustrates an image adjustment process for each of the images shown in FIG. 43, with the adjusted images being combined to form a single fused image.
Figure 45:
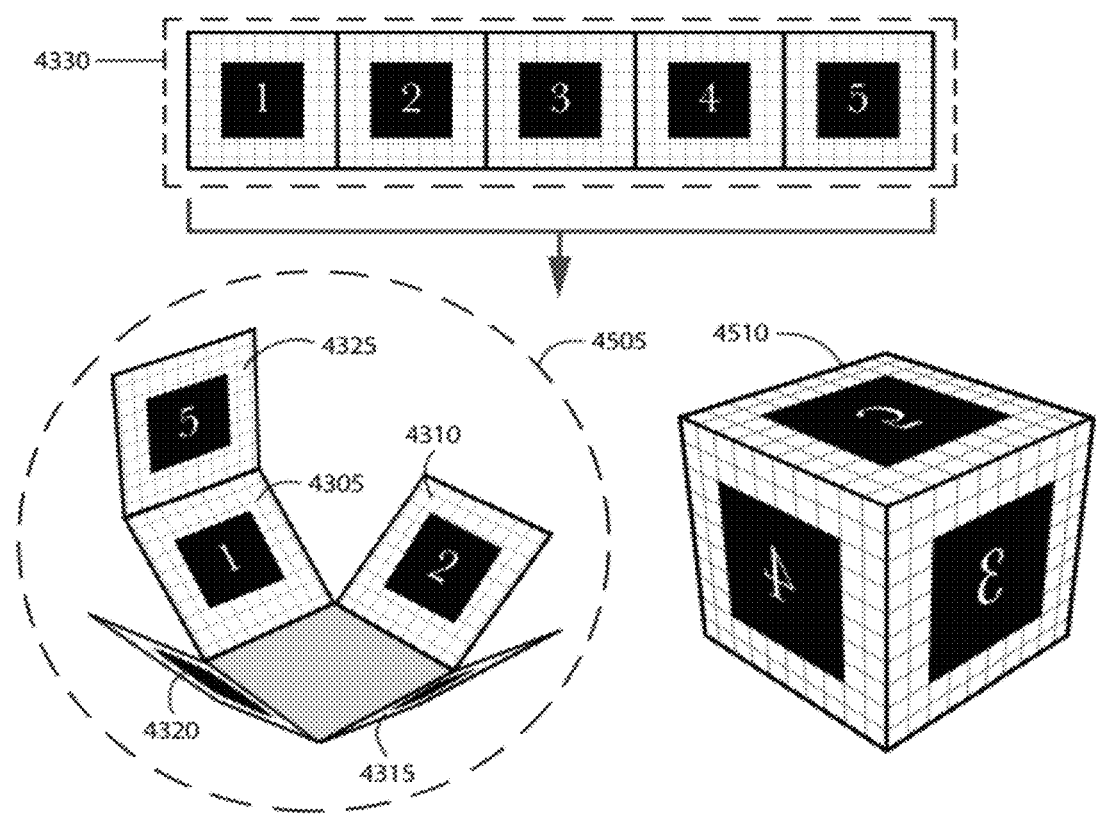
FIG. 45 illustrates an exemplary process by which a viewer application utilizes the fused image shown in FIG. 44 to create a render cube and apply images extracted from the fused image to create a cubic, three-dimensional view.

FIG. 43A-43B demonstrates other embodiments of the present invention. For example, the device 101 may include a more than two cameras, as illustrated in FIG. 43A. In this example, the device 101 has five cameras 2305, 2310, 2315, 2320, and 2325. In FIG. 43, each camera generates a video image file, such as those shown at 4305, 4310, 4315, 4320, and 4325. In FIG. 44, each file 4305, 4310, 4315, 4320, and 4325 proceeds through its respective image adjustment process 4405, 4410, 4415, 4420, and 4425, where the adjusted files are combined at 4430 to form a unified image file 4330. The processes 4405, 4410, 4415, 4420, and 4425 may each include, but is not limited to, the steps of cropping scaling, rotating, color correcting, adjusting brightness/contrast, and/or vignette removal. These adjustment processes and the combined image creation are illustrated in FIG. 44. A viewer application may then extract each image and/or video file from the combined file 4330 and map/apply each image/video to a respective interior face of the 3-dimensional cube 4505. The viewer application may then create a 3-d video environment from the cube 4505 by placing a render camera 2915 at its center, in the same manner as described above with respect to the render sphere 2910.

The computing system environment of device 101 as described above is only one example of a suitable computing environment and is not intended to suggest any limitation as to the scope of use or functionality of features described herein. Neither should the computing environment be interpreted as having any dependency or requirement relating to any one or combination of components illustrated or described herein.

Aspects of the invention are operational with numerous other general purpose or special purpose computing system environments or configurations. Examples of well known computing systems, environments, and/or configurations that may be suitable for use with aspects of the invention include, but are not limited to, personal computers; server computers; smart televisions (TVs with computer processors); portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 43, an exemplary system for implementing aspects of the invention includes a general purpose computing device in the form of a conventional computer 4320, including a processing unit 4321, a system memory 4322, and a system bus 4323 that couples various system components including the system memory 4322 to the processing unit 4321. The system bus 4323 may be any of several types of bus structures including a memory bus or memory controller, a peripheral bus, and a local bus using any of a variety of bus architectures. The system memory includes read only memory (ROM) 4324 and random access memory (RAM) 4325. A basic input/output system (BIOS) 4326, containing the basic routines that help transfer information between elements within the computer 20, such as during start-up, may be stored in ROM 4324.

The computer 4320 may also include a magnetic hard disk drive 4327 for reading from and writing to a magnetic hard disk 4339, a magnetic disk drive 4328 for reading from or writing to a removable magnetic disk 4329, and an optical disk drive 4330 for reading from or writing to removable optical disk 4331 such as a CD-ROM or other optical media. The magnetic hard disk drive 4327, magnetic disk drive 4328, and optical disk drive 30 are connected to the system bus 4323 by a hard disk drive interface 4332, a magnetic disk drive-interface 33, and an optical drive interface 4334, respectively. The drives and their associated computer-readable media provide nonvolatile storage of computer-executable instructions, data structures, program modules, and other data for the computer 4320. Although the exemplary environment described herein employs a magnetic hard disk 4339, a removable magnetic disk 4329, and a removable optical disk 4331, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 4339, magnetic disk 4329, optical disk 4331, ROM 4324, and/or RAM 4325, including an operating system 4335, one or more application programs 4336, other program modules 4337, and program data 4338. A user may enter commands and information into the computer 4320 through keyboard 4340, pointing device 4342, or other input devices (not shown), such as a microphone, joy stick, game pad, satellite dish, scanner, or the like. These and other input devices are often connected to the processing unit 4321 through a serial port interface 4346 coupled to system bus 4323. Alternatively, the input devices may be connected by other interfaces, such as a parallel port, a game port, or a universal serial bus (USB). A monitor 4347 or another display device is also connected to system bus 4323 via an interface, such as video adapter 4348. In addition to the monitor, personal computers typically include other peripheral output devices (not shown), such as speakers and printers.

The computer 4320 may operate in a networked environment using logical connections to one or more remote computers, such as remote computers 4349a and 4349b. Remote computers 4349a and 4349b may each be another personal computer, a server, a router, a network PC, a peer device or other common network node, and typically include many or all of the elements described above relative to the computer 4320, although only memory storage devices 4350a and 4350b and their associated application programs 36a and 36b have been illustrated in FIG. 1. The logical connections depicted in FIG. 1 include a local area network (LAN) 4351 and a wide area network (WAN) 4352 that are presented here by way of example and not limitation. Such networking environments are commonplace in office-wide or enterprise-wide computer networks, intranets and the Internet.

When used in a LAN networking environment, the computer 4320 is connected to the local network 4351 through a network interface or adapter 4353. When used in a WAN networking environment, the computer 4320 may include a modem 4354, a wireless link, or other means for establishing communications over the wide area network 4352, such as the Internet. The modem 4354, which may be internal or external, is connected to the system bus 4323 via the serial port interface 4346. In a networked environment, program modules depicted relative to the computer 4320, or portions thereof, may be stored in the remote memory storage device. It will be appreciated that the network connections shown are exemplary and other means of establishing communications over wide area network 4352 may be used.

One or more aspects of the invention may be embodied in computer-executable instructions (i.e., software), such as a software object, routine or function (collectively referred to herein as a software) stored in system memory 4324 or non-volatile memory 4335 as application programs 4336, program modules 4337, and/or program data 4338. The software may alternatively be stored remotely, such as on remote computer 4349a and 4349bb with remote application programs 4336b. Generally, program modules include routines, programs, objects, components, data structures, etc. that perform particular tasks or implement particular abstract data types when executed by a processor in a computer or other device. The computer executable instructions may be stored on a computer readable medium such as a hard disk 4327, optical disk 4330, solid state memory, RAM 4325, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An imaging system for creating and viewing media files containing omnidirectional image data, omnidirectional audio data, orientation data, position data and file data, said imaging system comprising:
   a housing;
   a computer processor;
   a system memory, said system memory comprising computer-processor executable instructions for operating said imaging system;
   an input/output port;
   a wireless communication module;
   a touch screen display for receiving user input;
   at least two image sensors for acquiring image data, each of said image sensors comprising a lens system protruding outward from said housing in different directions, said image data collectively representing a 360°× 360° field of view;
   at least two microphones for acquiring audio data, each of said microphones facing outward from said housing;
   at least one speaker for playing audio data;
   a triaxial orientation sensor for creating orientation data, said orientation data describing the rotation of said imaging system about its x-axis, y-axis and z-axis;
   a Global Positioning System for creating position data, said position data describing the global position of said imaging system;
   said executable instructions further comprising a method for creating a new media file containing omnidirectional image data, omnidirectional audio data, orientation data, position data and file data, said method comprising:
   creating, by the processor, a new media file;
   initiating, by the processor, a repeating acquisition process, said acquisition process comprising:
   acquiring, by the processor, orientation data from said orientation sensor;
   acquiring, by the processor, position data from said Global Positioning System;
   acquiring, by the processor, audio data synchronously from each of said microphones;
   acquiring, by the processor, image data synchronously from each of said image sensors;
   selectively modifying, by the processor, said acquired image data from each of said image sensors, said modifying including at least one of cropping, scaling, rotating, converting, masking and vignette removal;
   combining, by the processor, said modified image data from each of said image sensors into an omnidirectional image;
   generating, by the processor, file data, said file data describing one or more properties of said new media file, said properties including date, time, size, duration, frame rate and format;
   encoding, by the processor, said omnidirectional image;
   encoding, by the processor, said acquired audio data from each of said microphones;
   adding, by the processor, said encoded omnidirectional image, said encoded audio data, said acquired orientation data, said acquired position data and said generated file data into said new media file; and
   transferring, by the processor, said new media file to a system memory via at least one of a wired connection and a wireless connection;
   said executable instructions further comprising a method for interactively viewing a media file containing omnidirectional image data, omnidirectional audio data, orientation data, position data and file data, said method comprising:
   executing, by the processor, an omnidirectional media viewer program;
   receiving, by the processor, a media file containing omnidirectional image data, omnidirectional audio data, orientation data, position data and file data from a system memory via at least one of a wired connection and a wireless connection;
   creating, by the processor, a 3D virtual environment;
   creating, by the processor, a 3D render object inside said virtual environment, said render object having one or more properties based on said file data of said received media file, said properties including shape and size;
   applying, by the processor, said image data of said received media file to one or more interior surfaces of said render object;
   creating, by the processor, a 3D render camera inside said render object, said render camera defining a user view of said applied image data on said one or more interior surfaces of said render object, said user view determined by the rotation of said render camera about its x-axis, y-axis, and z-axis, the rotation of said render object about its x-axis, y-axis, and z-axis and a zoom value of said render camera;
   initiating, by the processor, a repeating render process, said render process comprising:
   receiving, by the processor, user input via said touch screen display;
   updating, by the processor, said image data of said received media file on said one or more interior surfaces of said render object;
   updating, by the processor, said orientation data, said position data and said file data of said received media file;
   selectively changing, by the processor, the rotation of said render camera about its x-axis, y-axis, and z-axis based on at least one of said received user input and said updated orientation data;
   selectively changing, by the processor, the rotation of said render object about its x-axis, y-axis, and z-axis based on at least one of said received user input and said updated orientation data;

selectively changing, by the processor, said zoom value of said render camera based on said received user input;
selectively changing, by the processor, the volume of said received audio data based on at least one of said received user input and said updated orientation data;
selectively displaying, by the processor, a map on said touch screen display, said map based on at least one of said updated position data and said received user input;
updating, by the processor, said user view via said touch screen display; and
updating, by the processor, said received audio data via said at least one speaker.

\* \* \* \* \*